(12) United States Patent
Cromp et al.

(10) Patent No.: US 7,996,465 B2
(45) Date of Patent: *Aug. 9, 2011

(54) INCIDENT COMMAND SYSTEM

(75) Inventors: Robert F. Cromp, Clifton, VA (US); Gilad Suberri, Washington, DC (US)

(73) Assignee: Raytheon Company, Waltham, MA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/368,036

(22) Filed: Mar. 3, 2006

(65) Prior Publication Data

US 2006/0211404 A1 Sep. 21, 2006

Related U.S. Application Data

(60) Provisional application No. 60/658,223, filed on Mar. 3, 2005.

(51) Int. Cl.
*H04M 11/00* (2006.01)
(52) U.S. Cl. .............. 709/204; 455/404.1; 455/404.2; 709/205
(58) Field of Classification Search .............. 340/990, 340/988; 705/2–4; 370/230
See application file for complete search history.

(56) References Cited

U.S. PATENT DOCUMENTS

| | | | | |
|---|---|---|---|---|
| 5,219,290 A * | 6/1993 | Lapp et al. | | 434/226 |
| 5,487,139 A * | 1/1996 | Saylor et al. | | 345/629 |
| 5,758,313 A * | 5/1998 | Shah et al. | | 455/456.2 |
| 6,606,993 B1 * | 8/2003 | Wiesmann et al. | | 128/204.23 |
| 7,058,710 B2 * | 6/2006 | McCall et al. | | 709/224 |
| 7,263,379 B1 * | 8/2007 | Parkulo et al. | | 455/521 |
| 7,555,517 B2 * | 6/2009 | Kreiner et al. | | 709/203 |
| 2003/0074222 A1 * | 4/2003 | Rosow et al. | | 705/2 |
| 2003/0125998 A1 * | 7/2003 | McKenney et al. | | 705/7 |
| 2004/0236639 A1 * | 11/2004 | Candadai et al. | | 705/27 |
| 2005/0165616 A1 * | 7/2005 | Ellis et al. | | 705/1 |
| 2005/0203892 A1 * | 9/2005 | Wesley et al. | | 707/3 |
| 2005/0251405 A1 * | 11/2005 | Kreiner et al. | | 705/1 |
| 2005/0265256 A1 * | 12/2005 | Delaney | | 370/254 |
| 2009/0174547 A1 * | 7/2009 | Greene et al. | | 340/539.13 |
| 2009/0259717 A1 * | 10/2009 | Kreiner et al. | | 709/203 |

OTHER PUBLICATIONS

PCT/US2006/008116 International Search Report dated Aug. 3, 2006.
Dana Doolan, Groove Workspace 2.5 Detailed Evaluation Paper, May 2003, pp. 1-11, Software Productivity Consortium.

* cited by examiner

*Primary Examiner* — Wing F Chan
*Assistant Examiner* — Kostas Katsikis
(74) *Attorney, Agent, or Firm* — Daly, Crowley, Mofford & Durkee, LLP

(57) ABSTRACT

A portable electronic command board includes a computer for inputting incident data, a database for storing incident data locally within the computer and a wireless interface, connected to the computer, to connect the computer with another computer to replicate the database on the other computer to provide a collaborative workspace environment. Furthermore a touch screen is provided to input the incident data in a manner similar to drawing on a white board.

27 Claims, 40 Drawing Sheets

| Patient # | 3 |
| --- | --- |
| Name | Gregory Williams |
| Age | 77 |
| Sex | Male |
| Triaged as | Green |
| Location | EN-ROUTE TO HOSPITAL |
| Hospital | Group Health - Central |
| City | Seattle |
| Transported by | AMBULANCE104 |
| Left at | 19:56 |

History:
- 19:22:51 Pt# 3 evaluated by Triage as Green
- 19:22:51 Pt# 3 at TREATMENT- GREEN
- 19:54:06 Pt# 3 Name: UNKNOWN
- 19:54:06 Pt# 3 Sex: MALE
- 19:54:06 Pt# 3 Inj: Chest
- 19:54:06 Pt# 3 Glasgow: 14
- 19:54:06 Pt# 3 Treatment: MULTIPLE IV'S All "Named" Patients:
- Gregory Williams
- Helen Smith
- John Miller
- Kenny Trotters
- Mary Smith Close | Print folder that contains background images and
data shared through the browser tab.

.wb file, which contains serialized
data of the user's state

.index file that points to
the user's current .wb file.

INCIDENT COMMAND SYSTEM

CROSS-REFERENCE TO RELATED APPLICATIONS

This application claims priority to provisional application Ser. No. 60/658,223, titled "INCIDENT COMMAND SYSTEM", filed Mar. 3, 2005, which is incorporated herein in its entirety.

FIELD OF THE INVENTION

This invention relates generally to incident command systems and more particularly to a system to manage responders, resources, tactics and strategies of emergency incidents collaboratively using wireless and wired communication equipment.

BACKGROUND OF THE INVENTION

It is common practice to deploy first responders to a remote location in response to an emergency or incident. In recent years, such incidents have included natural disasters, peace keeping missions, attacks by terrorists and deployments in support of the global war on terrorism. A common problem among first responders is to capture accurate and current information to the command center and then provide such accurate and current information to the responder on the ground responding to the incident.

Incident commanders require numerous tools to assist them with managing an incident. Effective incident command is critical to both effective firefighting and the safety of personnel who work in any hazardous environment. Incident Command tracks firefighters and EMS personnel working at inherently chaotic emergency incidents. Fire ground commanders communicate strategy and track their resources typically with a manual magnetic board. Although, laptop computers, software applications, wireless data and voice communications technologies are utilized, such resources are typically implemented in stand alone systems and information from such systems are then communicated to the incident command cell and tracked using the manual magnetic board.

SUMMARY OF THE INVENTION

In accordance with the present invention, a portable electronic command board includes a computer for entering incident data, data structures for organizing and representing data using computer memory, and file structures for storing incident data locally within the computer and a network interface, to connect the computer with other computers to replicate the data for shared use among the computers. Communication among the computers can be through a router or in an ad hoc mode. Furthermore a touch screen is provided to input the incident data in a manner similar to drawing on a white board. Furthermore, software is provided that enables an incident commander and his team to manage an incident and its resources collaboratively with one or more computers, including business logic to enforce data integrity and eliminate single points of failure. With such an arrangement, immediate information can be provided and tracked by an incident commander to assist in coordinating and managing responders and resources.

In accordance with a further aspect of the present invention, an incident command system includes a command post having a computer to store incident data; and a portable electronic command board having a computer for inputting the incident data, data structures and file systems for storing incident data locally within the computer, a network interface to enable the computer to connect to other computers so that data can be shared by users within the incident, and collaborative incident command software that enables an incident commander and his team to manage an incident and its resources. With such an arrangement, current needed information can be provided to the command center and responding forces in a real time manner.

BRIEF DESCRIPTION OF THE DRAWINGS

The foregoing features of this invention, as well as the invention itself, may be more fully understood from the following description of the drawings in which:

FIG. 9 is a screen shot showing patient tracking information according to the invention;

FIG. 10 is a screen shot showing all patient tracking information according to the invention;

FIG. 20 is a screen shot showing the organization of the incident workspace;

FIG. 34 is a screen shot showing information about a sector;

FIG. 35 is a screen shot showing information on a unit;

FIG. 36 is a screen shot showing roll call information;

FIG. 37 is a screen shot of an events log screen;

DETAILED DESCRIPTION OF THE INVENTION

Figure 1:
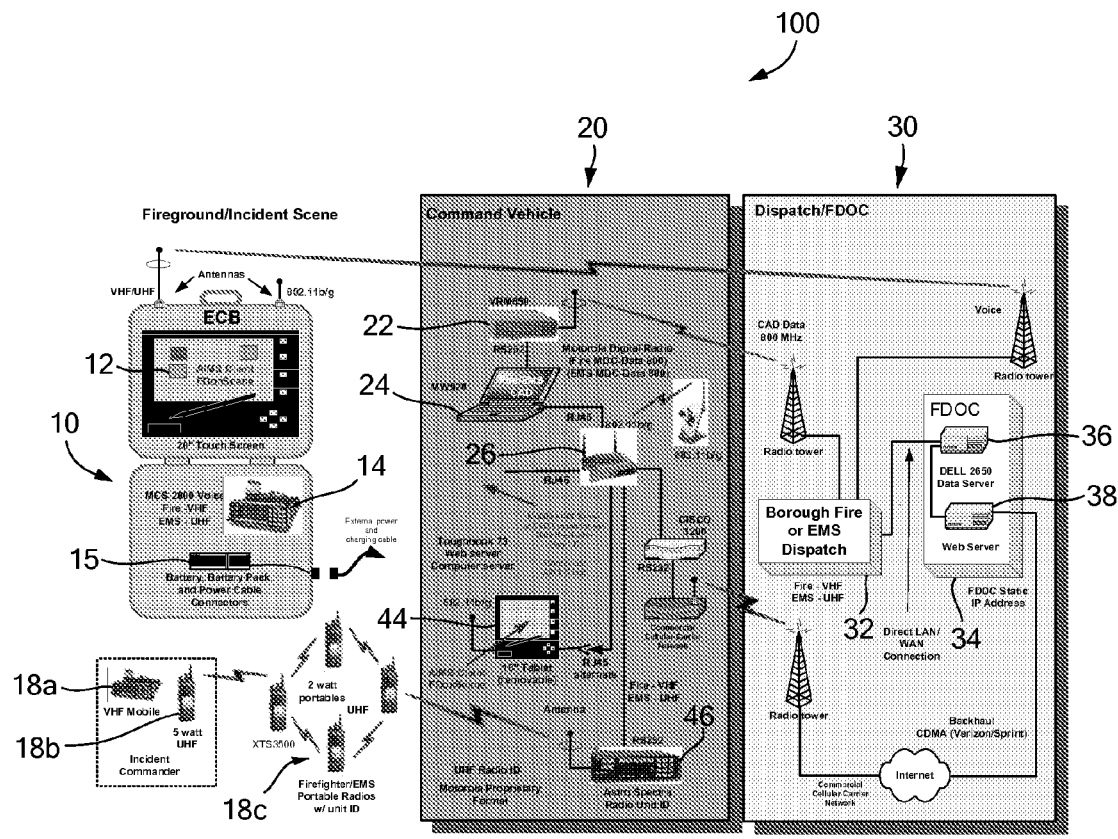
FIG. 1 is a pictorial diagram of an incident command system according to the invention.

The present invention provides a First Responder incident management capability tailored for fire department and emergency medical service use. An incident command system is used at single- and multi-alarm emergencies to coordinate and manage responders and resources. Existing incident command software does not scale to handle multi-alarm emergencies, where, due to the number of units responding, multiple commanders need to collaborate to manage the responders and duties. Our invention provides a technique for utilizing existing incident command systems into multi-user systems, or for providing a multi-user software application developed with respect to the national incident management system to include multi-user sharing of data through data sharing folders and conveying information using a graphical user interface whiteboard while using a software daemon to monitor a heartbeat for knowing which users are in range and members of the same incident. Although the invention is explained in context of a fire department, such as the New York Fire Department (FDNY), it should be appreciated such a system can be implemented to manage any type of incident to which first responders are deployed.

An electronic command board (ECB) according to the present invention includes connecting with an incident command and incident coordination system that provides incident scene management and personnel safety. A large touch screen display embedded in a specially developed ruggedized case can be used to track the assignment of units by sector, floor or function. Similarly a notebook or tablet computer with a touch screen display that is equipped with incident command software can be used. Units in staging may be easily moved to tactical assignments by physically moving an icon with one's finger. Timers are associated with the icon to monitor firefighter deployment, breathing air and rehab time. Building diagrams and manipulatable maps are used as resources to develop tactics. A personnel location interface is included so that the Incident Commander will know who is arriving on scene. The ECB may be used in a vehicle or removed to establish a remote command post. Within the range of a wireless local area network, the ECB will communicate with a vehicle mounted router connected to an in-vehicle computer, which in turn, will communicate over wireless wide area network to a Data Center and a Fire Department Operation Center (FDOC). The FDOC will monitor ECB activity and the Data Center will record ECB data for later analysis.

If multiple levels of command are established, multiple ECBs will communicate with one another through a local area network (LAN) emanating from an on-scene wireless router over a data network. The incident commander and sector commanders may communicate either by voice radio included with the ECB or via text messaging. Thus, the ECB is both a communications unit and an information source for managing emergency incidents. It should be appreciated that a ECB can be mounted in command vehicles, for example, one of EMS and one for fire to effectively respond to incidents such as structure fire, high rise fire, hazardous materials incident and a multi-casualty incident. Firefighting is an inherently dangerous profession. Where normal citizens are running from a burning building, firemen are rushing in. Having positive command and control and situational awareness is crucial to an Incident Commander so that informed decision making can take place.

A Portable Command Post must be able to organize information and communications so that the Incident Commander may effectively direct the incident's strategy and tactics, and to track responding and deployed resources. The latter is critical. Emergency incidents often place public safety personnel in environments that are Immediately Dangerous to Life and Health (IDLH), so the necessity of tracking emergency personnel is a matter of life safety. As typically practiced, by using dry erase markers and magnetic identifiers, Incident Commanders are able to diagram an incident scene and place the magnetic unit identifiers according to their assignment. Non-active sectors such as REHAB or STAGING are identified on reserved areas of the command board, and the unit identifiers are moved in and out of these areas corresponding to the movement of crews in and out of the sectors. Such a system has certain deficiencies. First, the manual command board processes incident information locally without any back up capability or data capture. Secondly, there is no redundancy in the event the single command board is compromised. Third, there is no ability to record the event proceedings for quality control or post incident training. The Fire Department Incident Command System (ICS) is the recognized standard for managing firefighting and other fire/rescue emergency incidents. It is a standardized process to determine the scope of the emergency, to develop an appropriate mitigation strategy, to deploy and track departmental resources, to coordinate with assisting agencies and to provide a focal point of intra- and inter-incident communications. To effectively command an emergency incident, the Incident Commander requires a coordinated and systematic method to process incoming information and to communicate instructions. Incident scenes are chaotic, and the flow of communications and information can easily overwhelm the Incident Command Post resulting in missed communications and lost units.

The Incident Command System (ICS) is a flexible system that expands or contracts as needed to match the scope of a dynamic incident. Units are assigned to functional or geographic "sectors" to carry out tasks in support of the incident strategy. The incident scene is defined by geographic attributes such as building sides, quadrants, floors and exposures. Unit assignments may be made by function (such as rescue or ventilation), or by geographic assignment (such as floor fifteen or side two exposure). The system includes a wireless LAN for local transport of data between the portable ECB and the vehicular based computer. For backhaul communications, a commercial wireless data service can be used or a municipality can deploy its own wireless network. An Electronic Command Board (ECB) includes a FieldSoft, or alternatively, FitNotes software application. In general, any incident command system can be used, with certain provisos as described herein. Both FieldSoft and FitNotes offer the ability to record unit locations and status. FieldSoft and FitNotes are user customizable for creating specialized units and status. Specialized units may be mutual aid units or command staff from allied agencies. The Fire Emergency Command Board can be equipped with an MCS2000 VHF mobile radio and the EMS Emergency Command Board can be equipped with an MCS2000 UHF mobile radio to be compatible with existing communication systems. For example, the Fire ECB includes a 25 to 30 watt VHF radio and the EMS version includes a 25 to 30 watt UHF radio. The ECB System improves safety by promoting accountability of personnel, efficient use of resources and tactical planning.

Referring now to FIG. 1, a pictorial diagram is shown of an incident command system 100 according to the invention including an Electronic Command Board (ECB) 10, a command vehicle 20 and an operation center 30, here a dispatch/fire department operation center. The operation center 30 includes a dispatch facility 32 and an operation center 34 which may be optionally collocated and connected by a LAN/WAN network. Located within the operation center 34 is a data server 36 and a web server 38. The web server 38 is connected to the Internet as well as to a commercial cellular carrier network to connect remote users such as the command vehicle 20 to the operation center Web server 38. The dispatch facility 32 also includes a VHF radio and a UHF radio to communicate with remote users.

The command vehicle 20 includes a digital radio 22 which is capable of communicating with the dispatch facility 32 over a VHF radio network or a UHF radio network. The digital radio 22 is connected to a computer 24 which is also connected a data hub 26. The data hub 26 includes wired LAN connections as well as wireless access connection. The data hub 26 may be provided, for example, by a Linksys wireless router. A wireless personal data assistant (PDA) 28 may be connected to the data hub 26 using the wireless access connection. The data hub 26 is also connected to a router 40, for example a CISCO 3200 router, which is in turn connected to a commercial cellular carrier network transceiver 42 to connect the command vehicle 20 to the Internet and web server 38. The command vehicle 20 further includes a computer 44 which can be connected to the data hub 26 using the wireless access connection or a wired connection. The computer 44 is here a Toughbook notebook computer as described in more detail hereinafter. The command vehicle 20 still further includes a UHF radio unit 46 which is capable of connecting with the data hub 26 and which can communicate with UHF handheld radios operated by personnel in the field. For the in-vehicle processor or computer 44, the Panasonic Toughbook 73, a high performance ruggedized PC based on an Intel Pentium 1.6 GHz mobile processor can be utilized. It features a 13" TFT Active Matrix Color LCD with Touch Screen. It also includes the Windows XP Professional operating system, a 40 GB hard drive, and a combination DVD-ROM/CD-RW drive. It has an integrated Wireless network controller based on the Intel Pro/Wireless 2100 chipset supporting 802-11b protocols. There is a slot for upgrading communications, video, etc.

The ECB 10 includes a touch screen computer 12, a radio 14 for voice communications to the dispatch facility 32 such as a Motorola MCS2000 (VHF or UHF). The ECB 10 also includes a radio 16 (FIG. 2) for reception and decoding of Unit ID's such as a Motorola ASTRO Spectra. The ECB 10 includes fireground equipment connectivity using 802.11 (local WLAN) access as well as wide area connectivity using commercial CDMA (or other wireless network protocol). In a preferred embodiment, provisions for utilizing FDNY's MDT radio system (800 MHZ) is also provided. The latter provides a system and technique for communicating among the incident scene using the ECB 10 with the command vehicle 20 and the operation center 30. Typically, the Incident Commander will also be carrying a VHF radio 18a or UHF radio 18b to communicate with others to include personnel in the field also having radios 18c.

Figure 2:
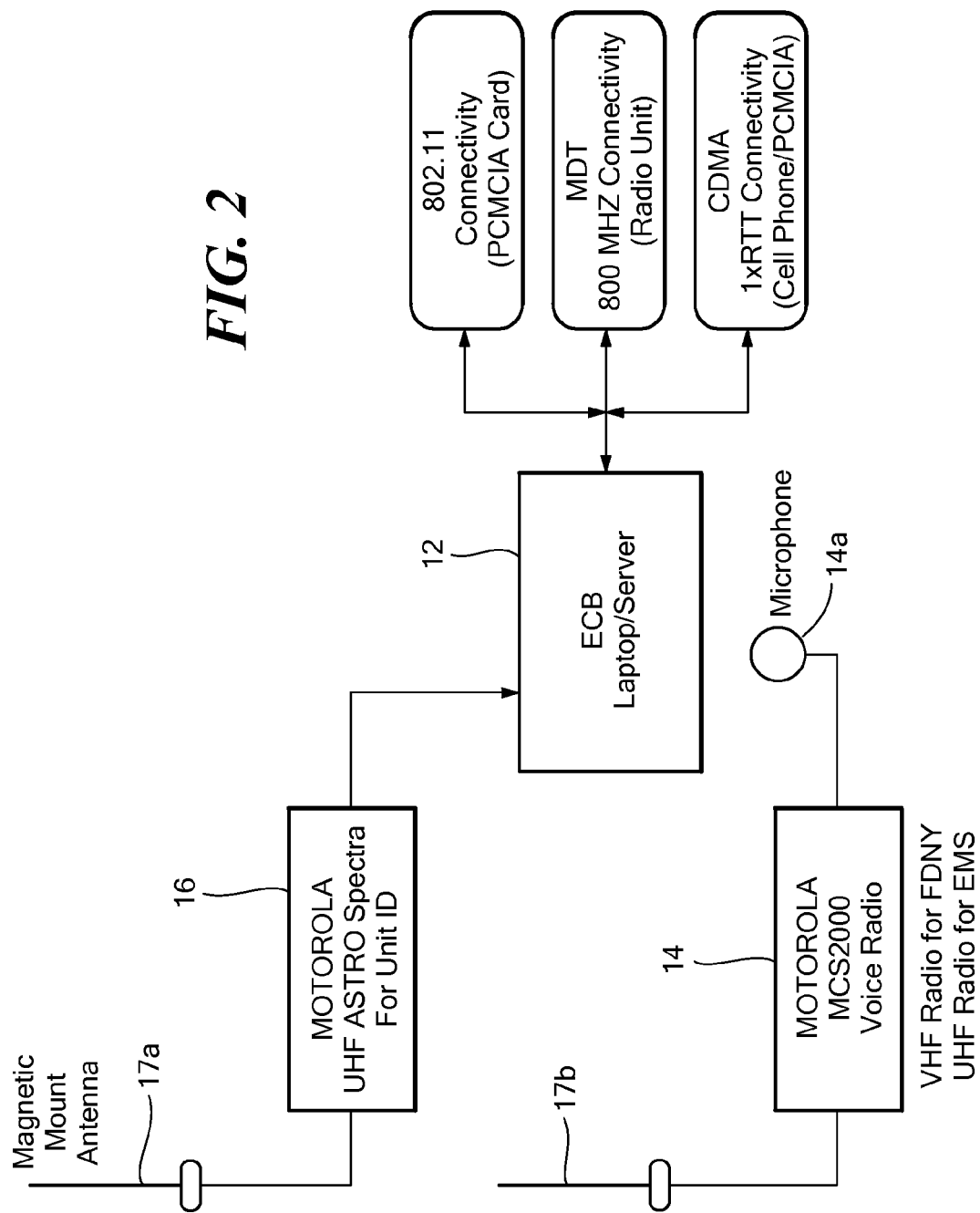
FIG. 2 is a block diagram of an electronic command board according to the invention.

Referring now also to FIG. 2, a block diagram of the ECB 10 is shown to include the touch screen computer 12 connected to the radio 16 as well as having connection using either 802.11 protocol, MDT 800 MHz connectivity or commercial CDMA cellular connectivity or the like. Also included is the radio 14 with a microphone 14a for voice communications to the dispatch facility 32 (FIG. 1). A magnetic mount antenna 17a is provided to use with the radio 16. A magnetic mount antenna 17b is provided to use with the radio 14.

Numerous ruggedized solutions were evaluated for the Portable ECB's primary display unit. As described further hereinbelow in connection with Table 1, various options or configurations were implemented to provide the ECB 10. Suffice to say now, for ECB options (1) and (3), an Argon 20" ruggedized laptop with glare resistant and sunlight readable touch screen display is utilized. The Argon display is mounted in the lid of a Pelican case. The Argon was selected as a fully integrated alternative, and it can be removed from the Pelican case and used as a standalone unit. The Argon laptop option includes dual SCSI controllers with 80 GB mirrored disks and a high performance video controller. A glare panel is provided as part of the ECB 10. This unit is provided within a ruggedized case. For options (2) and (4), a CyberResearch 21" touch screen display mounted in the lid of the Pelican case is utilized, driven by a Panasonic Toughbook 18 ruggedized tablet-based PC with touch screen display. The CyberResearch 21's display is glare resistant and sunlight readable. The Toughbook 18 includes an integrated video display card, based on the Intel Extreme Graphics II, featuring a 2d and 3d acceleration graphics controller. A glare panel/weather shield is provided as part of the ECB that will assist readability. There are several major advantages to this hardware configuration. This solution offers significantly lower cost, by approximately 50% of the cost of the Argon solution, because the Argon and the other 20" display units evaluated are "militarized" in addition to being ruggedized. Since the Toughbook 18's display controller can operate in dual mode, it is possible to use the 20" display and the Toughbook display concurrently, and finally since the Toughbook and the CyberResearch 20 are separate units, the Toughbook can also be used as a backup for the CyberResearch unit if necessary. A fully formatted field replaceable 40 GB drive is included, which will be stored in the ECB case. In the event of a disk failure, the replacement drive can be quickly installed, and the data, which is frequently saved on the in-vehicle processor, can be loaded on to the replacement drive as operations continue.

For the secondary processor, a ruggedized tablet-based PC is utilized such as a Panasonic Toughbook 18 and a 900 MHz CPU within a Full Magnesium alloy case, featuring a 10.4" touchscreen with anti-reflective, outdoor-viewable TFT active matrix color LCD. Alternatively, a Motorola ML900 mobile laptop with a 1.7 GHz CPU, a Scribe Tablet PC, which is a rugged PC operating at 700 MHz and includes a 10.4" TFT active matrix with touchscreen or a Revolution Revo-106xt tablet PC based on the 1.06 GHz CPU can be used.

The ECB 10 is self-contained within a Pelican 1660 case. The size of the case facilitates operation with the lid in the opened position from within the rear of the command vehicle. Since it includes an internal battery, it can also operate outside of the vehicle and will function for a minimum of three hours of continuous operation. A pair of cooling fans has been designed into the power distribution system so as to minimize heat build up from the power generating components. The Pelican 1660 comes with a retractable handle and wheels to facilitate easy storage and transportation.

A power distribution system 15 is included within the case that features a self-sensing electrical interconnect into the case that allows it to be powered either internally via a rechargeable 12 volt DC battery source, or externally, via a 12 volt DC source, from the command vehicle power source or 120 volt 60 Hz AC sources. The distribution system includes a rechargeable battery, a battery charger, battery status monitor, AC charger, and DC converter.

A Pelican 1660 case for the ECB is engineered to securely mount and protect all of the components within. The case contains a non-conductive vent. The lid will be unlatched for normal operation and must be unlatched if the charger is in use. The lid of the case will house a storage area and the primary display. The lower area of the case contains the radios and power distribution components on the left side (towards the wheels) and the secondary ECB display tablet on the right hand side. The displays of the primary and secondary devices will be aligned. The board will be hinged and the area underneath the board will be available for storage.

The ECB 10 includes the installation of the radio 14, here a Motorola MCS 2000 UHF Radio in the lower portion of the case for the EMS version. Battery and alternate power sources are provided, as well as a BNC antenna connection and a microphone holder clip. An ECB interface is provided that can accept data from predefined sources, parse the data and either display it on its own logical screen within the ECB 10 or pass it to the incident command application through its API. The source would need to first register with the ECB interface in order to identify which display widget to use, as well as to establish the mapping of the source's data content to the widget's required parameters. Sometimes a new widget will need to be added to the ECB display widget set, which will require adding new code to the ECB display driver. This can be facilitated by using Java 2 Enterprise Edition (J2EE) technology and tools, including JAXP for XML processing and JAX-RPC for remote procedure calls. The advantage of using XML whenever possible is that with a rich enough widget set, no source code changes or software updates are required to add a new data source.

The ECB 10 includes two levels of wireless (data) connectivity. First, a local wireless LAN utilizing 802.11g technology, operating at a nominal 10 mbps data rate. This links the ECB 10, secondary "tablet/laptop" computer 24, and the computer 44 in the command vehicle 20. In order to provide for interference-free communications, it is recommended that this link transition to licensed frequencies as they become available (e.g., recently-announced 4.9 GHz Public Safety spectrum allotment). Second, a wireless data connection, utilizing commercial CDMA cellular service to provide connectivity between the mobile computer 44 and the operation center 30, for example the FDNY Data Center and FDOC. Note 1xRTT CDMA Wireless Data Service is currently provided by Verizon Wireless and Sprint PCS. A subscription to the selected service will be required for each in-vehicle computer 44. Throughput with CDMA service will be in the 60-100 kbps range, with further speed enhancements in the near future. Alternative wireless transport could be provided by means of GPRS which has a 115 kbps advertised packet data throughput (available through AT&T Wireless, Cingular and T-Mobile). The mobile computer will be capable of archiving all data for later download in the event that a wireless connection cannot be made at the scene.

IEEE 802.11-based computing components is provided for each workstation. All of the COTS-based systems feature Intel Centrino components that are IEEE 802.11b/g-based. The infrastructure wireless access point will be IEEE 802.11 b and g so that any g-based workstation or adapter added in the future would be able to transparently interoperate with existing units. CDMA public data access Wide Area Network (WAN) will be connected via the router 40. Provisions are also available to connect the existing Motorola MDT device to the in-vehicle Cisco 3220 router 40. The Cisco 3220 router 40 is provided as an in-vehicle asset that will act as a bridge to outside-of-the-fireground Wide Area Networks. Each ECB workstation is able to interconnect to fireground local area network for autonomous operation. Each wireless access point is configured with a specific SSID and 128-bit WEP keys. These SSIDs and WEP keys will also be configured for each wireless adapter. Therefore, if additional ECB's are deployed to the same fireground, they will be able to connect to the initially deployed in-vehicle processor wireless access point. Connectivity to the backhaul and public CDMA Wide Area Networks through the in-vehicle Cisco router 40 will provide access to appropriate applications such as Email. The underlying networking protocols in the Cisco router 40 and the wireless access point 26 will provide the connectivity between Local Area Network functionality and Wide Area Network functionality. All cryptographic components such as the Cisco 3220 router 40 is provided with the triple Data Encryption Standard (3DES) encryption algorithm enabled.

Both the Cisco router 40 and the Linksys access point/ gateway or data hub 26 support network address translation. At the fireground, the IEEE 802.11 devices will be issued private, non-routable IP addresses. IP addresses are assigned by the Linksys access point/gateway Dynamic Host Client Protocol (DHCP) server provided by the data hub 26. Any properly configured primary or secondary ECB workstation that arrives at the fireground will be able to communicate with the other workstations using this private address space. Connections to devices outside of the fireground will assume the external address assigned to the Linksys access point/gateway 26. The Cisco router 40 also supports network address translation. However, there are so few hosts on the in-vehicle Ethernet segment that static addressing will make the maintenance of the Cisco IOS rules significantly easier. Note that through rules set up at the Cisco router, the hosts on the Cisco network and the IEEE 802.11 network will be able to access the backhaul network to the FDOC or the cellular-based Wide Area Network connection.

Both the Cisco router 40 and the Linksys access point/ gateway 26 include a stateful packet inspection (SPI) firewall. Both components are configured to limit the incoming (to ECB/fireground) sessions to the minimum required. Outgoing sessions are not limited unless there is a compelling reason to do so. If desired, the Cisco 3220 can be configured to enable all connections from the fireground to the backhaul network or the cellular-based Wide Area Network to be authenticated using Cisco TACACS+. Changing the default SSID is an absolute must. A single SSID is used by all the Access Points so that intercommunication between Access Points can be accomplished. Traffic congestion is minimized by each ECB being assigned a different channel.

The Incident Commander may assign a Chief as a deployed resource. An assigned Chief may be a sector of the overall incident tracked by the Incident Commander. The assigned sector chief may use his/her ECB 10 to manage a sector.

It should now be appreciated that the ECB 10 used within the Incident Command System 100 is an integrated voice/data communications and information management system. Contained in a Pelican case, the Portable Electronic Command Board includes a large touch screen computer with an integrated 802.11g wireless networking card. A second processor, a rugged laptop with its own integrated 802.11 wireless network card will act as a removable tablet to be taken to tactical command locations and can be used as a sector command post. Both processors are loaded with command software. The unit includes a voice radio for long haul communications and a power pack and battery for independent operations.

An alternative embodiment is a vehicle unit 20. The vehicle unit includes a 802.11 router/access point, a Cisco router for back haul wireless network protocol, a wireless network receiver, a stationary network server housing the command server application and a data radio for decoding UHF radio identification. The vehicle unit may also house a radio modem for CAD data.

Various embodiments may be implemented as shown in Table 1. For example, Options (1) and (3) feature MilSpec 810.F-regulation 20" displays, while options (2) and (4) substitute less-expensive ruggedized displays powered by 810.F Toughbook 18s. Options (1) and (2) feature software solutions centered on the FieldSoft Incident Command application while Options (3) and (4) provide solutions based on the Fit-Notes Incident Command application. Hence, each primary hardware configuration is paired with each software package.

FieldSoft and Fit-Notes can be written instead of using the commercially available software.

A graphical user interface is provided to display data from a variety of sources and allow for the integration of future requirements as they become required. One set of graphical user interfaces (GUIs) are implemented that can be used with both the FieldSoft and the Fit-Notes software applications. A team collaboration software package known as Groove Workspace from Groove Networks (http://www.groove.net) is utilized to provide the ability to share and synchronize data across the incident scene. Using the Groove Networks' Groove Workspace product as a backend for secure peer to peer data sharing, our invention creates a truly multi-user environment. Through APIs available by existing commercial incident command systems, events such as allocation and movement of resources are recorded. All clients are preconfigured with Groove and a shared workspace. To create an incident, our invention creates a top level folder within Groove that has the incident information. Other clients are able to join this incident or create new ones, and events for each incident are transferred by writing data to the respective folders. All clients who have joined the specific incident receive the new data and our system updates the other clients' incident command software using the API. Time is synchronized on all clients (for example, through a universal time daemon). Conflicts are eliminated by using timestamps issued by Groove (more recent events take precedence). A heartbeat is also used to allow the user to know who has joined the incident and who has not. In an 802.11 wireless environment the heartbeat also notifies users once other clients are in or out of range. If a user falls out of range, his events are automatically merged and updated with all other events once

TABLE 1

| | | Portable ECB | | | |
| | In-vehicle | Primary | | | Application |
| Option # | Processor | Display | Computer | Secondary | Suite |
| --- | --- | --- | --- | --- | --- |
| 1 | Panasonic Toughbook 73 | Argon 20" | | Panasonic Toughbook 18 | FieldSoft |
| 2 | Panasonic Toughbook 73 | Cyberresearch 21.3" | Panasonic Toughbook 18 | Motorola ML900 | FieldSoft |
| 3 | Panasonic Toughbook 73 | Argon 20" | | Scribe Tablet | Fit-Notes |
| 4 | Panasonic Toughbook 73 | Cyberresearch 21.3" | Panasonic Toughbook 18 | Revolution: revo-106xt | Fit-Notes |

The Electronic Command Board 10 serves to integrate data from numerous sources so that the Incident Commander and his officers can best manage their resources while ensuring the safety of their responders. For the incident command application, two alternative software applications may be used: FieldSoft and Fit-Notes. Each of these software applications provides easy-to-use software for managing incident command to include: configuration, resource management (responders, units, sectors), responder accountability, situation awareness (pre-planning, white boarding, CAD, radio communications), report logging, and information management (data archiving and retrieval). For the various features included, the capabilities of FieldSoft and Fit-Notes will each be discussed. It should be appreciated that, alternatively, new software to provide the functionality and features provided by connectivity is reestablished. All use of Groove is through the backend, and is invisible to the user.

Multi User Enabler

Figure 2A:
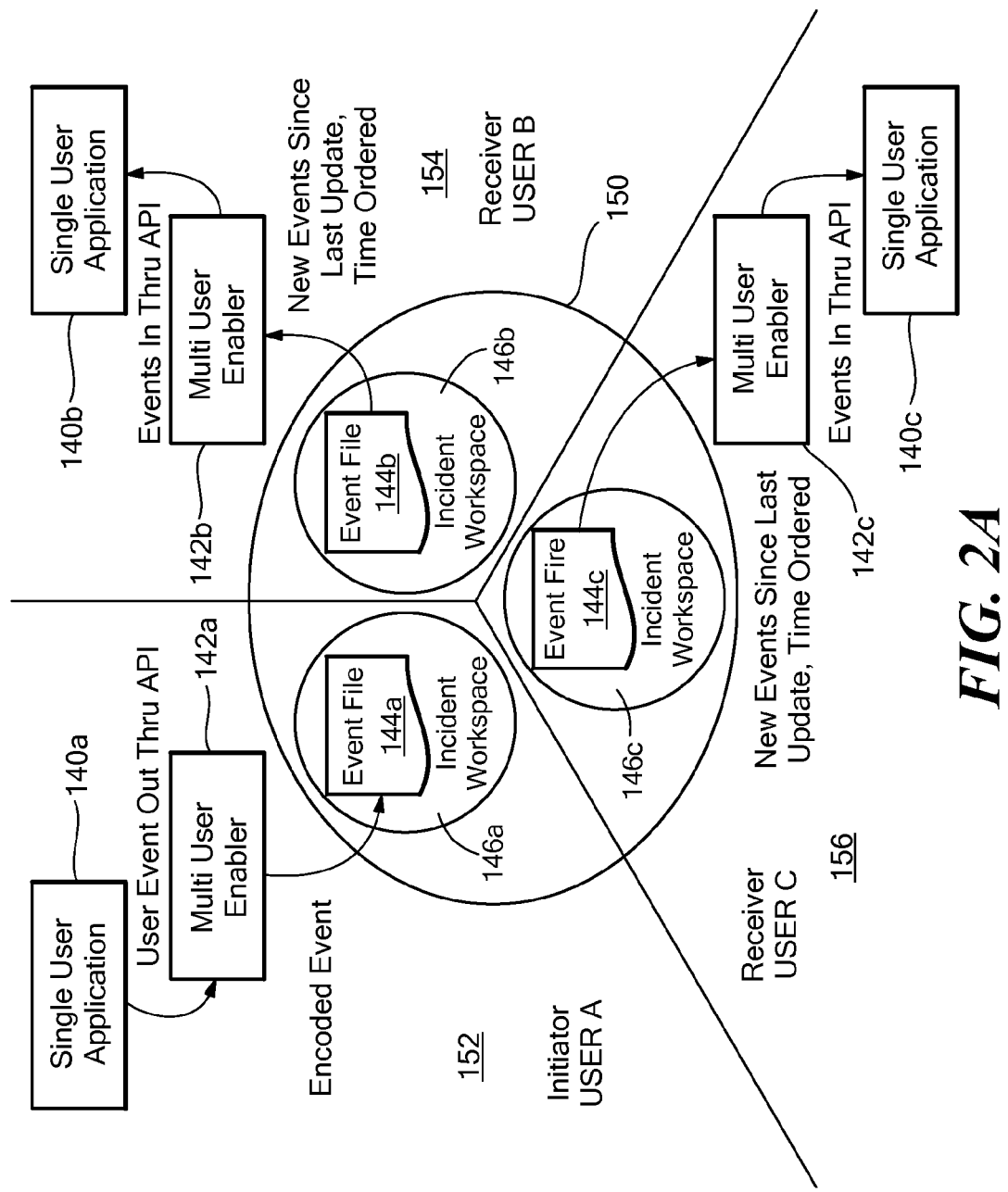
FIG. 2A is a pictorial diagram of how a single user application can be made to work in a collaborative manner according to the invention.

In order to create a multi-user collaborative application from a single user application, it is sufficient that the single user application have an Application Programmer Interface (API) that publishes every significant event generated through the single user application, as well as API calls for receiving and acting on similar events. Specifically, for every event that can be generated by the single user application, there needs to be a corresponding event for causing the occurrence of the event on another instance of the single user application. For example, if User A creates a sector named "Staging", then the event "Created Sector Staging" can be generated from User A's application. To cause this event to occur on other instances of the application, the event "Create Sector Staging" needs to be furnished to the API and acted upon by the application. Referring to FIG. 2A, a Multi User Enabler such as Multi User Enabler 142a is responsible for mapping the generated event to the corresponding causal event.

As shown in FIG. 2A, a dark oval center represents a shared collaborative workspace 150, as implemented through the use of an application such as Groove, for instance. Any change to any user's incident workspace 146a, 146b, and 146c is automatically mirrored to all other clients. As shown, here the collaboration includes User A 152, User B 154 and User C 156, each having a single user application 140a, 140b, 140c respectively and a Multi User Enabler 142a, 142b, 142c, respectively. Any change or update to an event file 144, i.e. 144a, 144b or 144c triggers the Multi User Enabler 142a, or alternatively 142b or 142c to process in order all events not previously processed for this user, i.e User A or alternatively User B or User C, respectively. The Multi User Enabler 142a maps each generated event to the appropriate causal event and invokes the corresponding API call within this client's Single User Application 140a. In turn, the user's screen is updated to reflect a change generated by the initiator.

In particular, different applications that have each implemented the same general functionality can interact, each generating and acting on events in their own manner. Specifically, Fit-Notes and FieldSoft could be used within the same incident to represent situational awareness, while another application altogether different could provide an Emergency Operation Center view of the incident.

FieldSoft Incident Command Application

Figure 3:
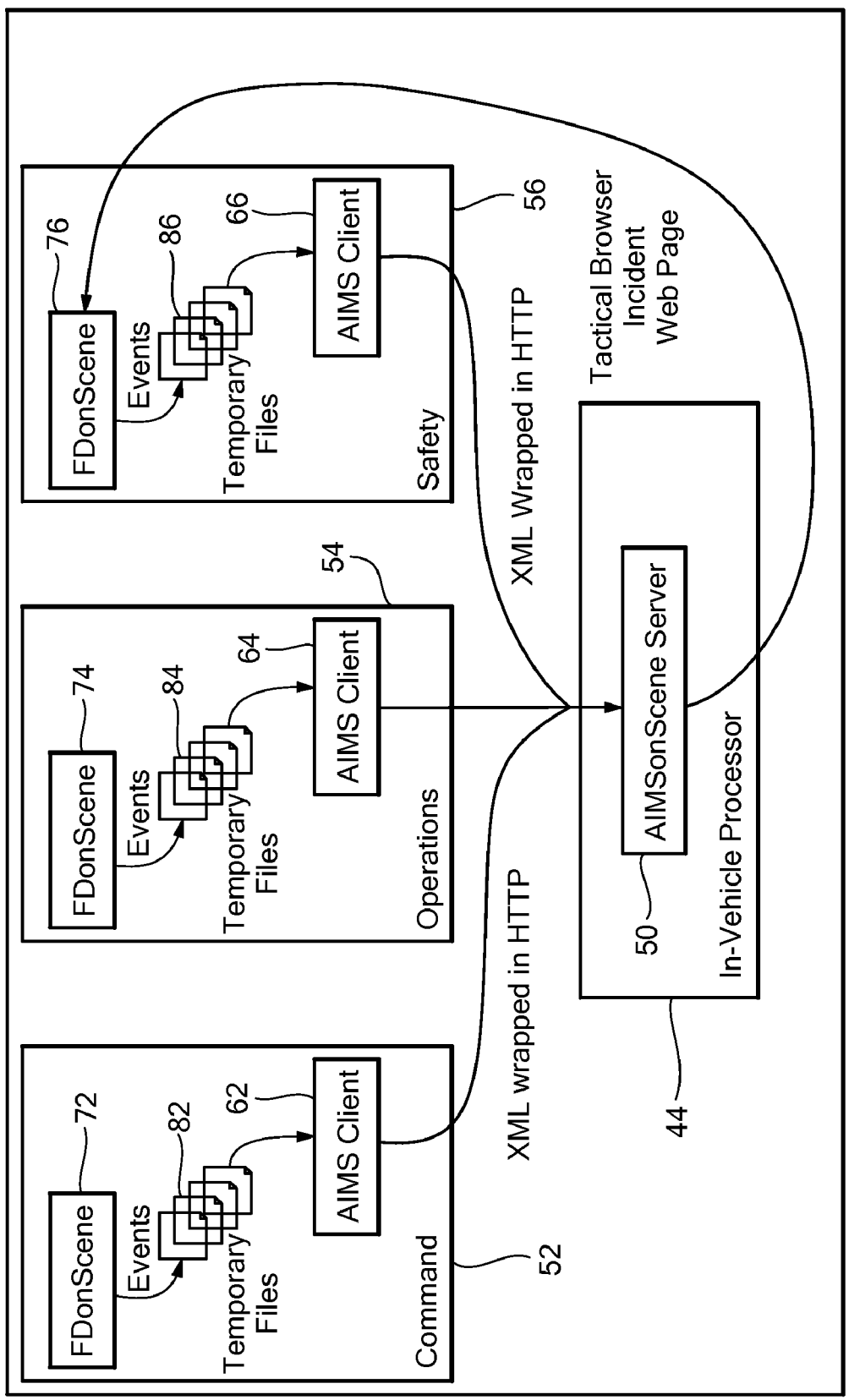
FIG. 3 is a pictorial diagram of information flow according to the invention.

The software architecture for the FieldSoft (http://www-.fieldsoft.com) embodiment for Options (1) and (2) is shown in FIG. 3. The basic single user incident command application from FieldSoft is FDonScene 2.5. Multi-user capability is provided through FieldSoft's AIMSonScene Client 1.1 and AIMSonScene Server 1.1. The AIMSonScene client software 62, 64, 66 runs on every machine concurrent with the FDonScene application 72, 74, 76. The AIMSonScene client collects each event entered through FDonScene, and relays the event to the AIMSonScene Server 50. The AIMSonScene Server 50 runs on the in-vehicle Toughbook 73, i.e. computer 44, collecting events from the AIMSonScene clients, and providing a browsable web page for showing information about the incident. A user at a machine running the AIMSonScene Client can access the AIMSonScene Server web page through FDonScene's "Tactical Info" screen.

Referring to FIG. 3, a example of FieldSoft's software architecture for multi-user Incident Command is shown. Three users in the same incident work group, shown as Command 52, Operations 54, and Safety 56, each independently run FDonScene concurrently with the AIMSonScene Client on their portable ECB's. The events from a given FDonScene instance are written into a series of temporary files 82, 84, 86. The AIMS Client converts these events into XML strings embedded in an HTTP request, which is sent through TCP/IP to the AIMSonScene Server 50. Any user in the incident work group can view events collected for their incident through FDonScene's Tactical Browser. It is important to note that the AIMSonScene Server 50 does not generally push events from one client to the other active clients on scene. A change in fire fighting strategy is broadcast to all clients, and messages and assignments are relayed from one client to another as specified by the requesting client. All other information is held at the AIMSonScene Server 50, and a user must explicitly switch to the "Tactical Info" screen to find information from the other clients at this incident.

FieldSoft provides an easy-to-use TCP/IP-based application-programming interface (API) to their FDonScene application. This API is used to provide a graphical user interface with the same look-and-feel as the whiteboard on an existing Portable Command Board. Thus, any creation of sectors or movement of units on the whiteboard will be automatically mirrored within the FDonScene application, and vice-a-versa.

Fit-Notes Incident Command Application

An alternative embodiment is using Fit-Notes (http://www.fit-notes.com) Incident Command application as the basis for the software solution for Options (3) and (4). Fit-Notes 4.30 is a stand-alone single-user application designed explicitly for on-scene incident command. Fit-Notes also includes a mass casualty incident patient tracking module, suitable for use by EMS personnel. Fit-Notes does not provide any pre-fire planning capability, although it can display images prepared through third party vendors. FireZone 7.2 can be used for pre-fire planning and First Look Pro 2.0 for organizing and retrieving the plans, both COTS packages are from CAD Zone in Beaverton, Oreg. (http://www.cadzone.com).

Figure 4:
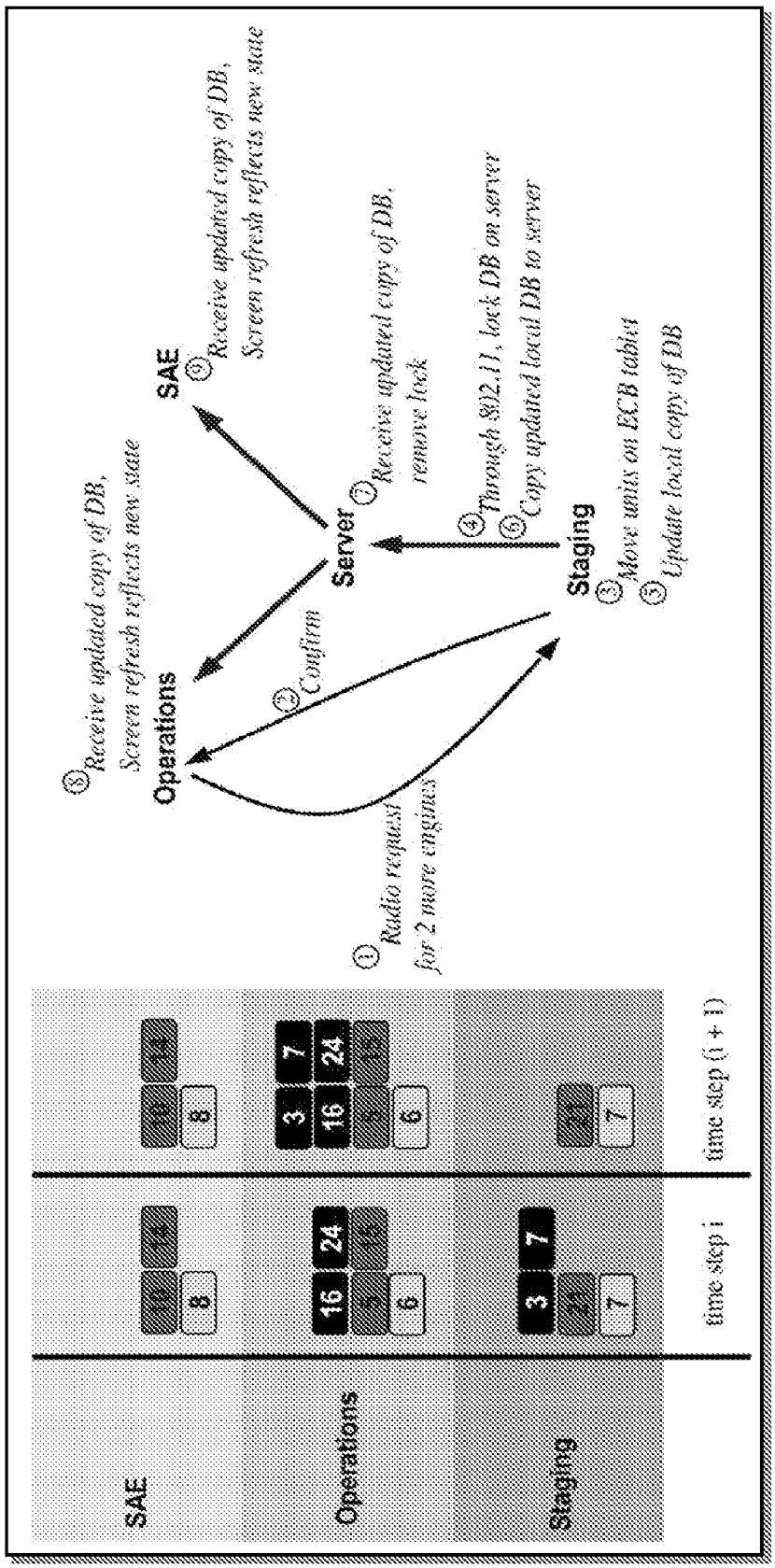
FIG. 4 is another pictorial diagram of information flow according to the invention.

Fit-Notes now has a multi-user version of their application. Fit-Notes 5.0 will retain the look and feel of the existing Fit-Notes application, while providing an easy-to-use API that enables others to integrate information from Fit-Notes into their own applications or graphical user interfaces. A multi-user software architecture for Fit-Notes 5.0 is shown in FIG. 4. Referring now to FIG. 4, an example of the multi-user feature using Fit-Notes 5.0 is shown. During an incident, deployment of units to Staging, Operations and Search and Evacuate (SAE) result in the configuration shown as time step i. (1) and (2): Radio communications first establishes the Operations Post request to Staging for two additional engines. (3): Using the Fit-Notes display on a secondary ECB tablet, staging moves Engines 3 and 7 into the Operations Sector. (4): The multi-user version of Fit-Notes running on the Staging tablet requests a lock on the master database to stop others from modifying it while this change is propagated to all users. (5) and (6): Provided the lock is granted by the Server, the local copy of the database is updated on the Staging ECB tablet, and then the Groove-computed delta is sent wirelessly through 802.11b/g to the ECB Server. (7): The ECB Server receives the new version of the database, which upon receipt becomes the master database. The Server then removes the lock on the updated database so that additional updates from clients can occur. (8) and (9): Groove sends the database delta to the remaining clients, updates their databases, and displays a notification to allow the user to refresh the screen due to the changes.

Use of Groove Workspaces for Collaborative Sharing of Information

Command cells require the reception, sharing and integration of information from different data sources so that users within the same workspace at the fireground scene can become aware of this data once it is acquired. Groove Workspace from Groove Networks provides a secure, efficient solution for sharing data at the fireground scene. Groove Workspace is a software application that enables building team collaborative software applications and to synchronize incident command data on each user's machine. A workspace in the form of a computer directory (or folder) is created and placed on each user's machine. Anytime a user belonging to the workspace creates or updates a file within this space, the Groove-based solution ensures that all other members receive updates to their copies of the file on their machines. To ensure efficient performance, Groove transmits and applies only that data required to update an older file to the current version.

Groove refers to this as a 'delta' between the older and newer version of the file. Groove quickly computes the delta, uses compression to reduce the amount of data to be transmitted, and then sends and applies the delta to the appropriate file within the workspace on a user's machine. There is no restriction on the type of file, as Groove treats all files as binary files. Underlying these capabilities is Groove's use of public key technology for strong member authentication, data privacy and data integrity using standard cryptographic algorithms. Groove uses the Advanced Encryption Standard as published by the National Institute of Standards and Technology (NIST). Users cannot join a workspace unless they are invited in. The invitation itself is encrypted, as is all data within the workspace.

Groove's security features and efficient methods for ensuring all workspace members have the most up-to-date versions of files within their shared space for providing information sharing among members both at the fireground and at FDOC. Groove's framework is easy to use, so integrating new data sources as future requirements are levied is straightforward. Finally, by adding FDOC clients to the Groove workspace, all data generated at the fireground scene is automatically copied to the FDOC, provided a network connection is available. The FDOC can monitor the incident in near real time by using the same applications as in use at the fireground scene. If connection to the FDOC is not made until after the incident is over, then Groove still handles transferring the files within the workspace to the directory location used by the FDOC.

Features of the system include wireless co-share of information among different ECBs, Fire and EMS personnel location tracking, GIS mapping components, Building status, Hospital capabilities, and Areas of ICS. Additional features of the system include Fire and EMS CAD information, Firefighter radio I.D.'s and emergency I.D.'s, Firefighter biometrics, Live video feeds, Mass casualty/patient tracking, and Hospital locations relative to incident. "Building status" and "hospital capabilities" both provide data whose structure is a collection of facts, where each fact consists of a number of known fields and values. The graphical widget for displaying "building status" is abstracted to also handle "hospital capabilities." Some features are dependent on other features, e.g., GIS mapping features are necessary before hospital locations relative to an incident can be easily found and displayed. On the other hand, "Fire and EMS personnel location tracking" is grouped with "GIS mapping components" so that data for demonstrating the correctness of the GIS capability can be shown.

The following features of the incident command system 100 should be noted. Configuration: items related to the ability of the agency to configure the incident command application with their own terminology, procedures, and set of resources. Incident command: requirements for core incident response issues involving managing responders, resources and key events. Accountability: functionality necessary for ensuring the safety and accountability of responders at an incident. Report generation: items discussing necessary logging and report generation. Radio interfacing: requirements for interfacing radio data to the ECB. Pre-planning: functionality for providing the ability to create, index and retrieve pre-fire and EMS plans for use with the ECB. Data Management: issues related to managing data useful to the ECB, including organizing ancillary data sets, interacting with file systems, system recovery, and archiving incident data.

Figure 5A:
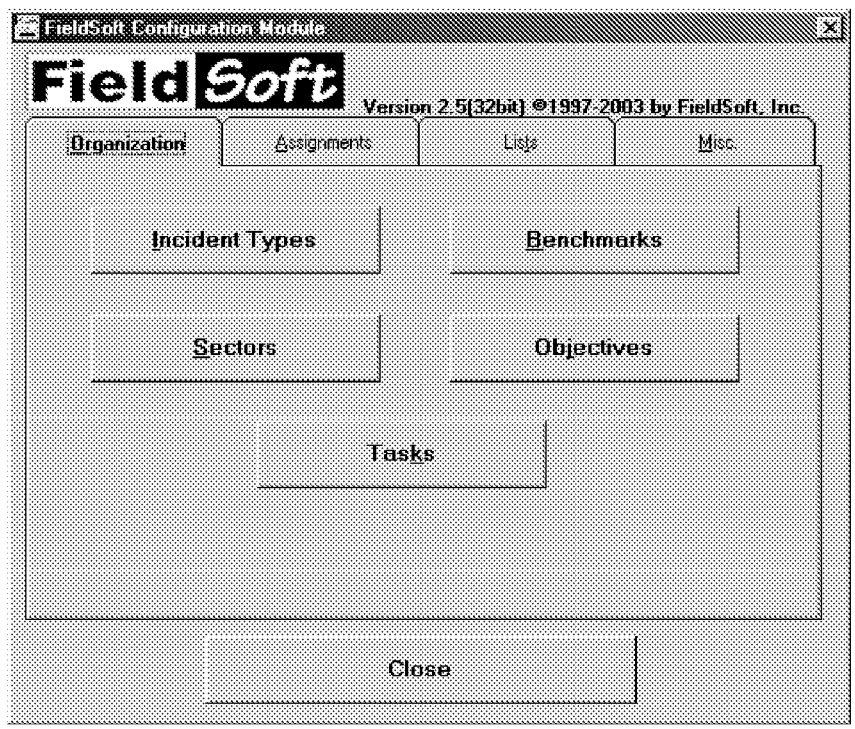
FIG. 5A is a screen shot of FieldSoft software application.
Figure 5B:
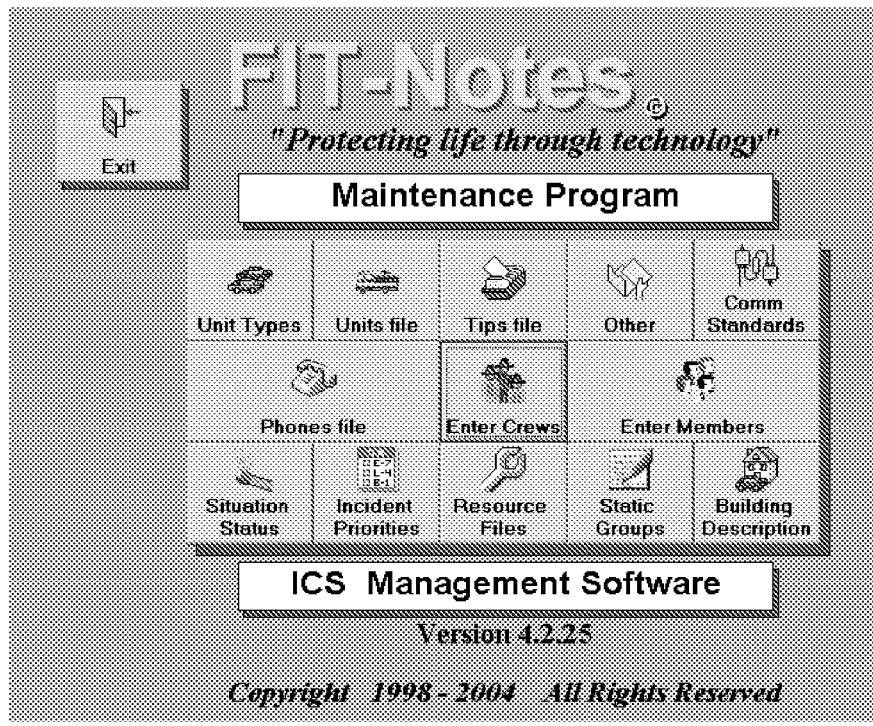
FIG. 5B is a screen shot of Fit-Notes software application.

Both FieldSoft and Fit-Notes provide screens for configuring their applications to match their end-user needs. FIG. 5A shows the top-level main screen for FieldSoft and FIG. 5B shows the top-level main screen for Fit-Notes for configuring their applications to match FDNY standard terminology and operating procedures. Selecting a tab produces further options for customization.

FieldSoft

A set of incident types can be defined in FieldSoft's FDonScene application. For each incident type, a set of objectives, benchmarks and tasks can be established, along with a list of sector names normally associated with the incident type. By selecting the incident type at the start of an actual incident, all the preconfigured information applicable to that type is automatically loaded into FDonScene. Accomplished objectives, benchmarks and tasks are written to the log file maintained for the incident by FDonScene. Rosters, units, shifts and their crews can be entered through the configuration screen. Unit types can also be created and configured, along with a list of units associated with a given type. A color can also be assigned to all units of a particular unit type, using a set of red, green, blue sliders to create the color. FDonScene also allows units to be associated with run cards. By selecting a run card upon initialization, the associated units are automatically loaded into an incident. A strategy timer and a personnel accountability report timer can both be configured independently to trigger periodically on specified time intervals. Other items that can be configured through FDonScene include radio channels, address components, strategy names and colors, and the default computer drive to use for transferring files to an alternate device, such as a floppy, CD, or zip drive.

Fit-Notes

Fit-Notes allows for the inclusion of customizable "Field Tips." Under the subject title for each field tip, a list of steps or contacts can be associated. During an incident, a particular field tip can be retrieved to assist the operator of the ECB. The information listed for a given field tip can serve as a checklist of tasks to be accomplished, however, no logging of the tips is done. Field tips are best used to tailor Fit-Notes for FDNY's procedures and resources. A single list of Incident Objectives can be customized. During an incident, each objective can be assigned to a unit and checked off once completed. The completion of an objective from this list is entered into the log of time-stamped events. Another informational customization provided by Fit-Notes allows the ECB user to store and retrieve points-of-contact (POC) for locating experts or suppliers related to a given resource. A variety of information can be entered for each POC, including a description of their main service or resource, address, name, phone numbers (daytime, after hours, cellular, pager, fax), specifics on establishing a purchase order, and other special information. Any number of resources can be entered, and for each resource, any number of POCs can be provided. A Roll-call timer can be configured to trigger periodically every specified number of minutes. Fit-Notes also allows for customization of a telephone index, crews, shifts (and names for shifts and work locations used in the department), ranks and their order, radio frequencies and channels, and building construction choices.

Incident Command

FieldSoft

FDonScene has been designed to allow an on-scene incident commander the ability to oversee individual resources, responders, and key events associated with up to two subordinate levels, in accordance with the incident command system model. The interface is graphically-driven, allowing entry through a touchscreen display. The primary screen for tracking the sectors and units assigned to those areas is the Organization Chart, as follows. The Organization Chart allows units to be moved between sectors, or swapped with fresh units.

Figure 6:
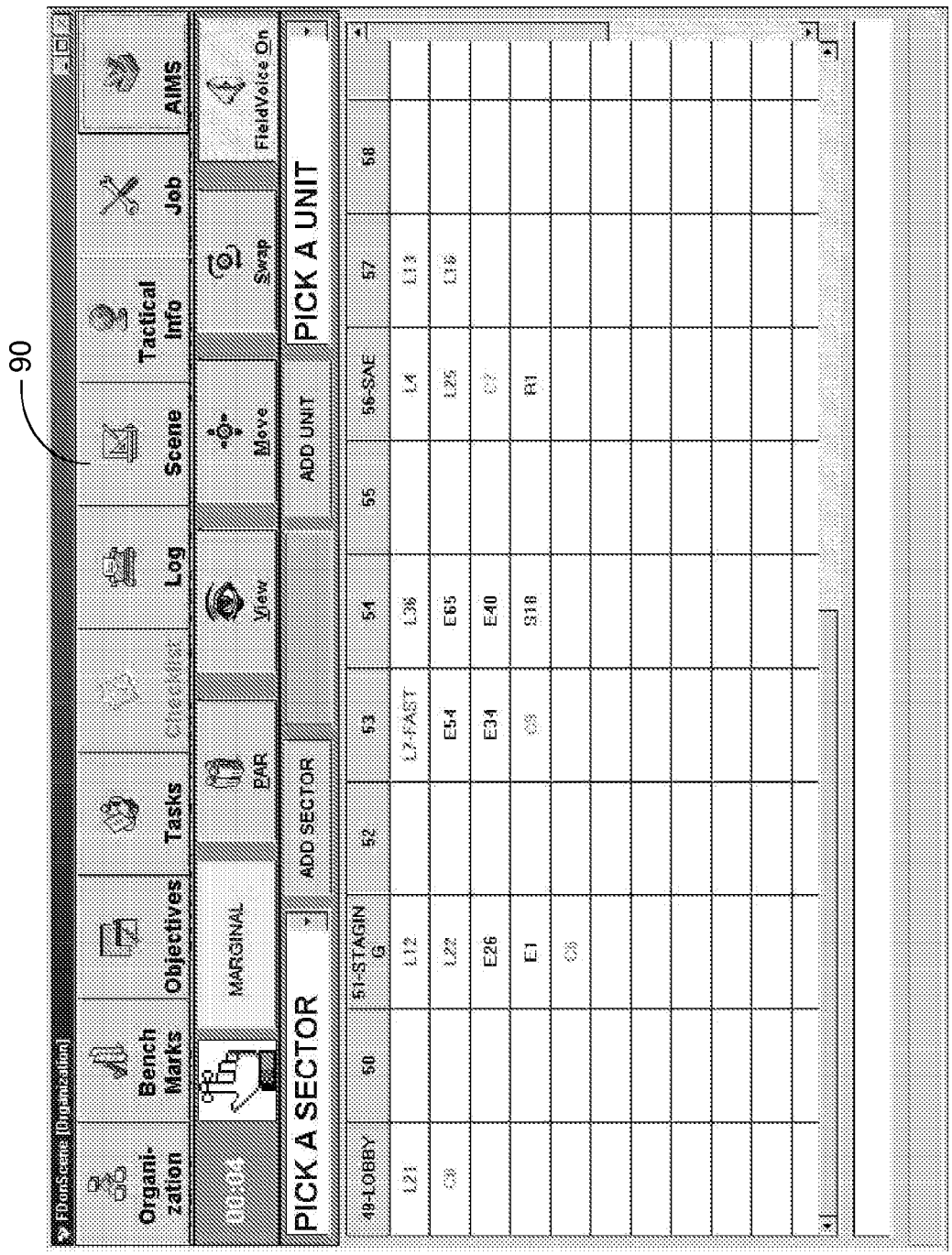
FIG. 6 is a screen shot showing an organizational chart for managing sectors and assigned units.

Referring now to FIG. 6, the Organization Chart is the primary screen for managing sectors and assigned units within FieldSoft's FDonScene incident command software. The "Scene" button 90 in the top row allows one to view and mark-up images with different color electronic ink and a set of icons—however, none of the manipulations done on the scene view are reflected on the Organization Chart, and vice-a-versa. There are numerous timers. One timer provides automatic audible and visual alerts for conducting personnel accountability reports. Another timer reminds the incident commander to review the fire strategy periodically. Other timers track the amount of time on scene, or can be used to associate a timer with an individual unit. Finally, a general timer is available for establishing an alert with a message entered on-scene after an established amount of time elapses. When the general timer expires, the specific message entered by the user is displayed on the FDonScene screen.

FDonScene was developed for single-user mode. FieldSoft has added its AIMSonScene products to provide initial multi-user capability. Currently, all FDonScene sessions are treated as clients whose contents are forwarded to an AIMSonScene server. Users use a web browser (referred to as a "Tactical Browser" and accessed through the "Tactical Info" button on the FDonScene display) to view a web-page version of events received by the server from the various clients on scene. FDonScene provides screens for assigning and tracking benchmarks, objectives, and tasks, for entering time-stamped notes, and for reviewing and printing reports while the incident is in progress. The "Scene" mode allows the user to retrieve and mark up images with different colored electronic ink, and incident-related icons and symbology. Although the "Scene" screen allows units to be selected and dragged onto selected images, there is no tie between manipulations done on this screen and the Organization Chart screen. This is potentially problematic, because unless a unit is placed in a sector on the Organization Chart, this information is not logged or relayed to the AIMSonScene server. Thus, as is, FDonScene's image mark ups are better used for developing plans, than for assigning units to sectors. However, we have developed and implemented a purely graphical user interface that ties the Organization Chart with a graphical view of the sectors and units at the fireground scene as to be described hereinbelow in the Whiteboard discussion.

Fit-Notes

Fit-Notes is based on the established Incident Command System, providing the on-scene incident commander the ability to oversee individual resources, personnel, and key events associated with up to two subordinate levels. An incident is created through Fit-Notes by first naming it, and then selecting the responding units from a screen that groups these units by type. Engines, ladders, officers, medical responders and even mutual aid companies can be selected. Next, the Overview Screen is displayed, which is one of the two main screens used throughout the incident. Through the Overview Screen, a North Arrow is established, along with active exposures and the number of floors (including basements) in the structure. A building shape can be chosen at this time.

A "Building Collapse" timer is displayed on the left-hand side of the Overview Screen, displaying a colored square box for every minute elapsed in offensive strategy mode. The default display for this timer is five green boxes, five yellow boxes, and five red boxes, totaling 15 minutes. This timer can be set from 10 to 30 minutes through the Configuration screen. The collapse timer is deactivated when a switch to defensive strategy occurs. The Overview Screen also shows those sectors that have personnel in them. Any time a unit is moved to a hazardous area, such as an interior sector, a timer is automatically activated. Each of these sectors is color-coded based on how long units have been within a hazardous region. A sector's color always reflects the unit that has been in that sector the longest. It is easy to see simply by looking at this screen if any crews need to be rotated out.

Figure 7:
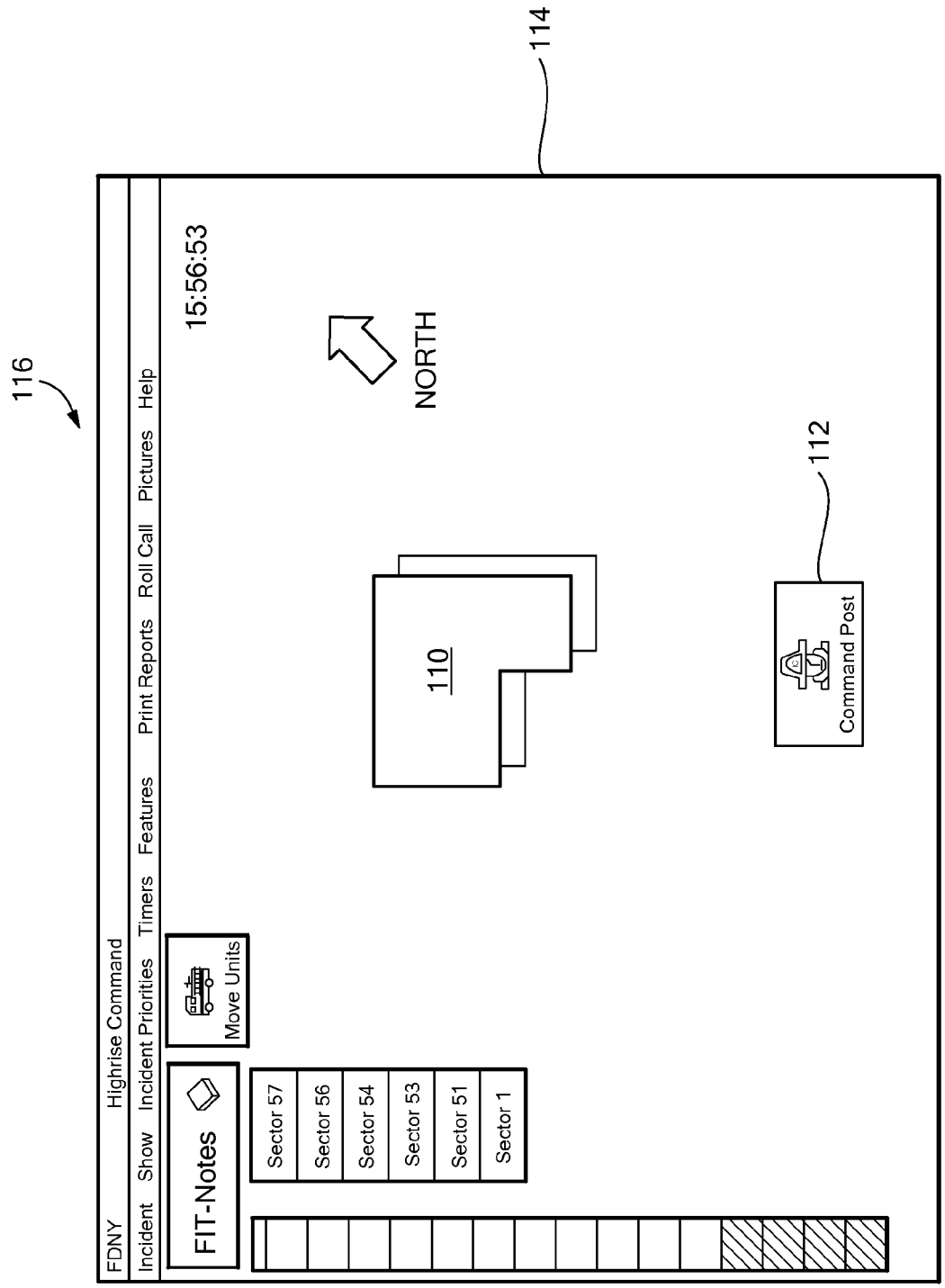
FIG. 7 is screen shot showing an overview screen to display building footprints, exposures and other situational awareness information according to the invention.

Referring now to FIG. 7, a Fit-Notes Overview Screen is shown that displays the building footprint 110, exposures, location of Command 112, and a North arrow 114, along with a critical countdown 116 for how long an offensive strategy has been in effect, and a color-coded set of sectors 118 containing personnel information.

Figure 8:
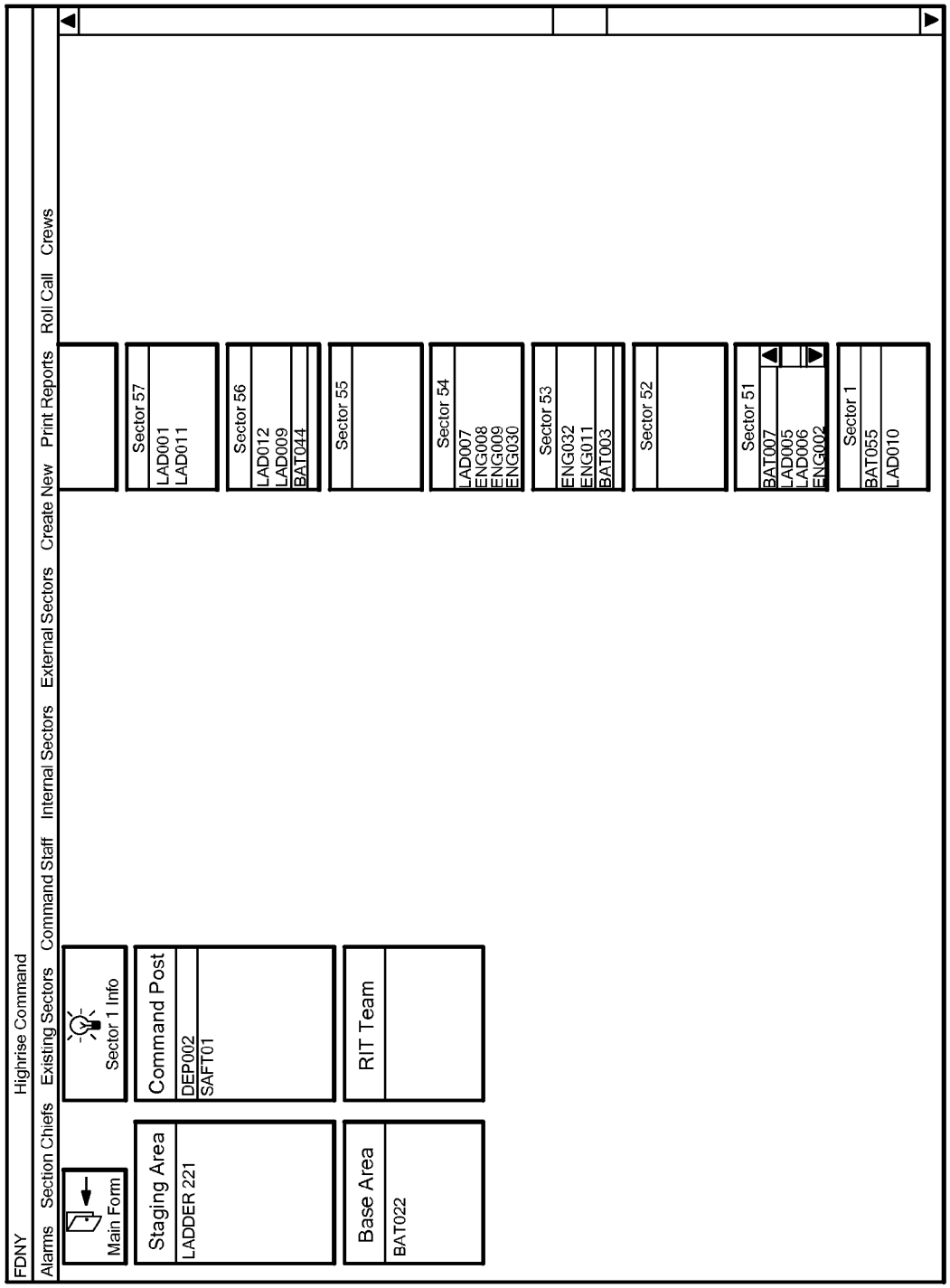
FIG. 8 is another screen shot showing situational awareness information according to the invention.

The user then switches to the Sector View screen, as shown in FIG. 8. This screen allows units to be moved around the fireground scene, and allows access to ancillary data, such as images, benchmarks, field tips and resource lists. As shown in FIG. 8, a highrise incident as captured using Fit-Notes. Fit-Notes relies on two main screens to display the fireground. The screen shown here provides a few of the unit deployment into sectors.

All interactions with Fit-Notes are predominantly through the display's touchscreen. Time-stamped notes can be added to the incident report log at any time, requiring the use of the keypad. Units are moved into a sector by clicking on the unit, and then clicking on the chosen sector. Fit-Notes has the user verify the action prior to moving the unit, requiring another click. Fit-Notes can store and retrieve extensive communication information, including two radio channels and two phone numbers for each identified location. Fit-Notes also includes a telephone register, with phone numbers, fax numbers, radio channels and call signs.

Figure 9:
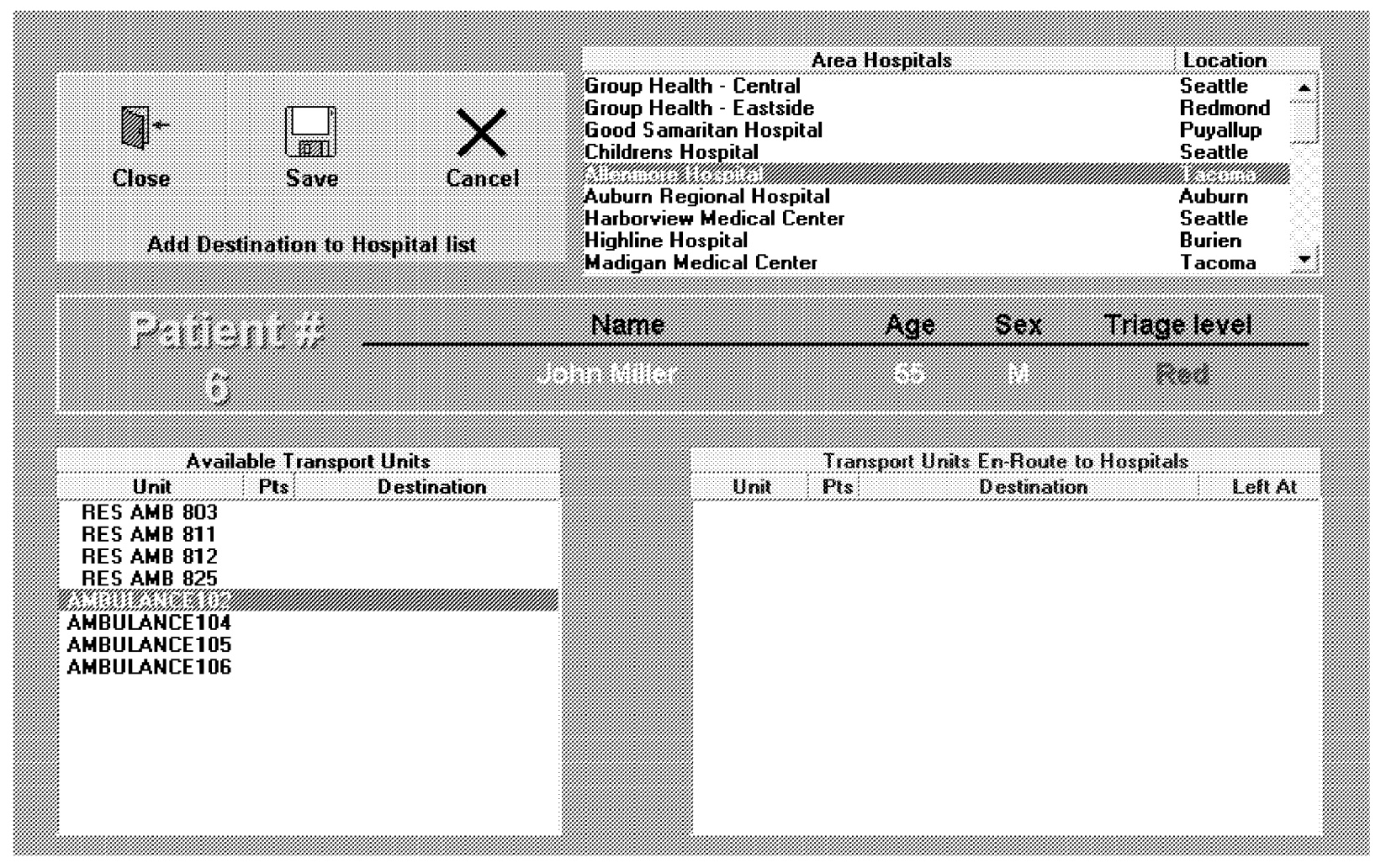

Provided radio ID information is known, Fit-Notes provides a locator module to search off a radio ID, a person's name, or a part of a person's name to find all matches. Once a location is found, the unit timer provides how long the person has been in a hazardous sector, allowing Command to estimate how much air remains in the person's tank, for instance. A Mass Casualty Incident (MCI) patient tracking system is built into Fit-Notes. After entering the patient's name, all other interaction can be done with the touchscreen. The MCI system can track patients from the time they are identified until they are at a hospital. Hospital locations can be preloaded into MCI system. FIG. 9 shows a Fit-Notes Patient Tracking screen, used to select transportation for a specific patient to a local hospital. Hospitals are pre-loaded into MCI, and new destinations can be added during an incident, as may be necessary if a local church or school were used to treat the walking wounded patients. The bottom right pane would show any units that have already left the incident and are en-route to hospitals. FIG. 10 shows a patient screen showing all the patients. Data for the selected patient is displayed, including pertinent entries in the time-stamped log. The data for this patient can be printed at the scene, or written to a file and emailed provided network connection is available.

Whiteboard

The incident command application is graphically-driven as much as possible and has a familiar look-and-feel similar to an existing magnetic Portable Command Board. An interface is provided that lets users sketch the fireground scene and sector locations. Units available at the scene can be moved into a sector with a simple touch to select, touch to position motion.

A Whiteboard provides a faster, simpler and better method for creating and populating sectors than any other paper-based or incident command software interface available. To create a sector or assign a unit in FDonScene requires a minimum of three clicks and accompanying screen updates per item. Using the Whiteboard, a user of an ECB 10 can draw a sector or assign a unit to a sector with one fluid motion of the operator's finger tip.

Figure 11:
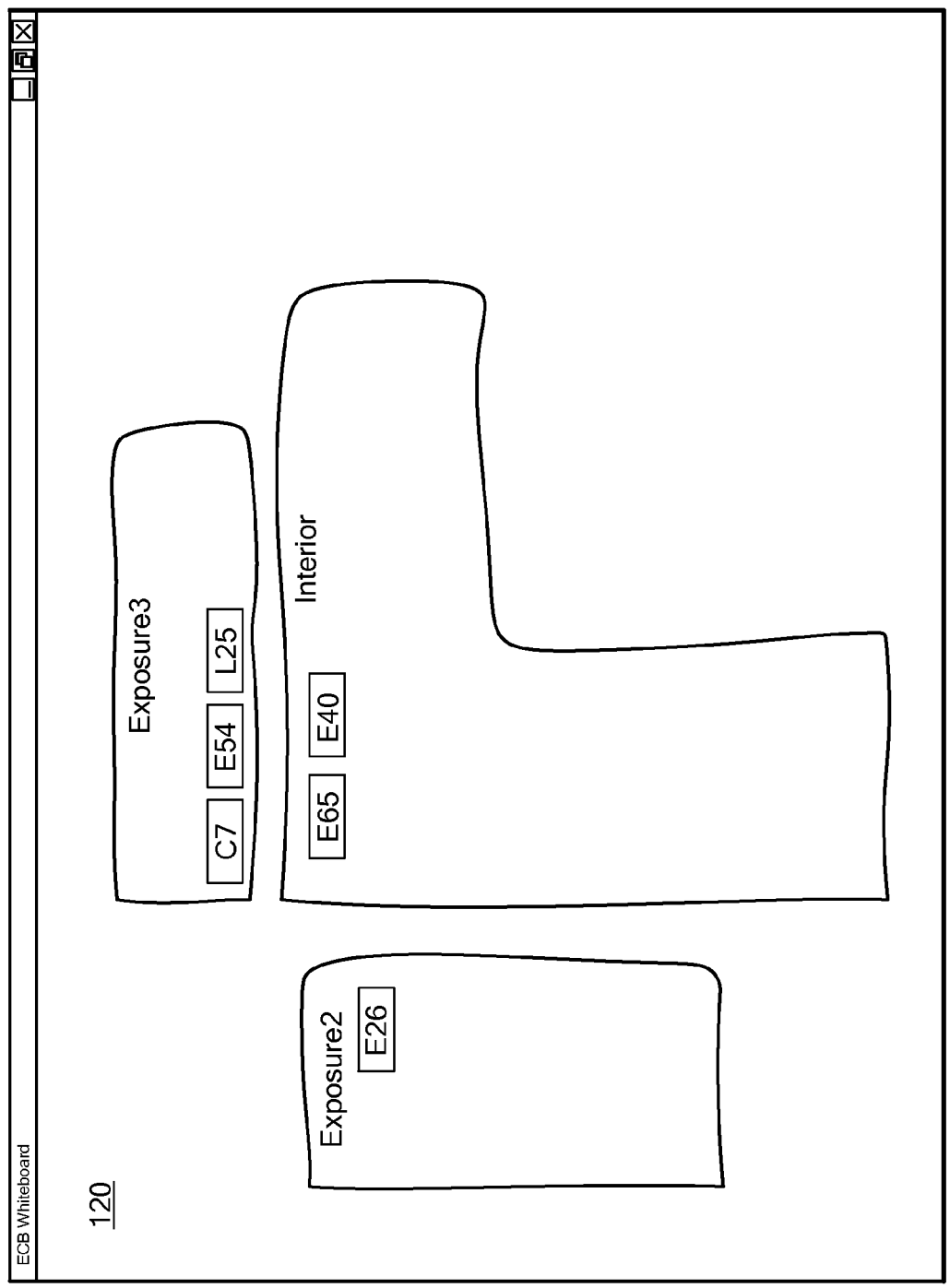
FIG. 11 is a screen shot showing a whiteboard to provide a graphical view of a fireground scene according to the invention.

Referring now to FIG. 11, a Whiteboard 120 is shown that interacts with the incident command application to provide a graphical view of the fireground scene. The interface automatically updates the FDonScene Organization Chart, and requires no clicking of buttons (as is necessary using the FDonScene Organization Chart screen). Likewise, any entries made at the FDonScene Organization Chart are automatically updated on the Whiteboard graphical user interface. Additionally, when used in concert with the AIMS client/server applications, any manipulations performed on the whiteboard that are supported by FDonScene are sent to the AIMSonScene server so as to be accessible to the other clients through the FDonScene Tactical Browser. This powerful addition to the ECB can be used such that the primary display shows the FDonScene Organization Chart while the secondary tablet display shows the Whiteboard. Used in this manner, the look-and-feel of the existing Portable Command Board is captured and incorporated into the ECB design. The Whiteboard offers the ability to freehand sketch the fireground scene and sector locations as shown in FIG. 11. Additionally, widgets specific to other typical situations facing FDNY, such as high rise fires, tax-payer fires, and non fireproof multiple dwelling incidents can be used. For example, FIG. 11 shows an interface showing a segment of spatial data. Small thumbnail views on the right panel can be enlisted to help establish location by orienting the user with respect to broader features shown on the smaller scale maps.

Unlike other collaborative whiteboard applications commercially available, the ECB Whiteboard enforces rules and ownership for data integrity purposes within the incident command domain. All resources (i.e. sectors, units, etc.) have owners who have unique interaction permissions. For instance, only the owner of a unit can move the unit from a sector to another sector. If User A moves a unit into a sector that User B owns, the ownership of the unit is now passed to User B and permissions are automatically updated. The same scenario is possible with sectors and any other resources the application includes. This assures that all users at the incident will have both the same view and data, eliminating any confusion of the state and status of resources and people.

Permissions and ownership are enforced to help assure the integrity of data and prevent any contradictory information, but at certain times these rules could prevent a user from doing his job. For instance if an owner of a unit is unable to move a unit to its proper location due to hardware issues or connectivity problems, another user may need to break the rules of ownership to make sure the whiteboard is truly representing the reality of the incident. In this case, the ECB whiteboard allows for an override to be done. This override allows a user to actually take ownership from another user and notifies every client that is part of the incident of the override to assure synchronization of data.

The whiteboard also has many configurable and collaborative alarms to remind the user of any important information that might have been forgotten in the chaos of an incident. All alarms and time are synchronized to a global incident time, shared by all clients within the incident. For instance, if a unit is placed in a sector in the whiteboard that is hazardous, a timer is set and bound to the unit to lower its health at a configurable amount of time. The unit's graphical representation changes as the health is lowered to let the user know that something must be done. There is also a timer bound to a unit that has been moved to another sector. When a unit is moved to another sector, it begins to flash on the sender and receiver's whiteboards to let them know the unit is unconfirmed. Once the unit has arrived, the receiver can confirm the arrival by pressing on the unit icon, which causes the unit to stop flashing on both the sender and receiver's applications. If the timer elapses before the unit is confirmed, the unit begins to flash faster to let both the sender and receiver of the unit know that it is overdue for a confirmation.

All of the above timers are also logged in the event log as the incident continues. The timers are serializable, meaning that each client has its own local copy of each timer assuring that no network lag will slow down any timer elapsed notification and obviating the need for additional network traffic. For instance, User A moves unit A into a hazardous sector. At this time User A's whiteboard automatically sets a health timer for x>0 minutes, and when this timer elapses, unit A's health is lowered one level. At the time the unit is moved, the movement information and health timer information are both sent to all clients within the incident. The timer information does not only include how long the timer was set for, but also the actual time it will elapse. Therefore, the amount of time it takes for each client to receive the timer and unit movement data does not affect the actual time that the hazard timer will elapse. Each health timer will elapse at the same instance on each client even if at that moment there is no connection to a network.

There is still the case in which a client may receive the health timer information after it was suppose to elapse. In this case, it elapses the moment the data is received. When it elapses, the timer is aware that it had expired earlier and as well as when it was supposed to elapse. Therefore, if another timer was supposed to be set in respect to the time the original timer elapsed, it is set in respect to the time it was suppose to elapse, not the time it actually elapsed. For instance, taking the above example of User A setting a health timer for x minutes for unit A, let us assume that User C is part of the incident and receives this message, but only x+y minutes later, where y>0. The health timer elapses right away, and needs to be reset so that in another x minutes it will elapse again and lower the health of unit A another level. Since the original timer elapsed y minutes late, User C's whiteboard client is intelligent enough to know the next timer must be set not to x minutes but to x−y minutes (and this is applied recursively, as necessary), which resynchronizes User C's whiteboard client with the rest of the incident's clients.

FieldSoft

FieldSoft's FDonScene features a timer-based personnel accountability report (PAR) that reminds Command to conduct a roll call. FDonScene provides a screen with each unit of every sector, and allows a checkbox to be marked when full accountability for each unit is made. The results of this polling are automatically time-stamped and logged each time the PAR is conducted. PAR checks can be configured to trigger anywhere from 0 minutes (timer never triggers) through 99 minutes. PAR checks may also be undertaken as desired at any time. It should be noted that an existing CAD system can relay the presence of an individual, group, apparatus or other item and the FieldSoft Interface Applet (FSIA) can serve as a conduit to connect the CAD data to the FDonScene application. Likewise, the API to FDonScene can be used to transfer this data to FDonScene directly, provided the presence of the resource is captured upon its arrival at the fireground scene.

Motorola's Fireground Communication System is the FDonScene application bundled with a Motorola-proprietary package that can communicate through the data channel of the Motorola Astro Spectra Radio. This Fireground application is utilized as part of the software configuration for the in-vehicle Toughbook 73 computer. Motorola Fireground provides a polling interval timer that can be configured in the range of 1 minute through 20 minutes. Any Fireground-enabled radios that have exceeded the interval time are polled. A radio that does not reply to the poll causes its display background on the Fireground display to change from blue, to yellow, to orange in successive failed poll attempts. If contact is made, the background color is set to normal, and the polling timer is reset for that radio.

Fireground also provides an "Evacuate" button to signal all fireground channel radios that an evacuate order has been issued. Receipt of the evacuation signal causes all Fireground enabled radios to emit an audible tone at the radio's full volume. The radio is silenced by the responder using any button on the radio; this also causes a signal to be sent back to the Fireground display that the firefighter acknowledged the evacuation order, causing the corresponding radio displayed on the screen to return to a white background.

Fit-Notes

Fit-Notes features an automated Roll-call accountability check, triggered by a configurable alarm that can range from 5 to 30 minutes in 1 minute steps. The timer may be turned off, as necessary, by setting the timer to 0 minutes. Manual roll-calls can be conducted, as desired, at any time. All roll-calls provide a screen showing all units at every sector, with a checkbox beside each unit. A check in the box signifies full accountability for all members of the unit. The results of each roll-call are automatically logged and stored in the database.

As described above, the CAD system can relay the presence of an individual, group, apparatus or other item, and this can be translated into the appropriate form of XML wherein Fit-Notes can read this information and automatically configure itself to reflect the presence of these resources.

FieldSoft

FieldSoft's FDonScene logs every key event with a time-stamped entry into a report. Time-stamped notes can be added to reports to capture further details about events. A report index enables finding, displaying and printing report logs. Reports can be printed and shared at the fireground scene. All the screens and the data contained within FDonScene can be printed during the incident. Upon termination of the incident, the incident report log is available for review, training, or evaluation. Reports are saved as ASCII text files, and can be opened with any text reading application. FDonScene can convert ASCII-based reports into '.mdb' files. FDonScene can also merge two or more reports from different users on the same incident by using the timestamp. The role of each user is recorded in the merged log. Each event in a merged log shows the role, which logged the event, along with a timestamp and notation summarizing the event.

FieldSoft does not have a universal time daemon in its multi-user AIMS application, so this merging capability is of limited utility until the machines are synchronized. To overcome the latter, a universal time daemon is provided at the fireground scene as a means to accomplish a synchronization of time for machines in wireless range. Note that once a machine is synchronized, it can go outside of wireless range and still continue to keep time within tolerance with the rest of the in-range machines.

Fit-Notes

Every event managed through Fit-Notes is recorded in one or more time-stamped logs, which in turn can produce a myriad of reports. Time-stamped notes can be added to reports to capture further details about events. A report index assists in retrieving, displaying and printing the various reports. All incident-related reports can be printed at the scene, provided a printer is available. No method from within Fit-Notes allows for its screens to be printed; a screen capture utility could be used if this capability is desired. Specific data from Fit-Notes can be accessed through the underlying '.mdb' access database files using 'sql_query.' The database is always up-to-date, because every transaction writes to the database and closes it. Reports can also be used following incident termination for use at training classes or for critiques. The detailed logging provided by Fit-Notes provides a complete and accurate rendition of events as they unfolded throughout the life of the managed incident. Reports are written as ASCII text files, and can be viewed using any word processing software. By default, all log entries are written to an '.mdb' database.

FieldSoft

A list of radio channels can be entered through a configuration screen. During an incident, Command can assign a radio channel to an individual sector. The FieldSoft Interface Applet can be used to bring available CAD data into FDonScene. Some conversion of the CAD data into the appropriate format would be required.

Fit-Notes

A Fit-Notes user can access a preconfigured Communications Plan that provides two radio channels and frequencies, and two phone numbers for each identified sector or location. Fit-Notes has an XML schema designed to allow the inclusion of Computer Aided Dispatch data, including crew members. This feature is implemented and available for inclusion into Fit-Notes 5.0.

Output from Mobile Data Terminals to ECB

The output from the dash-mounted Mobile Data Terminal is provided in format readable as an ASCII text file, and this data is provided through a standard interface both from the MDT and to the in-vehicle ECB processor such that an appropriate level of this content is displayed on the ECB 10. This is implemented using Groove along with our own custom code.

FieldSoft

FDonScene provides a "Staged Response" feature to establish where units will be deployed and standing by for action before a potential incident occurs. FDonScene provides full support in creating benchmarks, objectives and tasks as a form of preplanning. FDonScene's Tactical Survey or Pre-plan Wizard (TSPW) helps users organize images and information about a location as a preplan. It is the user's responsibility to gather this information. Using a template, the TSPW guides the user in entering the facts and images about the location, including its address. TSPW packages this information into a web page format so that it can be viewed with any web browser. TSPW also creates an index into all its known preplan web pages.

A stand-alone "Search for Occupancy" module can retrieve preplan web pages whose address matches (or partially matches) a street name, displaying the web page in a browser. The requested NIOSH information and TOMES by Micromedex, as well as the Internet Explorer browser, will be available so this material can be browsed by an ECB user.

Fit-Notes

Fit-Notes does not provide any method for laying out the deployment of units as a form of pre-planning so that the incident can be activated at a later time. Fit-Notes can be configured with field tips and objectives as a form of preplanning. In general, Fit-Notes provides incident command, leaving preplanning to other companies that specialize in that aspect.

A software application Fire Zone 7.2 can be used to support the creation of pre-fire plans, and the software application First Look PRO 2.0 can be used to organize and locate these plans. Both products are from CAD Zone. Fire Zone 7.2 consists of numerous toolboxes that facilitate the drawing of buildings of any shape and size, including placing doors and windows with openings, stairs, elevators, hydrants, utility shut-offs, valves, tanks, vehicles, streets, intersections and so on. A Symbol Manager helps locate the right symbol and place it at the correct orientation and size, in one step. The application is easy to use, yet includes step-by-step tutorials to communicate its full power.

First Look PRO allows a person to search the preplan database by building name, address, or preplan number. Each diagram can be previewed prior to opening with the application's Diagram Viewer, which is ideal for viewing diagrams on mobile data terminals. Additional information that can be stored with the preplan includes building construction details, location of hydrants, alternate water supplies and their volume output, building POC and phone numbers, and notes. The tool provides on-line help and tutorials.

Requested NIOSH information and TOMES by Micromedex, as well as the Internet Explorer browser is used so any reference material can be browsed by an ECB user.

FieldSoft

The FieldSoft Transfer utility is used to copy a set of master FDonScene files located on one computer, to one or more other computers. This is most useful for copying configuration files and Tactical Survey or Preplan Wizard files. The user needs to know where the files are located. The transfer utility does not use compression in this process.

The AIMS multi-user client/server application uses TCP/IP-based protocol, as required. AIMS 2.0 uses the Tomcat database. FieldSoft can configure their application to work with Oracle if necessary. The AIMS client uses a store-and-forward http protocol, so temporary loss of wireless connection does not affect a client's ability to perform incident command. Once connection is re-established, the stored data will be forwarded to the AIMS server.

FDonScene saves all its data in a series of temporary files every minute so that in case the system crashes, recovery of the incident can occur. An incident command running on one instance of FDonScene can be copied and handed-off to another instance of FDonScene running on another machine. This would be particularly useful at change of shift if the underlying computer needed to be taken out of service. Finally, FDonScene can save staged responses so they can be re-used multiple times thereafter. Additionally, these staged responses can be copied to other clients for their own execution and re-use.

Fit-Notes

The configuration file for Fit-Notes is an '.mdb' Access database file. Fit-Notes can be configured on one machine, and then this file can be copied to other machines to avoid performing the configuration phase from scratch. The Groove peer-to-peer collaborative sharing tool that Fit-Notes uses create a multi-user version of its incident command application (Fit-Notes 5.0).

Snapshots of the incident database as the incident progresses can be backended in Oracle by storing the database file name and location, along with the incident name, ID, date and time stamp (and any other metadata that may be useful). Oracle could then provide the location of the incident snapshot database file (file itself stored externally to Oracle, but in a controlled, protected file system), and the file then loaded into Fit-Notes or Access for viewing. If wireless connectivity is lost, the local Fit-Notes application will continue to function. Upon re-establishing wireless connectivity with the server, the local database can resynchronize with the server database through Groove, and no events are missed.

Fit-Notes writes each event immediately to the underlying Access database, and closes the database file. If the system crashes, the user directs Fit-Notes to join the abnormally terminated incident, causing Fit-Notes to reload the Access database. The incident recovers immediately. By copying the underlying directory and Access database for a specific incident in Fit-Notes, the running of the incident could be transferred to another machine. The users should each add a note to the log to indicate when this process occurs.

Data sharing between computers to facilitate restarting an incident from another machine should be coordinated outside of the incident command application since the ECB is an integration platform for a number of data sources and applications.

New York University Zooming Spaces JAVA-based toolkit provides an excellent level of abstraction for developers who wish to create graphical user interfaces featuring spatial data. In particular, Zooming Spaces provides the ability to display, orient, pan, and zoom in and out of raster and vector data sets. Zooming Spaces also borrows functionality more generally found in geographic information systems, including the ability to manage the display of multiple layers of data. This gives the end-user the ability to establish which layers are visible, and in what order these layers are drawn. Zooming Spaces also lets the user control the level of opacity for each layer. Using Zooming Spaces, a developer can control what level of detail is shown from a vector set depending on the degree of zooming. As a user zooms into a scene, more detail can be provided, and as a user zooms out, levels of detail can be omitted.

Figure 12:
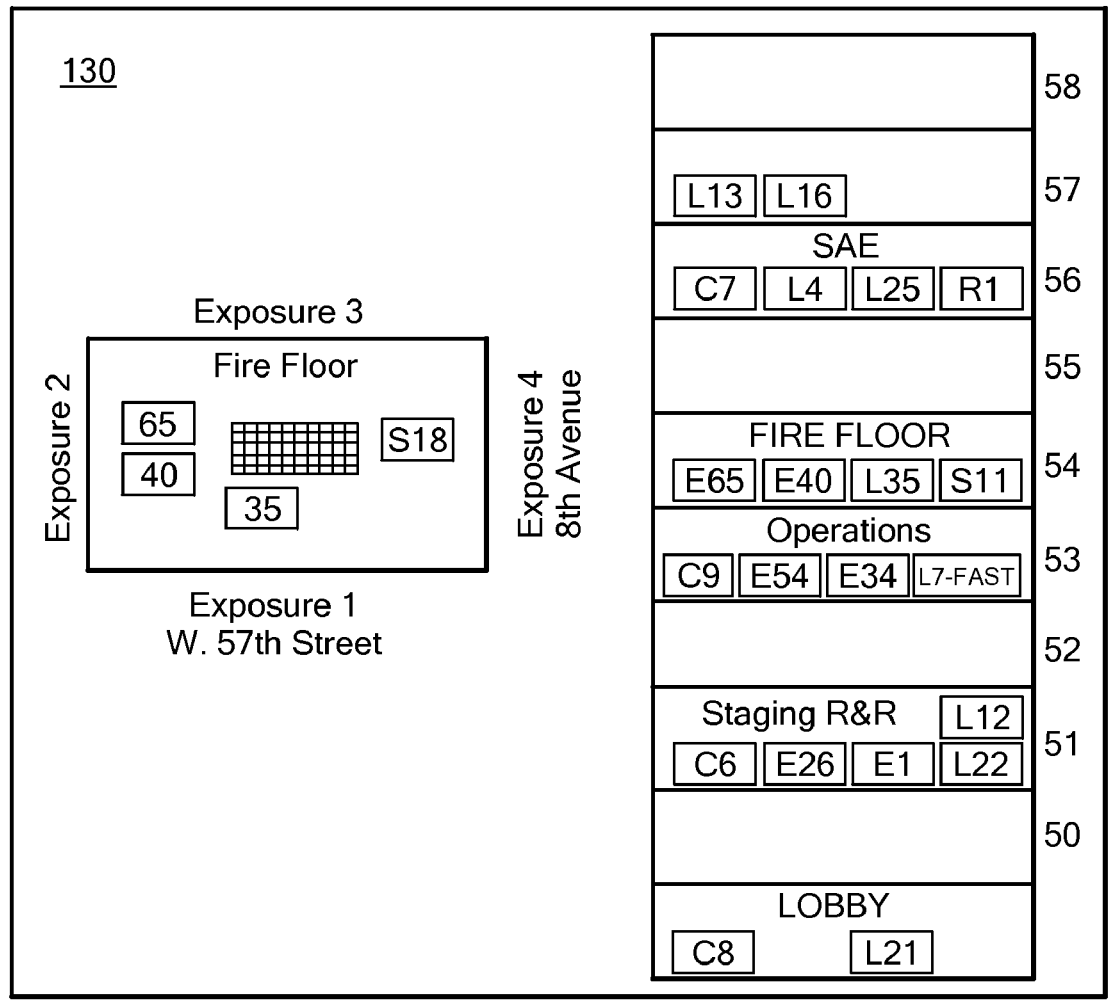
FIG. 12 is a screen shot showing spatial data information.
Figure 13:
FIG. 13 is a screen shot showing spatial data information in map form.

Using Whiteboard 120 with the functionality embedded in NYU's Zooming Spaces provides enhanced capability such as that shown in FIG. 12. Whiteboard 120 provides an intuitive easy-to-use interface to assist users of the ECB with establishing and managing their incident command. The City of New York Department of Information Technology and Telecommunications (DoITT) maintains the City's official base map, NYCMAP, along with digital ortho- and oblique-aerial photography, as well as a collection of vector data sets. FIG. 13 shows a color-coded map of NYC, where each distinct block of color defines a region for which an orthoimagery data set is available from DoITT. Small thumbnail views on the right panel can be enlisted to help establish location by orienting the user with respect to broader features shown on the smaller scale maps. Copies of these data sets are installed on each ECB computer. Instead of placing the entire data set on every machine, however, only those files are stored corresponding to regions where the unit possessing the ECB generally travels. If the unit responds to a location where it is lacking the orthoimagery data, then this data can be copied on the scene from another responder's ECB. In the worst case, the data set will be unavailable unless a wide area network connection can be established.

By retrieving subsets of the vector data sets, the latter will be employed to develop smaller data sets applicable to each unit where the ECB is deployed, again using regions normally covered by the unit as a heuristic. A selection of viable thematic data sets will be made based on the quality and utility of the data sets. The imagery and vector data sets can be treated as layers through a GIS application, such as the NYU Zooming Spaces library, MapInfo Extreme, or ESRI ArcGIS Engine, and integrated into the whiteboard functionality. Provided CAD data is accessible, the whiteboard can automatically provide a map view zoomed at a configurable level corresponding to the address provided by the CAD system. A sketch layer can provide the ability for the user to mark up and annotate the view. Periodically, a snapshot of the whiteboard view can be automatically taken and ultimately transmitted to the central data store for remote viewing or archive.

Having referred to various embodiments of the invention, it should now be appreciated referring to FIG. 1 that a full scale incident control system 100 may include a command post having a computer to store incident data and portable electronic command board having a computer for inputting the incident data; data structures in memory and file systems for storing incident data locally within the computer; and a wireless interface, connected to the computer, to connect the computer with other computers through a router to replicate the data among other users within the incident. A device to track the location of the portable electronic command board is provided and the incident data includes the location of the portable electronic command board. The incident command system may also include a historical database for storing incident data for historical purposes.

The portable electronic command board includes a computer for inputting incident data; data structures in memory and file systems for storing incident data locally within the computer; and a wireless interface, connected to the computer, to connect the computer through a router with other computers to replicate the data among other users within the incident. A touch screen is provided to input the incident data. A device to track the location of the portable electronic command board is included. In one embodiment an interface to a passive accelerometer is provided such that the portable electronic command board is notified wirelessly by the passive accelerometer when ever a user remains motionless for a specified period of time. Alternatively, an interface to a biometric monitor such as heart rate, respiratory rate, body temperature, and oxygen saturation is included. Still alternatively, an interface to a self contained breathing apparatus for air consumption monitoring and detection of the presence of carbon monoxide and other toxic gases is provided or an interface to at least one from a group of biological, chemical and radiological detectors. Furthermore, an interface to access web based information such as weather, hazardous materials information, medical and incident mitigation protocols and other emergency management information may be provided or access to geographic information can be provided. Additional information such as access local transportation information can also be obtained. In another embodiment, an interface to access a patient management system for tracking patients and hospital status is provided. In still another embodiment, an interface to a three dimensional tracking system to track emergency personnel within a structure or tunnel is provided.

Having described a robust, end-to-end system to enable collaborative incident command from the fireground to the emergency operations center, incorporating commercially available components in innovative ways, including enhancing existing software packages and layering newly developed software to provide robust situational awareness to commanders, we will now describe in more detail the collaborative incident command software portion of our solution.

As described, existing incident command software packages are not truly collaborative. We have explained how our techniques can be used to add a collaborative feature to existing software packages provided an API is available. Additionally, we have shown how a level of robustness can be maintained provided an inverse operation is available for each API function that can cause a state change within the system.

The goal of eliminating single points of failure requires the ability to recover if a component fails. In particular, if a software application malfunctions, ideally one should be able to restart the application and continue from just before the point of failure. We term this a "soft reset", since there is no need to swap out any hardware in order to recover. With a collaborative system, it is possible to recover from hardware failure, provided another hardware component is available and configured with the same software packages that were in use on the hardware component that fails. We use the expression "hard reset" to refer to the process of recovering by switching hardware. A successful hard reset where minimal data loss occurs can be solved by relying on a server allowing for fail-over to a secondary server in case of primary server failure. However, in a collaborative system as defined previously, a user can recover from a hard reset provided that person's state is shared with other machines in the collaborative workspace. Specifically, as long as a data structure representing the person's state is continually updated and maintained on another machine's memory or storage device, then the person's state can be restored automatically. Physically, the machine from which the restoration occurs need not be at the incident site. Provided that a communication pathway exists between machines, collaboration and restoration can be enabled. In particular, in the case of catastrophic failure, restoration of incident management data can be driven from a remote emergency operations center as long as the appropriate mix of routers and networks is present. The process and underlying method are more fully described below.

We will now describe a design and implementation of an electronic incident command software package we are calling e.ICS. The e.ICS application has been written in C# using Microsoft's Visual Studio .NET 2003. Throughout the description we will commonly refer to the e.ICS software application as implemented in hardware as e.ICS. Our implementation also uses third party libraries from Microsoft Groove (collaborative services), NetAdvantage 2005 from Infragistics (graphical user interfaces), AnexTree.NET Org Chart Component from Anex Technologies (tree layout graphical display), and MapXtreme 2004 from MapInfo (geographic mapping and raster images). We have successfully tested e.ICS using a variety of machines running Windows XP Professional, specifically Panasonic Toughbook 18s, Panasonic Toughbook 29s, Panasonic Toughbook 73s, and Compaq nc8000 notebooks. Memory on these machines ranges from 512 MB to 1 GB. Installation of the e.ICS application and supporting packages requires roughly 50 MB. Additional space is required for data sets to support customer-specific alternate data sources.

We will describe the capabilities of e.ICS, providing technical details on the design of collaborative features. In particular, we fully develop how collaborative workspaces are used to enable incident command using principles of the incident command system (ICS) of the National Incident Management System (NIMS). We will describe configuration of the system, including the ability to incorporate standard operating procedures for arbitrary incident types. We will describe data management, and explain how data is shared during an incident. We will describe how e.ICS handles soft and hard resets, including recovery from remote sites such as emergency operation centers. Additionally, we show how new functionality can be added to e.ICS in the form of alternate data sources and collectors.

Description of e.ICS

The e.ICS application has been designed and built to facilitate ease of use by commanders at an incident. All interactions with the system can be achieved using a touch screen, or alternatively using a non-touch screen display and a mouse. The graphical user interface features oversized buttons, large color-coded unit icons, and a screen layout that intuitively reproduces existing mechanical whiteboard incident command systems. A number of screens conveying different kinds of information are accessible at all times by selecting the appropriately named tab from those listed along the bottom of the display.

Visual cues provide information at a glance to indicate which resources and sectors are part of a user's direct command or under someone else's responsibility. e.ICS focuses the user's attention when required by changing the appearance of the concerned units or sectors, such as by blinking the sector name or unit, or altering a unit's border color. An alert notification queue visible from any screen presents a list of notable events that have occurred on the whiteboard screen since it was last viewed.

The command structure for a given incident type evolves as defined through the Organization Chart Builder. The Incident Command role is created automatically whenever an incident is created through e.ICS. Once a role is established, then any roles that are directly supervised by that role are available to be assigned if necessary. Additionally, the capability to establish one or more roles outside of the established hierarchy is possible to handle unforeseen circumstances. Overall, e.ICS is designed to provide the necessary incident command tools to match the severity of the incident. As the incident grows in complexity, e.ICS expands to provide more roles, following the established command structure.

The behavior and look of e.ICS are customized through the e.ICS Configuration Manager. This stand-alone application is used to create configuration data that captures an organization's standard operating procedures with respect to incident command. Once the configuration data has been completed and validated, this application handles the deployment and initialization of the underlying collaborative workspace structures.

We will begin with a description of the Organization Chart Builder and the e.ICS Configuration Manager. This will be followed by a technical description of the underlying data structures and collaborative workspaces. Finally, we will describe the e.ICS application and explain how collaborative incident command is enabled and managed through these software solutions. We will describe essential hardware and communications infrastructure that enable end-to-end fault-resistant collaborative incident command, from the fireground scene to the emergency operations center.

Organization Chart Builder

Figure 14:
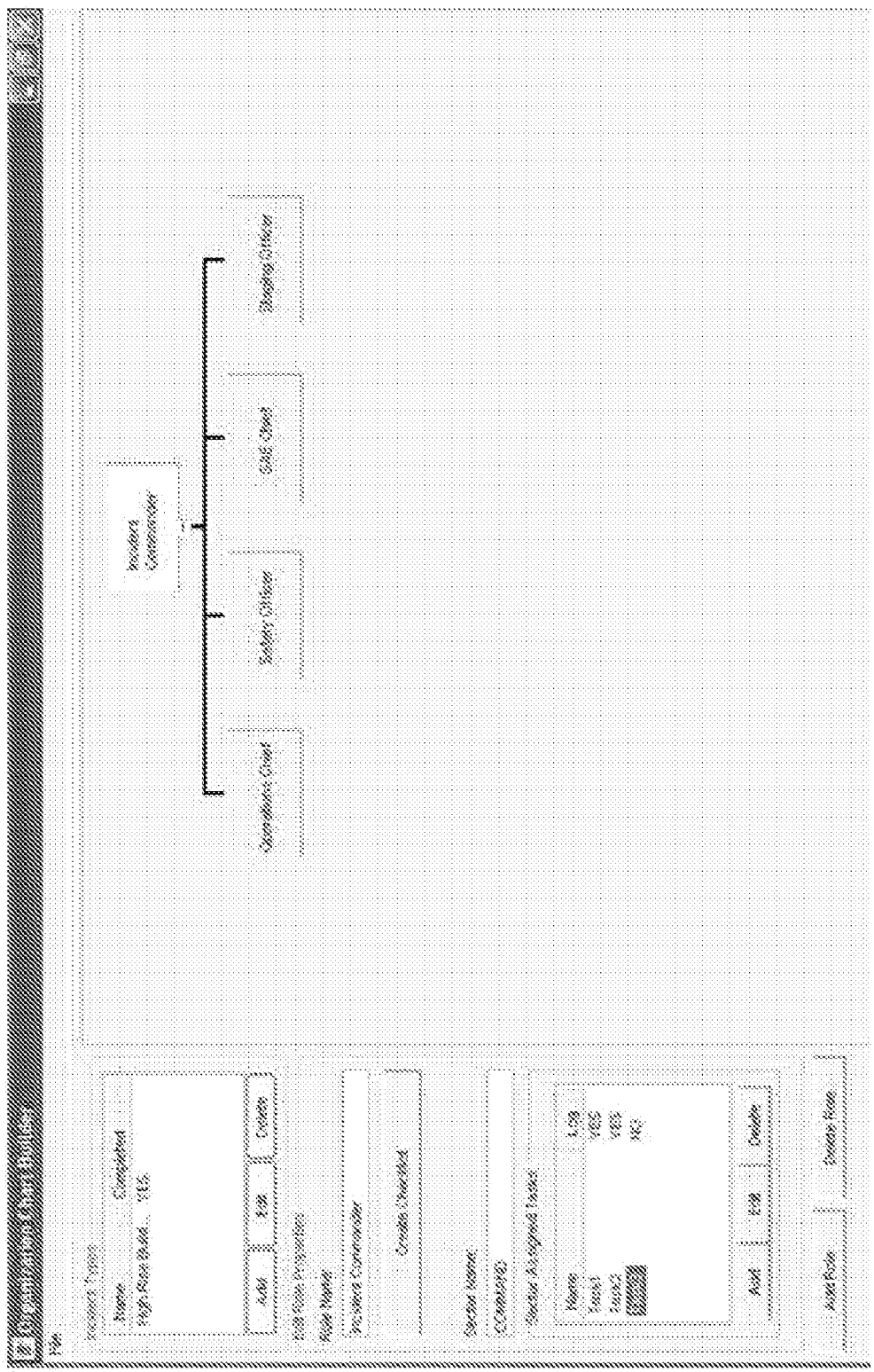
FIG. 14 is a screen shot of the Organization Chart Builder.

A separate stand-alone program called the "Org Chart Builder" is used to establish the command hierarchy for a worst-case scenario of the chosen incident type. A sample display from the "Org Chart Builder" application is shown in FIG. 14. FIG. 14 shows a screen shot of the Organization Chart Builder which is a powerful tool for defining the specific command structure to use for a given incident type, and the particular set of tasks and checklists matched to each role within the command.

The "Org Chart Builder" is used to define all incident types. For each incident type, a hierarchical command structure is created in the form of an organization chart. Each node defines a role within the incident. A set of tasks can be associated for each node, and optionally, each task can be marked to be logged when it is assigned and completed when used during an actual incident in e.ICS. A sector name can be provided for each role (such as "SAE" for Search and Evacuate). Also, a checklist can be created specific to a given role for a given incident type.

At any time, a person using the Organization Chart Builder can save the collection of incident types so that their definition can be resumed at a later time. The information gathered is written to the file system, and named with a ".oc" extension to indicate this is e.ICS organization chart data. Upon resuming this application, the user can choose to create a new organization chart file, or to reload a chosen file selected from a history of organization chart files that have been previously saved to disk. At any time, existing incident types can be updated through the "Org Chart Builder." An updated definition must then be ingested through the e.ICS Configuration Manager, revalidated, and redeployed in order to reach individual e.ICS users.

Configuration Manager

The e.ICS Configuration Manager is a standalone application that allows an organization to customize e.ICS with respect to that organization's standard operating procedures. We will describe each of the areas where customization can occur.

Figure 15:
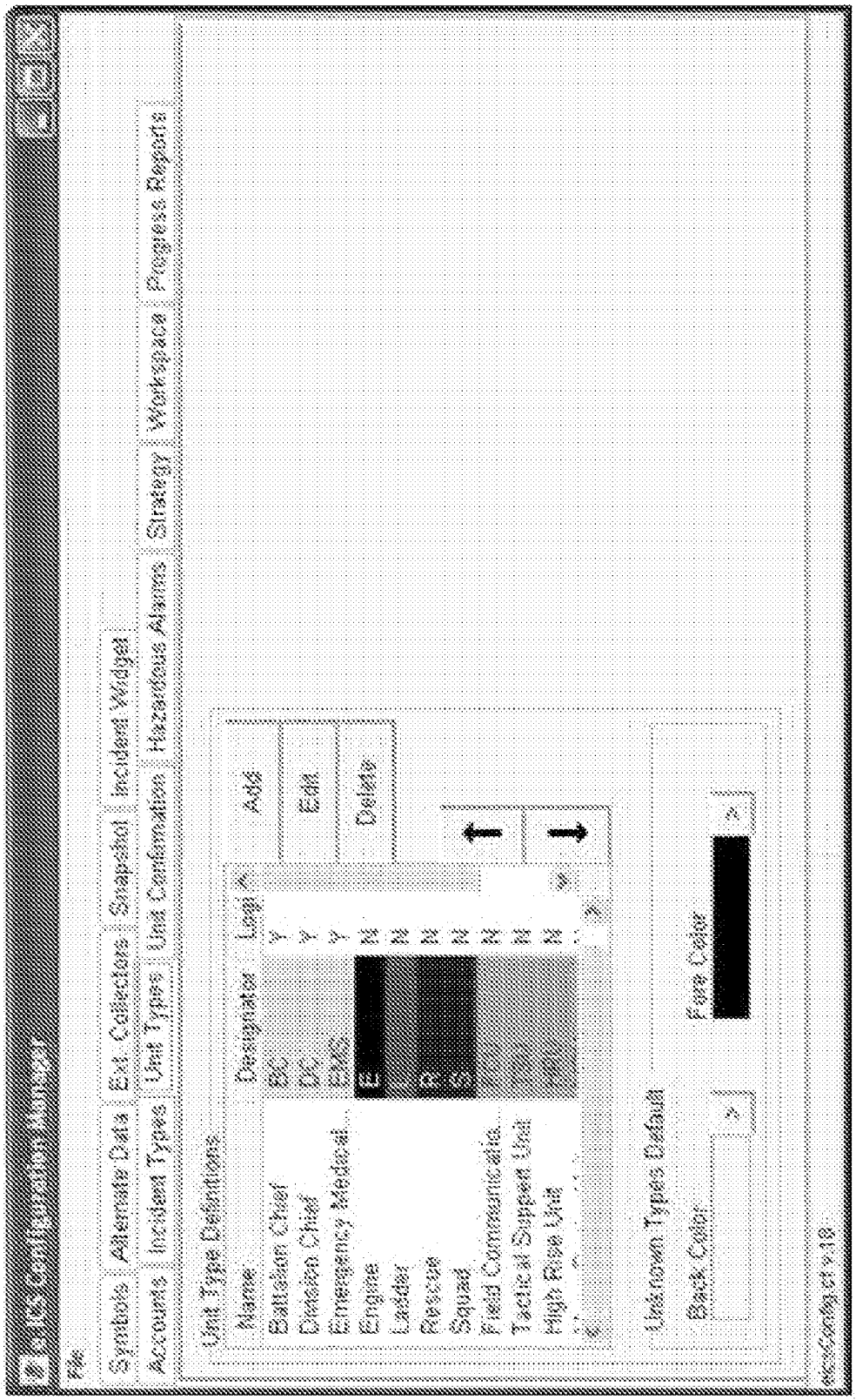
FIG. 15 is a screen shot of the configuration manager where the Unit Types tab has been selected.

FIG. 15 shows a screen shot of the configuration manager where the Unit Types tab has been selected. The "Unit Types" tab of the e.ICS Configuration Manager provides the ability to customize unit names, designators and icon colors, as well as the ordering of these units relative to one another as they are ultimately displayed in the Deployed Units pane of the e.ICS Whiteboard during an actual incident. As shown, numerous tabs allow for significant customization of the behavior and look of the e.ICS collaborative incident command application. For example, the "Accounts" tab is where user names and passwords are established to enable users to login to e.ICS. A list of created user accounts is shown. Users can be added and deleted through this tab, and user passwords can be assigned and changed. (If a user forgets a password at an incident, an option is provided through e.ICS for the Incident Commander to authenticate the user into the incident. This is described in the section on "Creating an Incident.")

The "Incident Types" tab is where information about specific command structure and tasking is provided. Whereas the information provided under all the other tabs is relatively straight-forward, the definition of an incident structure is more involved. Because of this, a separate stand-alone program called the "Org Chart Builder" is provided and described in more detail below. Once an incident is completely defined through the "Org Chart Builder," a file is created that encapsulates this information. Then, through the "Incident Types" tab of the "Configuration Manager," the definition of this incident type is incorporated into the configuration file, and the incident type is added to the list of available incident types. Once the configuration file is deployed as described further below, an Incident Commander can select from the set of known incident types, causing the established command structure and tasking to be instituted through e.ICS.

As shown in FIG. 15, the "Unit Types" tab provides the ability to assign colorings to the unit icons that are used within e.ICS to represent engine units, ladder units, battalion chiefs, or any other asset that needs to be tracked. The type of asset is entered, along with a prefix designator (such as "E" for engine, "BC" for battalion chief). The background color of the icon and the foreground lettering color is also entered. (During an incident, the prefix designator is used by e.ICS to decide what unit type a given unit is. Once the unit type is deciphered, the colorings are applied.) Finally, units corresponding to possible users of the e.ICS software are identified (such as battalion chiefs and deputy chiefs). Colors can be chosen from a set of predefined offerings, or a custom color can be entered.

Figure 16:
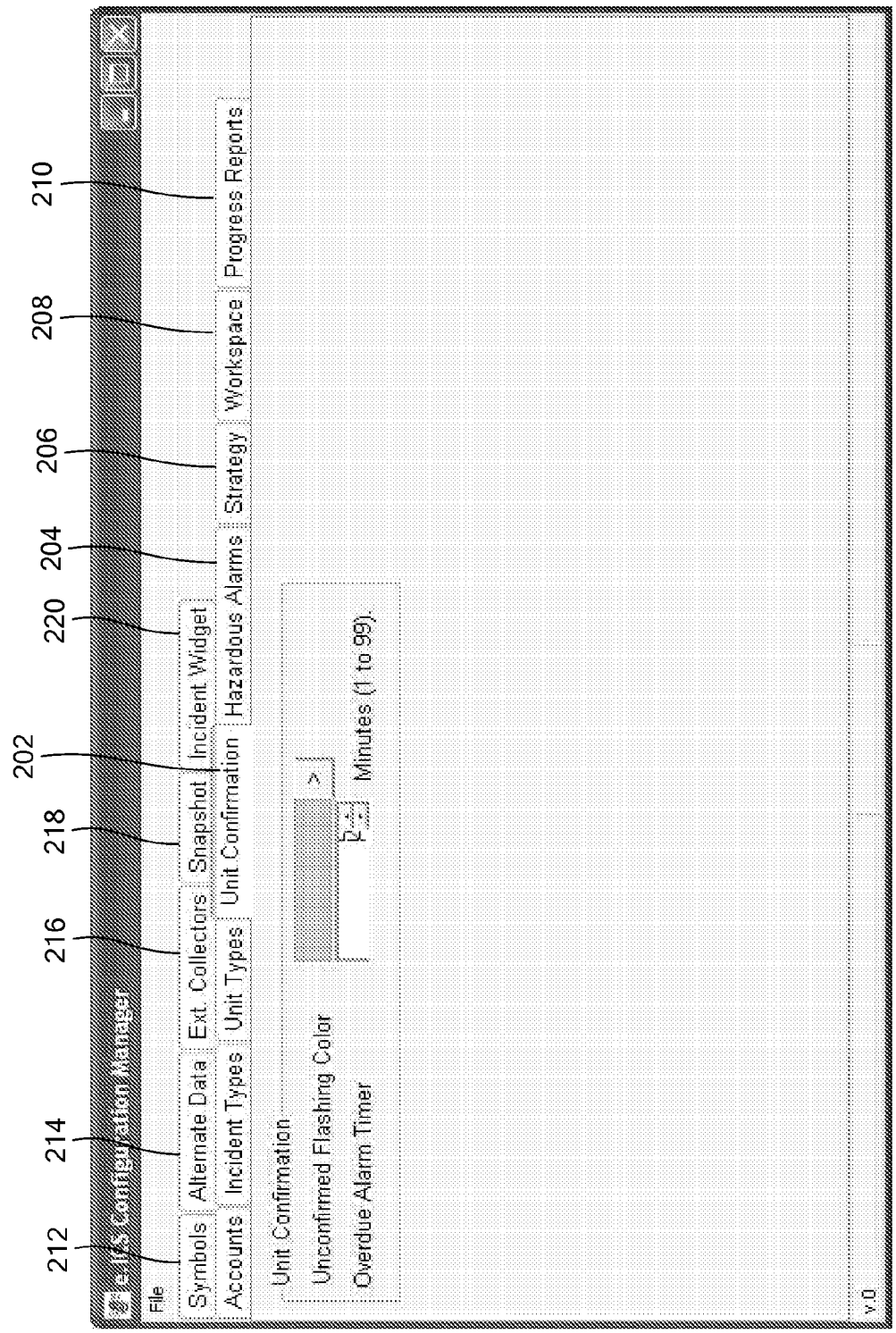
FIG. 16 is a screen shot showing the unit confirmation tab.

Referring now to FIG. 16, when a unit icon is moved during an incident, indicating physical movement of personnel from one location to another, then it is important to ensure this unit reaches its destination as expected. The screens of the sender and the receiver display the moved icon as slowly flashing with the icon's color temporarily replaced with the color specified in this tab for an unconfirmed unit. Other users see the unit as moved to its new location with its normal unit coloring and no flashing. The rate of flashing increases for an unconfirmed icon after the number of minutes specified in the "Overdue Alarm Timer" field. Situational awareness is maintained on this unit for the appropriate commanders without distracting other users. Once a unit is confirmed, the unit icon reverts to the normal color established for that unit (as defined in the Unit Types tab).

The "Unit Confirmation" tab 202 as shown in FIG. 16 is used to specify when a visual cue should be provided to indicate that a moved unit has not been confirmed in its new location. After the established number of minutes the unit is termed "overdue". The unit icon continuously blinks on the screen of the user who moved the unit and on the screen of the user to whose sector the unit has been moved. The rate of blinking increases if an overdue unit is unconfirmed for the configurable amount of time set on this tab. The user can also configure what color the unit will blink on this tab. Once a user of e.ICS confirms the arrival of a unit, the icon stops blinking.

The "Hazardous Alarms" tab 204 is used to provide a visual alert on the e.ICS screen for units operating in a hazardous region. A caution alert causes the color of the border around the unit icon to change to the color chosen whenever a unit has been operating continuously hazardous regions for the selected number of minutes. The danger alert triggers similarly whenever the established time threshold has been crossed, changing the border color accordingly. (A user of e.ICS marks a sector as hazardous by using the "Information" modal button, described later.)

The "Strategy" tab 206 provides the ability to enter the terminology to be used throughout the e.ICS application for alerting users to the currently employed strategy. Typically, the supplied categories are "Offensive" and "Defensive." A coloring can be associated with each category, and a timer can be configured to remind the incident commander to re-evaluate the strategy periodically. (The IC can alter or disable this timer when e.ICS is running.)

The "Workspace" tab 208 is used for creating, selecting, and deleting the workspace into which the configuration data is deployed. This workspace is shared across all e.ICS users within the organization, and referred to as the Standard Operating Procedures workspace, or SOP workspace. Generally, only one SOP workspace is required. Changes to configuration data can be pushed out to this workspace. However, a second SOP workspace might be useful when piloting new technology or when evaluating contemplated changes to SOPs through tabletop scenarios. Further details on the creation and use of the SOP workspace are provided under the "Data Management" is provided below.

The "Progress Reports" tab 210 allows an organization to define how often the Incident Commander should be prompted to provide a progress report during an actual incident.

The "Symbols" tab 212 allows an organization to add its own symbol set into e.ICS. These symbols can then be used during an incident to annotate the whiteboard and sector views. Symbols are generally 64×64 pixels and 24 bits deep, and can be bitmaps, GIF, or JPG formats.

Figure 17:
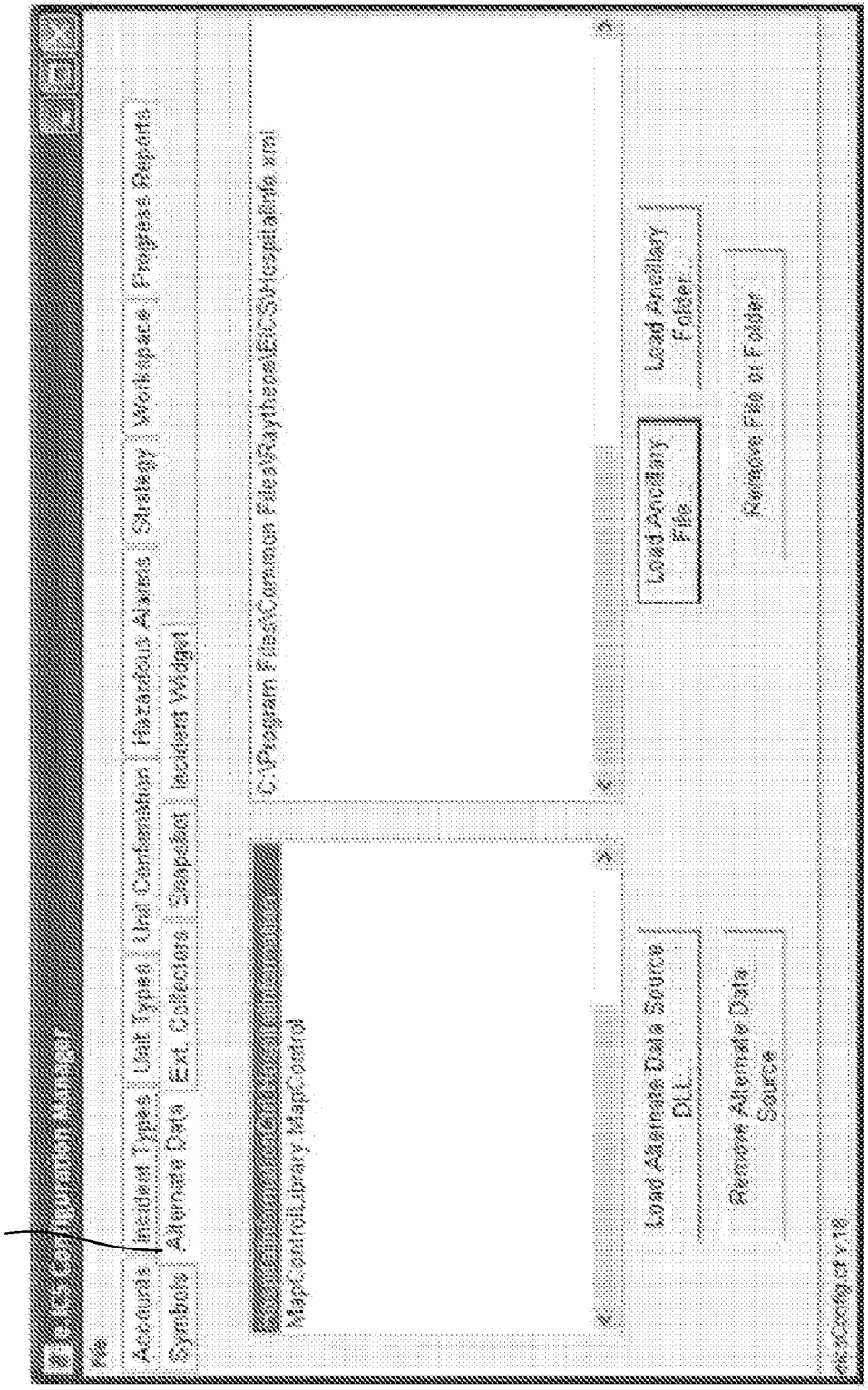
FIG. 17 is a screen shot showing the alternate data sources tab.

The "Alternate Data Sources" tab 214 as shown in FIG. 17 enables new functionality to be added to e.ICS. If new technology is acquired that would be beneficial to provide at an incident, then the "Alternate Data Sources" feature is used to expand the capability of e.ICS programmatically. Each tabbed display screen within e.ICS is known as a user control.

The "Alternate Data Sources" feature within the Configuration Manager provides the hooks for loading custom user controls into e.ICS. These custom user controls can be developed in-house by an information technology group, for instance. Conceptually, this tab allows a new user control to be added to e.ICS that is explicitly designed and implemented to ingest and present new data sources and provide users the ability to interact with that data. The user control itself must be implemented as a dynamic link library (DLL) using the Microsoft Visual Studio .NET programming environment. A full applications programming interface (API) provides the ability for an alternate data source to query the e.ICS application for information from the whiteboard. This information can be used to provide context to the alternate data source screens. The "Alternate Data Sources" tab could be used to add in firefighter biometrics, hospital status, weather data, roster information, or new mapping capabilities, for instance. An alternate data source may need to coordinate with an external service as to be described next.

Figure 18:
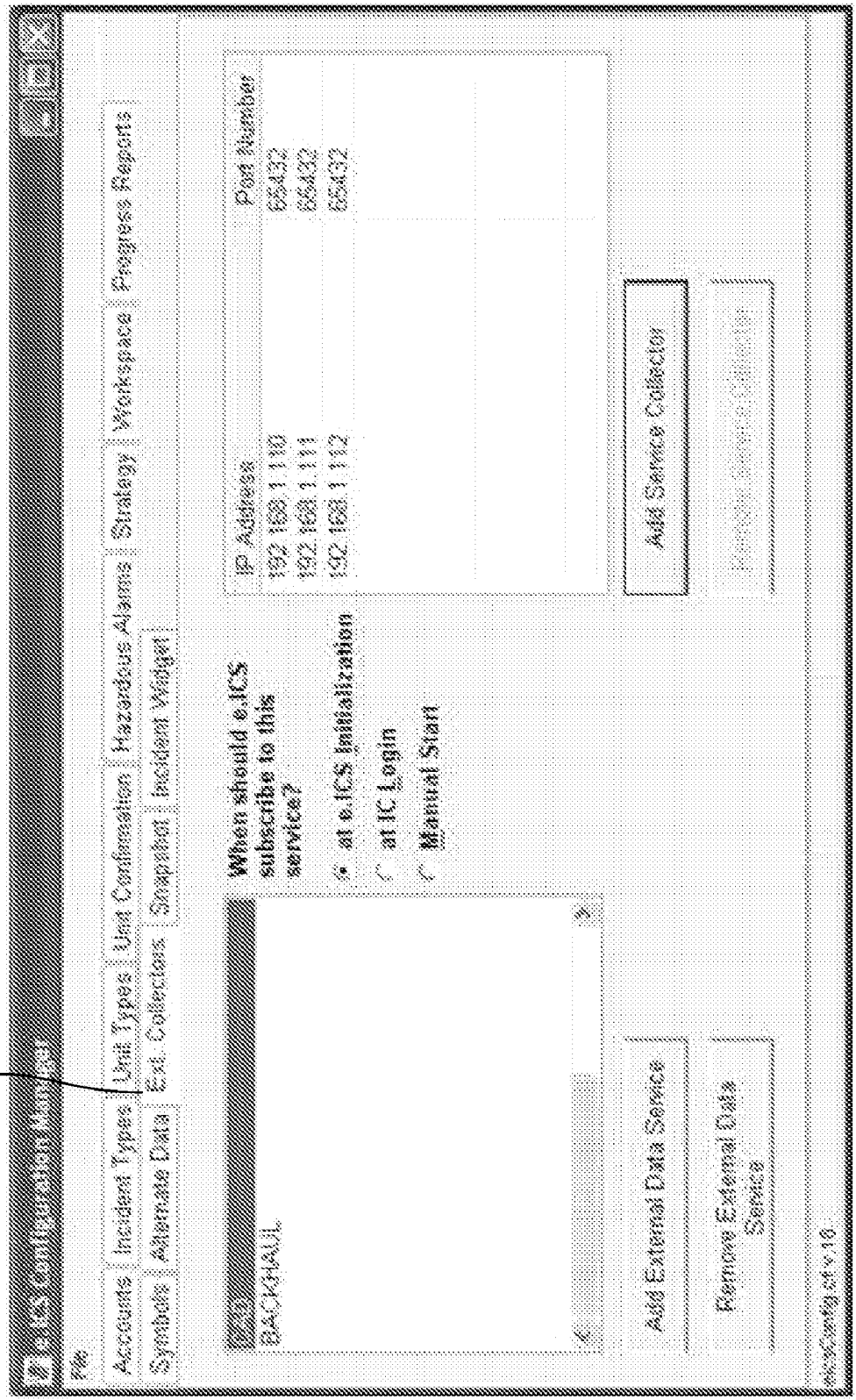
FIG. 18 is a screen shot showing the external collectors tab.

Referring now to FIG. 18, the e.ICS application can interact with external services. Through this mechanism, numerous services can be initiated and monitored, including data backhaul to an operations center. The "Ext. Collectors" tab 216 shown in FIG. 18 is used to setup external services which run outside of e.ICS but can be subscribed to during an incident to collect information or backhaul data to a secure location. An external service is simply a service running outside of e.ICS (perhaps on a dedicated machine) with some special functionality. External services could be used to provide backhaul capabilities, to broker information between e.ICS and a computer aided dispatch system, to collect data from on-scene digital radios, or to collect data from fireground sensors, for instance. A specific incident may rely on several external services to send and receive data, and in general, to improve situational awareness. Whereas the "Ext. Collectors" tab 216 provides the capability to manage the external services, the "Alternate Data Sources" tab must be used in concert in order to associate a new user control that can display pertinent information gleaned from a particular external service. Additionally, an alternate data source can be used to interact with an external service because e.ICS maintains the IP address and port ultimately used to invoke the service. For instance, an alternate data source user form could contain a dial to adjust a sensor's sampling rate.

To register a service with e.ICS requires that the person who is running the e.ICS Configuration manager to supply the name of the service and the port number under which secure socket communications is to be established. A list of one or more fixed IP addresses corresponding to the machines where the service can be invoked must be supplied. In order for a service on a remote machine to be invoked, an e.ICS Service Manager daemon needs to be active on that machine, and the service must be registered. The daemon accepts invocation requests from e.ICS, starts the corresponding service, and communicates success or failure back to e.ICS. Additionally, the daemon could interact with an incident time service to compute a delta between the external collector clock and the incident time. This delta could then be applied to any readings from the external collector that become part of e.ICS through an alternate data source.

If multiple IP addresses are provided, then e.ICS methodically attempts to reach each IP in turn until it is successful. Provided an IP address is within range, the service is invoked at the specified time (when the user starts e.ICS, when the IC starts e.ICS, or at the option of the incident commander any time during the incident.) Once a connection is established, a periodic check for the existence of a service is conducted routinely throughout the incident. If a service falls out of reach, then reconnection is attempted along the same lines as described for first discovering the service.

When a service is invoked by the incident commander, then that invocation is shared through the IC with all other users within the network (either a local area network or wide area network can be used). When a service is invoked by a non-IC user, then the subscription is terminated once that user successfully joins the incident. In particular, CAD data (from the user's vehicle, perhaps) can be provided to a user during the e.ICS login process in preparation for that user initiating the incident as the incident commander. However, if the user joins an on-going incident, then the CAD service initiated by the incident commander is available, so the alternate invocation performed by the user is unnecessary.

The "Snapshot" tab 218 (FIG. 16) is where the user configures how often, if ever, snapshots of the incident should be taken and in what format (such as BMP, JPG, or GIF). The organization can configure how frequently snapshots occur. Snapshots capture the whiteboard, sector views, event log, incident summary, conferences and the map. An interface exists for adding alternate data sources to the snapshot list. The alternate data source simply returns an object representing the snapshot for the required interface method. Snapshots are placed in a local directory outside of any workspace. A backhaul service could be added as an external service with the responsibility of moving collected snapshots from the local machine to a remote site, such as an emergency operations center.

The "Incident Widget" tab 220 is used to add simple sector creation tools referred to as "widgets." To load a widget, simply click a "Load Widget from DLL" button (not shown). Find the name of the DLL containing the desired widget and optionally select your desired icon. The chosen DLL is added to the configuration data, and placed in the SOP workspace when the configuration data is deployed. When e.ICS is executed, these widgets are seamlessly available to the Incident Commander during an incident. An interface for adding widgets requires implementation of a handful of methods, including a cancel action, "OK" action, update, widget positioning, creation dialog, resulting sector list, and sector owner.

At any time, a person using the e.ICS Configuration Manager can save the configuration so that it can be resumed at a later time. The information gathered is written to the file system, and named with a ".cf" extension to indicate that this is e.ICS configuration data. Upon resuming this application, the user can choose to create a new configuration file, or to reload a chosen file selected from a history of configuration files that have been previously saved to disk.

Once the user has completed a configuration file, the user needs to run a validation check against the configuration data by selecting a "File→Validate" menu item. A configuration file including this configuration data is saved. This validation runs certain checks to test that certain configurable values entered by the user are valid and complete. A report showing successful areas and detailing any problems is displayed. If no problems are uncovered, then the configuration file corresponding to this configuration data is marked as validated. The person using the e.ICS Configuration Manager can make changes to the configuration data at any time. Changes to the configuration data cause the resulting configuration data file to be marked as invalidated. Only validated configuration files can be deployed.

Once validation is successful, the user chooses "File→Deploy" from the menu to share this configuration with e.ICS users through the SOP Workspace created and selected on the Workspace tab. This process is described in the Data Management section below. Once an incident type is fully defined, the user marks it as completed. Only completed incident types can be loaded into the e.ICS Configuration Manager for deployment to e.ICS.

Once a configuration is deployed it is possible to update it through the e.ICS Configuration Manager by opening the saved configuration file, making the necessary alterations, validating and redeploying it. More drastically, one could simply create, validate and deploy a new configuration file. This overwrites the old configuration file and is shared with all e.ICS clients through the named SOP Workspace. Due to the limited connectivity, however, it is possible that some users have synchronized their SOP workspace with the newer configuration while others may not have yet. Therefore, it is possible to run into a scenario in which not all e.ICS users have the same version of the deployed configuration file.

We cannot allow e.ICS to have undetermined behavior due to users employing different versions of the same configuration file. We solve this by copying the configuration data from the Incident Commander's SOP into the Incident Workspace. Subsequently, when a user joins this incident, the configuration data is loaded from the Incident Workspace and not the user's SOP Workspace. This assures that all users in an incident are using the same version of the configuration data as the incident commander.

Data Management

The e.ICS application uses secure, peer-to-peer, collaborative file systems called workspaces to share data. Our implementation relies on Microsoft Groove to provide this functionality. We use three different workspaces, each handling a critical aspect of collaborative incident command. First, as already introduced, the SOP workspace acts as a mostly static repository of standard operating procedures as embodied in the configuration data created through the Organization Chart Builder and e.ICS Configuration, Manager. Next, the incident workspace is specifically created for an actual incident. All data generated in the creation and conduct of the incident through e.ICS is facilitated through the incident workspace. Once the incident is closed, this workspace is archived, never to be used again. Finally, at the opposite extreme, the bootstrap workspace is created once and its contents are used to help initiate and track all incidents. The bootstrap workspace is where user accounts are maintained and logins are validated. When users join an incident, e.ICS automatically consults the bootstrap workspace to discover the name of the incident workspace and to establish appropriate TCP/IP-based communications channels. A list of active incidents and minimal yet essential incident metadata are recorded and shared through the bootstrap workspace.

We will now examine each of these workspaces in detail.

SOP Workspace

An SOP workspace is used to share the configuration data that is deployed through the e.ICS Configuration Manager. An organization may use one or more SOP workspaces. In particular, it may be useful to use one SOP workspace to conduct actual incidents, while another SOP workspace may exist to run training scenarios or to evaluate potential modifications to normal operating procedures. If e.ICS is used as part of a unified incident command and decision support system where multiple agencies are involved, each agency may have its own SOP workspace with a subset of users having access to the SOP workspaces of other agencies.

A named SOP workspace is created on the machine where the e.ICS Configuration Manager is executed, as well as on an external Groove Relay server provided the machine is connected to the internet. This creation occurs when the configuration file is deployed. Other users become members of this workspace through a process of invitation/acceptance/workspace installation on that user's machine. To automate this process, an automatic invitation file is generated using Groove web-services and stored on the configuration machine in a fixed directory. A person can then issue the invitation to join a specific SOP workspace to any or all users using the Groove Virtual Office. Currently, a user must be connected at some point to the internet (or common network) in order to receive and accept the invitation, and to enable installation of the workspace on his machine.

Figure 19:
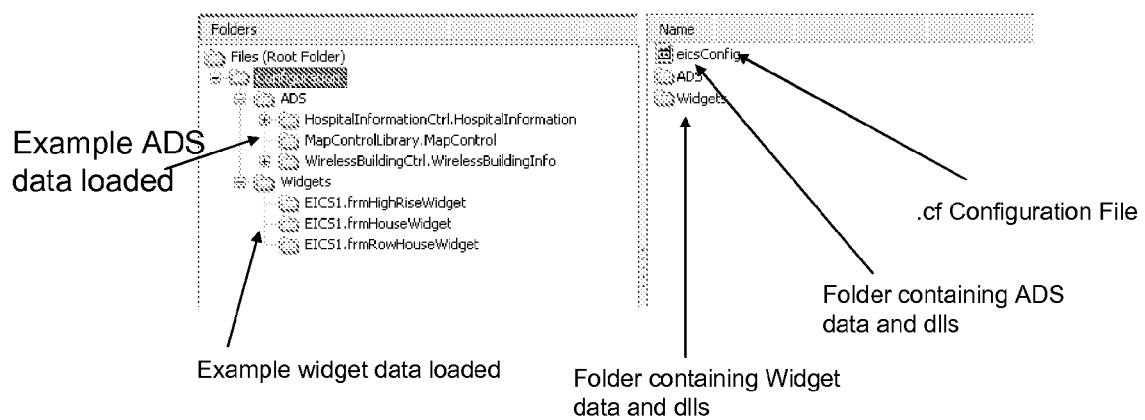
FIG. 19 is a screen shot showing the layout of the SOP workspace.

As shown in FIG. 19, the SOP workspace stores all the declarative settings for behavioral and appearance items that can be established through the Configuration Manager, including information on contacting and initiating external services, and names of ancillary data sources and widgets. Incident types that are created and completed using the Organization Chart Builder and registered through the Configuration Manager are placed in the SOP workspace, including the hierarchical command structure, role-specific tasks and checklists, and items that can be recorded and tracked through the event log. All of this data is serialized and stored in the "eicsConfig.cf" file. Functional extensions in the form of alternate data sources and widgets reside in the SOP workspace as dynamic link library files. Ancillary files used by specific alternate data sources are also placed here. When e.ICS is launched, if necessary the ancillary files are moved on the user's machine to mirror locations based on where they resided at the time of deployment of the e.ICS Configuration Manager machine. Additional steps have been incorporated to expedite this process, including using zipped files to copy ancillary files, and maintaining version information to ensure consistency with the established incident commander's configuration data.

If a user has multiple SOP workspaces, then ultimately the selected SOP workspace is based on which incident type that user activates. If the same incident type occurs in more than one SOP workspace, then the name of the SOP workspace is shown to differentiate them. When a user creates an incident, all the data within the SOP workspace is used to establish the behavior and appearance of e.ICS and to extend its functionality through alternate data sources and external collectors. Finally, before anyone else can join the incident, the configuration data is copied from the SOP workspace to the incident workspace. Any users joining the incident use the configuration data from the incident workspace, and not from their corresponding SOP workspaces. This guarantees consistency in e.ICS configuration for all users in the incident.

Shown in FIG. 19 is a typical layout of an SOP workspace. The ".cf" configuration file contains serialized data covering behavioral and appearance settings, including incident type definitions and hierarchical command structures and roles. The ".cf" file also details names of external services, alternate data sources and incident type widgets. The dynamic link libraries for alternate data sources and incident type widgets are found in the "ADS" folder and "Widgets" folder, respectively.

Incident Workspace

There is one incident workspace specific to each incident, and only users who join the specific incident become members of its incident workspace. The incident workspace contains all the data generated by users of e.ICS for the specific incident. Since this is a collaborative workspace, all this data is shared with all users who are in this incident workspace.

All incident data is under the "Incident Data" folder within the incident workspace, as shown in FIG. 20. Incident data includes ".wb" files (serialized data detailing all information pertaining and derived from a given user, historically starting as representations of the whiteboard, hence the ".wb" extension), index files (one file per user that contains each user's current ".wb" filename, since each user can have multiple ".wb" files as explained below), background images, and files loaded through the browser component.

FIG. 20 shows the organization of an incident workspace. Each user who is in this incident has an index file and one or more ".wb" files. The view of e.ICS that is displayed results from the e.ICS application methodically loading and processing the ".wb" files for all the users. To ensure that data is shared with all users, the ".wb" files are not allowed to grow beyond a set size; instead, the active ".wb" file is made inactive by updating the user's index file to point to a new ".wb" file, and the newly named ".wb" file for a given user begins to capture the user's interactions with the incident from that point.

Figure 21:
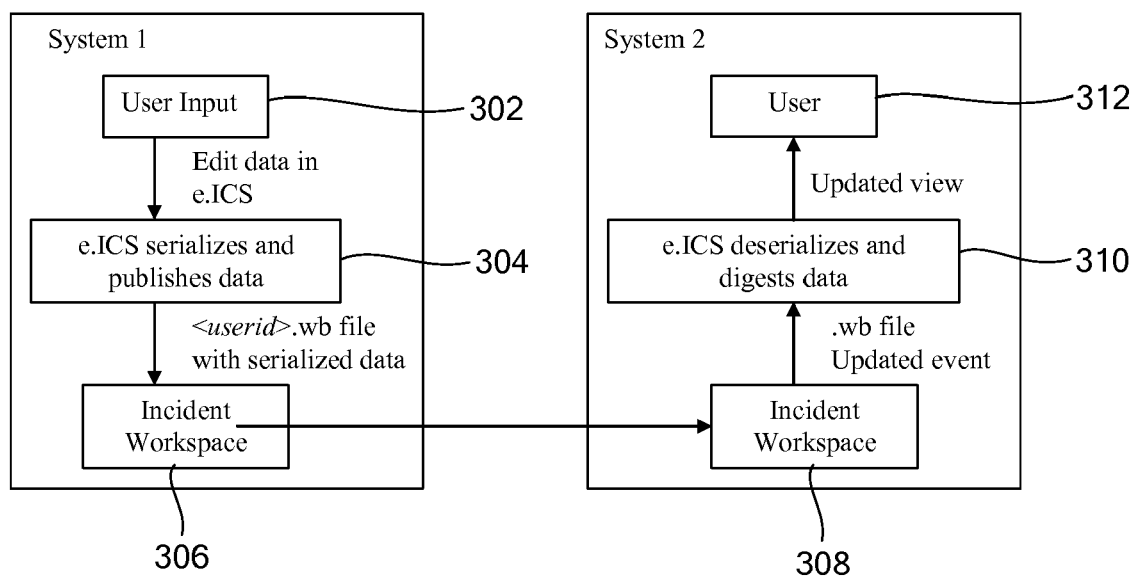
FIG. 21 is a flow chart of the process of updating other user machines.

Once a user joins a specific incident, e.ICS establishes a listener for file events within the incident workspace. When an event occurs due to another user's interactions with their copy of e.ICS, the data is downloaded into e.ICS (this happens to all active users running e.ICS for this incident), processed, and as necessary, the user's screen is updated as shown in FIG. 21. Likewise when a user adds data through e.ICS that needs to be shared, the data is written to the incident folder for others to process. FIG. 21 shows the general process for updating e.ICS on other users' machines whenever a user causes a change to his state. As shown in process block 302, input from a user is provided in system 1 where the user edits the data in e.ICS. As shown in process block 304, e.ICS serializes and publishes the data. As shown in process block 306, the users .wb file is updated with the serialized data in the incident workspace. As shown in process block 308, the .wb file in the incident workspace in system 2 is updated. As shown in process block 310, the updated .wb file is deserialized and the data is digested. As shown in process block 312, an updated view is provided to the user of system 2.

The ".wb" file contains all information about the incident for e.ICS. Particular information in serialized form includes owned resources (consisting of roles, sectors, and units), passed resources, confirmed resources, annotations, use of fire symbology, events, group chat messages, published alternate data, incident start time, background images, CAD data, strategy, reminders, alarms, incident summary, and the user's IP address.

Each user's ".wb" file contains all serialized message-based data published by the user. Therefore, the size of this file would continue to grow throughout an incident. Testing shows that the Microsoft Groove application performance degrades when it attempts to synchronize files that are greater than one megabyte. In turn, this causes the user's machine to become sluggish or non-responsive. On the other hand, designing the architecture so that each message is in its own small file is inefficient due to the overhead of file creation and directory updates.

Instead, e.ICS uses a balance of both approaches. Whenever a whiteboard object is serialized and written to Groove, a check on the ".wb" file size is done. If the file is greater than a programmatically configurable amount, e.ICS stops writing to the existing ".wb" file, truncates old information pertaining to passed resources (which is still available in older and now unchanging ".wb" files), establishes a new ".wb" file into which the state is written, and modifies the ".index" file to point to the new ".wb" file. The ordering of the ".wb" files is maintained within the ".wb" files themselves, enabling reconstruction of an incident state whenever a user joins anew.

Bootstrap Workspace

The bootstrap workspace is a central repository of data common to all collaboration-enabled e.ICS users. In essence, it is a directory, or "Yellow Pages" of information that all e.ICS users need to be aware of in order to collaborate. Therefore, only users that are part of the same bootstrap workspace are able to collaborate. In most cases, each user belongs to only one bootstrap workspace, but in the case of a compartmentalized security scheme, it is possible for a user to be a member of more than one bootstrap workspace. For instance, in the case that Users A, B, and C exist, but collaboration is only enabled between Users A and C and between Users B and C, and not between Users A and B, User C would have two bootstrap workspaces, one shared with each of the other users, but the other users would only have one. For simplicity purposes, the rest of the document assumes each user is only a member of one bootstrap workspace.

Figure 22:
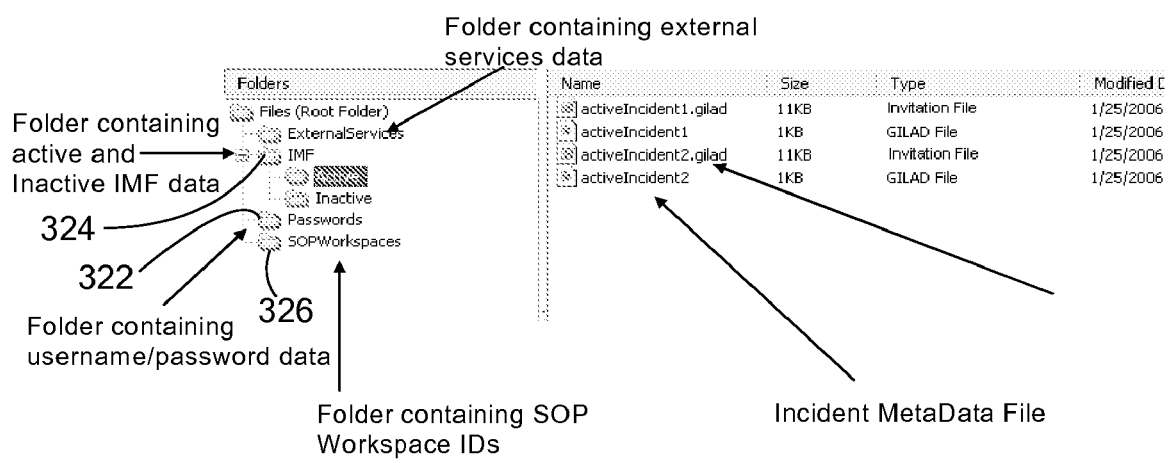
FIG. 22 is a screen shot showing the structure of the bootstrap workspace.

The bootstrap workspace file system is shown in FIG. 22 and includes the following folders and data as to be described. A "Passwords" folder 322 which contains User/Password information encoded with an MD5 one-way hash. This information enables an organization to restrict access to the e.ICS application except to users they have authorized through the e.ICS Configuration Manager under the "Accounts" tab.

Also included is an "IMF" folder 324, or Incident Metadata Folder, that contains information about the active and inactive incidents in the "Active" and "Inactive" subfolders, respectively. On startup, e.ICS prompts the user to join an existing incident or create a new incident. Existing incidents are read from the Active subfolder and if the user decides to create an incident, a new file is created within this subfolder so others can join. When the Incident Commander exits e.ICS, he is prompted with the option to mark the incident inactive at which point the incident information is moved from the Active subfolder to the Inactive subfolder. Each file in the Active/Inactive folder is an IMF record in the form of a semi-colon delimited string, containing the following information:

a. Incident Workspace ID, which is a unique ID assigned to the incident workspace;
    b. IP address of the machine used by the incident commander;
    c. Port on which the API Server is listening;
    d. Key for the Incident, which is a unique id generated on incident creation;
    e. Folder path of incident data, which specifies the folder path within the Incident Workspace where the incident data can be found;
    f. User ID of the incident commander;
    g. Incident start time;
    h. SOP Workspace ID, which is a unique ID of the SOP workspace where configuration data is stored for this incident;
    i. Invitation File Path, which gives the location within the bootstrap workspace of the file that enables the user to be invited into the incident workspace, giving him access to the incident data and the ability to share his own data about the incident.

Also included is an "SOP Workspaces" folder 326 which contains a list of Ids of the available SOP workspaces that were created through the e.ICS Configuration Manager.

Several important functions are handled through the Bookstrap workspace. First, in order to create or join an incident, the bootstrap workspace must be consulted to coordinate the process. The bootstrap ultimately ensures that only one person is the incident commander at any given time for any given incident. Second, all user accounts are maintained through the bootstrap since users need to login before they can select an incident to join. Third, potential incident types are gathered from the set of SOP Workspaces. Once the incident commander selects the incident type, the appropriate configuration data from the corresponding SOP Workspace is moved to the incident workspace.

e.ICS Initialization

The following is an example of how e.ICS interacts with the bootstrap, SOP, and incident workspaces during startup of e.ICS. It is assumed that e.ICS, the bootstrap, and SOP Workspaces have been successfully installed and configured on each user's machine.

Creating an Incident

Figure 23:
FIG. 23 is a screen shot of the login screen.

Alice comes to a fire scene and invokes e.ICS. She is prompted for a username and password (see FIG. 23), fills out the information and clicks the "Login Button." The e.ICS application deserializes the PasswordManager object from the bootstrap workspace and validates Alice's login information. If Alice cannot recall her account name or password, she can press the "Login Assistance" button on the login screen. In this case, if the incident commander (IC) has already created the incident, then a message is automatically sent to the IC along with an optional note from this user requesting that the IC vouch for the authenticity of the user. If the IC validates the user, then the user is able to join the incident without providing an account name and password. If the IC denies this request, then the application fails to log in the user and the application exits for that user. FIG. 23 is a screen shot of the e.ICS login screen.

Figure 24:
FIG. 24 is a screen shot of the incident select screen.

After Alice successfully logs in, e.ICS extracts a list of the active incidents from the IMF/Active folder path in the bootstrap workspace and prompts Alice to select an active incident or create a new incident. As shown in FIG. 24, a user can create a new incident, or choose to join an incident from a list of active incidents. The user becomes the incident commander if he creates the incident. This role can be passed to another user, if necessary.

Figure 25:
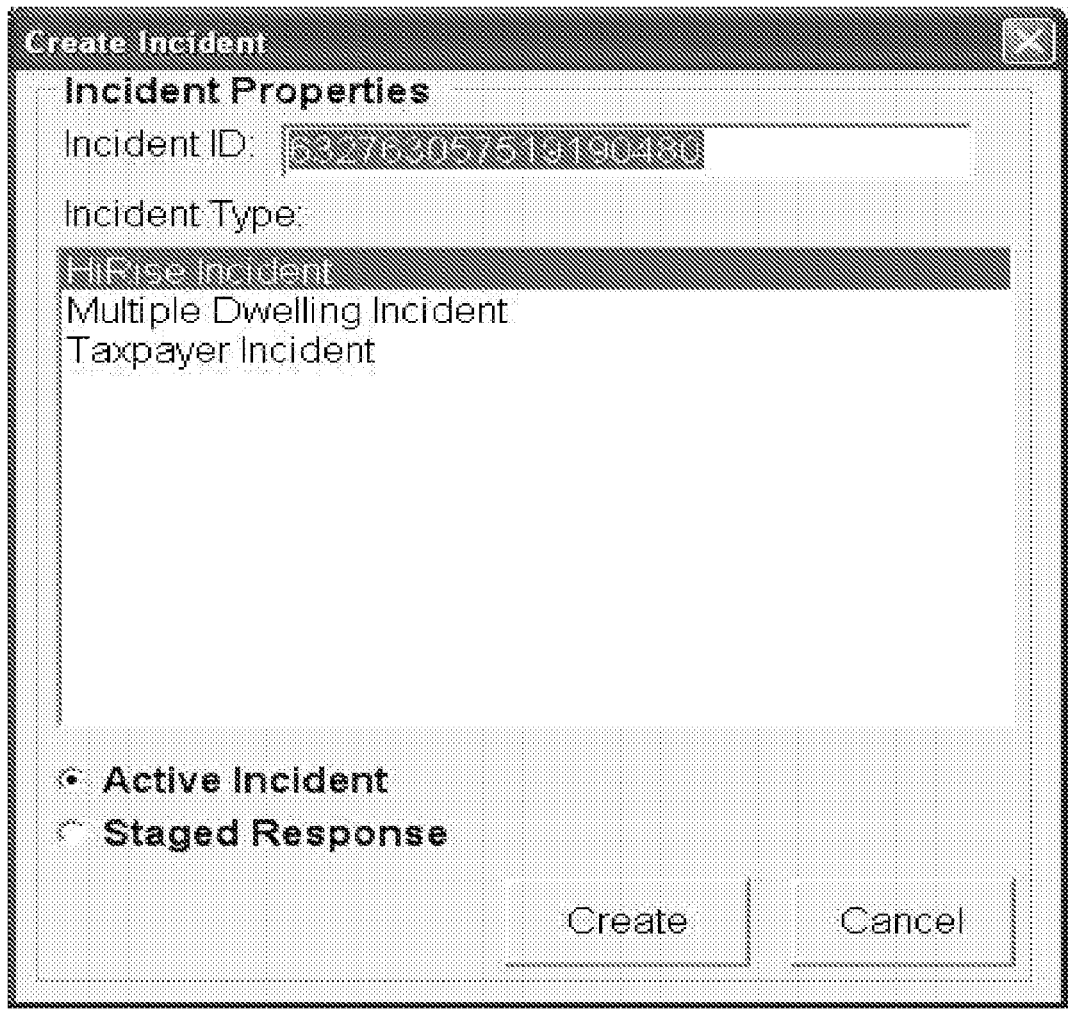
FIG. 25 is a screen shot of the create incident screen.

If Alice is the first to enter e.ICS for this incident, then the incident needs to be created. Since she is creating the incident, she is automatically the Incident Commander for that incident. (If a she does not want to be recognized as the IC, then she should not choose "Create Incident", instead, she should select "Join Incident" once the incident is established by another user, as described below.) She clicks the button to create a new incident. This causes e.ICS to loop through the SOP workspaces list in the SOP Workspaces folder in the bootstrap workspace. Here, e.ICS attempts to read the configuration file from each SOP workspace (this will fail if Alice is not a member of the workspace) to assemble a list of available incident types. If there are no available incident types, Alice is notified that she cannot create an incident since her configuration files do not contain any incident types. If more than one incident type is found, Alice is prompted to input the Incident Tag and select one of the incident types, as shown in FIG. 25. If Computer Aided Dispatch (CAD) is available, and set up correctly as a service through the Configuration Manager, then the Incident Tag is automatically filled out with this information. If CAD is not available, Alice may enter a name for the incident, or keep the unique ID that e.ICS creates when CAD is not available.

As shown in FIG. 25, once the user chooses to create an incident, the incident ID must be entered (or supplied automatically from a CAD system through the e.ICS CAD API.) The user selects one of the available incident types, and also has the option of loading a previously staged response (which would also be listed under the Incident Type collection).

When the "Create" button is pressed, the incident is created with this user as the Incident Commander.

Figure 26:
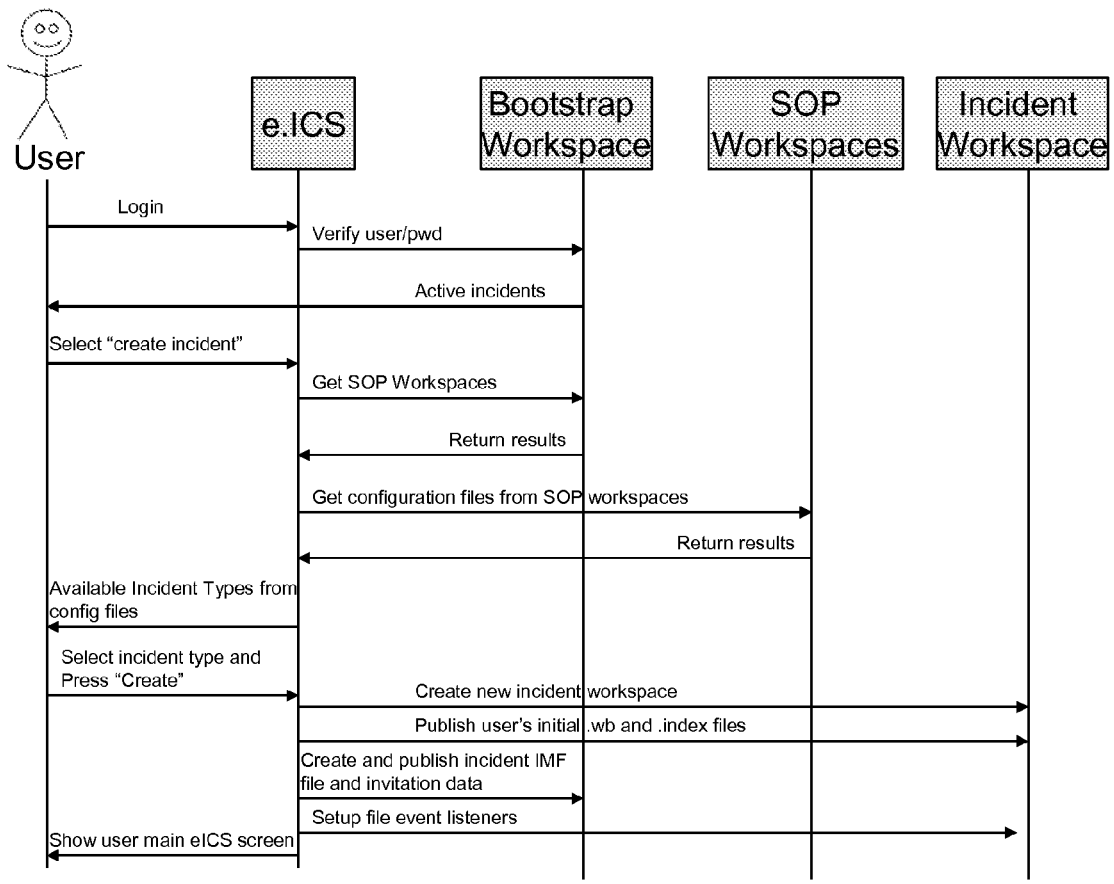
FIG. 26 is a sequence diagram of activities that occur when a user logs in to e.ICS and creates an incident screen shot.

Alice next selects the "Create" button after entering the necessary information. This causes e.ICS to create a new incident workspace dedicated to this incident. Then e.ICS creates the IMF record including the information listed under the Bootstrap Workspace section described above. This IMF record and the incident workspace invitation data are written to the IMF/Active folder in the bootstrap workspace. Finally, The "alice.wb" and "alice.index" files are created to share data with other users, and e.ICS begins listening for new file events in the incident workspace. A sequence diagram for this process is shown in FIG. 26.

After successfully creating an incident, the incident command screens are displayed, customized for the selected incident type with specific information as provided through the CAD system, assuming it is available. In particular, a list of deployed units is shown at the top of the whiteboard screen. If the specific location of the incident is known, then the map screen displays a map centered on that location. The incident summary screen shows a text summary of the incident name, type, location, time, severity, units and commanders involved. This information is shared through the incident workspace, so other users who join this incident are able to view it.

Joining an Incident

Once an incident has been created, then all other users signing in to e.ICS will be able to join that incident by choosing it from the list of available incidents. For instance, Bob arrives on scene and starts his version of e.ICS. After the login process, he is also prompted to select an incident or create a new one. Assuming he and Alice have network connectivity, he will see the incident that Alice created since they are both part of the same bootstrap workspace.

Figure 27:
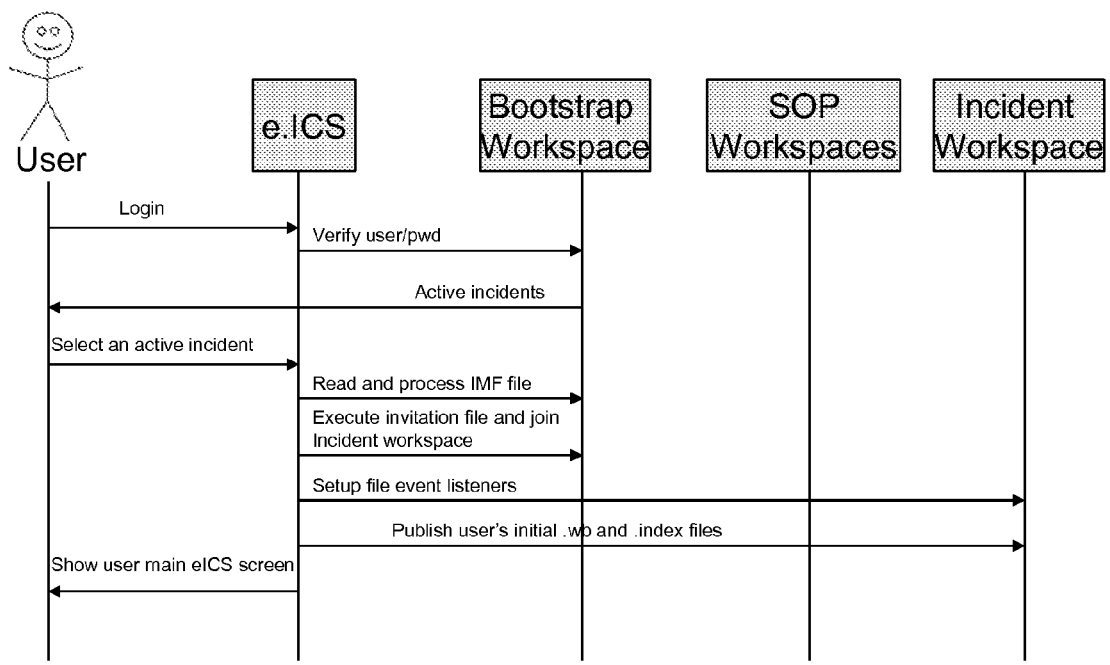
FIG. 27 is a sequence diagram of activities that occur when a user logs in to e.ICS and joins an incident.

Bob selects that incident and clicks the "Join" button. Using the information in the IMF record and the invitation data, Bob is automatically invited into the incident workspace for the incident he selected. First, the incident workspace is downloaded and installed. The workspace contains one or more ".wb" files since the incident already has one or more members. The clock on Bob's machine must now be compared against the incident time. A separate thread gathers IP addresses from the ".wb" files, and uses this pool of addresses to find an incident time server on another user's machine. Upon connecting, several requests for incident time on that machine are made and compared against Bob's clock. A delta for Bob's clock is computed and stored on Bob's local file system. Bob's machine now starts its own incident time server and is able to assist new users in establishing their incident time deltas. (The delta can be recomputed periodically to avoid clock drift.) The "bob.wb" and "bob.index" files are written to the "Incident Data" folder and e.ICS begins listening to file events. Now any time e.ICS updates any user's ".wb" or ".index" files this causes the Microsoft Groove package to fire an event signifying the file update on the other users' machines. This event causes a given user's e.ICS executable to process the changed file and to redraw the e.ICS displays accordingly. FIG. 27 shows the sequence diagram as just described.

It is now understood how each user in the incident has copies of everyone's ".wb" files on their machine. We can now describe how soft and hard resets are performed with minimal loss of data. Recall that a soft reset occurs when a software application fails. Here, a user restarts the application, rejoins the incident and e.ICS re-establishes the user's workspace files and displays the incident in e.ICS based on the data within those files. Meanwhile, updates from other users continue to queue up until the system is restarted, at which point the changes are ingested and processed. As a result, the user loses no data and the recovery is successful.

A hard reset is similar, except the user must switch to another machine. The user logs in to another machine, joins the incident, and e.ICS creates the incident workspace and its files on this second machine. Meanwhile, all the ".wb" files from all the users come into the workspace on this second machine, including this user's ".wb" files from up to the point where his first system crashed. Since the user uses the same user name to sign onto the second machine, his state is recaptured because his ".wb" files are restored through the shared workspace. The recovery is again successful, with minimal or no data loss. Note there is a possibility that the user's final events do not get shared fast enough due to the frequency of event updates.

If all users at an incident suffer equipment failure to the point that no machine is available from which to recover the incident, then this is catastrophic failure. To overcome this, a remote machine, such as one at an emergency operations center, must also join the incident as early as possible. If it is possible to relay data from the local area network to a second network (possibly through an aircard via a CDMA connection, for instance), then a user at the remote site could be an active participant in the incident, receiving ".wb" file updates throughout the incident. A user at the fireground could then recover by connecting to this user from a fresh machine to restore pertinent data sets and workspaces. Additionally, an override of the incident command role might be required in the worst case.

A description of the general layout of each of the standard e.ICS screens is provided next.

Incident Command Screens

Figure 28:
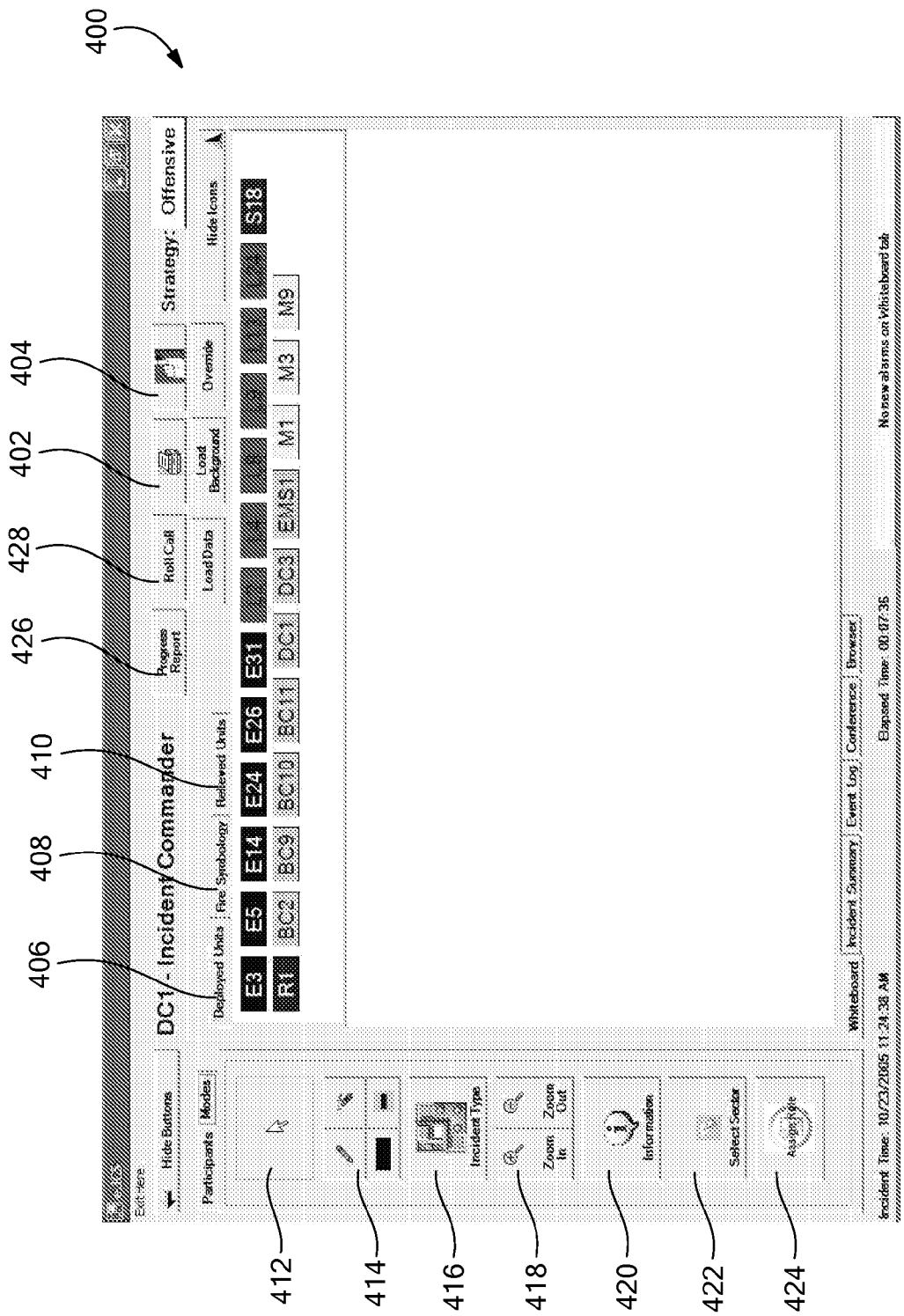
FIG. 28 is a screen shot of the whiteboard main incident command screen.

Six different screens provide specific information relevant to the on-going incident. The screens are labeled as the Whiteboard, Map, Event Log, Incident Summary, Conference, and Browser. Each screen is accessed by selecting the appropriately labeled tab from among those listed along the bottom of whichever screen is currently displayed such as shown in FIG. 28.

When the incident commander creates the incident in e.ICS, the incident time is established from the clock on the incident commander's computer. The elapsed time reflects how much time has passed since the incident was created in e.ICS. Both of these times are displayed at the bottom of all screens. The incident time and elapsed time of any user who joins this incident are synchronized to match the established incident time and elapsed time, respectively. Note that the system clock is not modified on any user's machine, so it is likely that the displayed incident time does not match the system clock on any user's machine other than the original incident commander's. The original incident commander can pass command and exit the incident without affecting the incident time computation since every user who has joined the incident can supply the incident time from their incident time servers. In the worst case where all users fall out of the incident (causing their incident time servers to terminate), incident time is re-established if any machine that previously had participated in the incident rejoins and recovers the delta that was stored on the machine's local file system when the user originally joined the incident. This user's incident time server is then activated. Users can then establish incident time as before.

Users can keep track whether anything of significance is occurring on the whiteboard even while they view other tabbed screens. An "alarm notification" display is always present at the bottom right corner of the screen. Any events triggered by timers expiring are displayed in a stacked fashion at this corner. These events are cleared a short time after the user switches to the whiteboard view. This mechanism helps users maintain situation awareness over critical events no matter which portion of e.ICS they are viewing.

Certain buttons and text displays are always visible, regardless of which screen is currently being viewed. At the top of the screen are a Print button 402 and a General Reminder button 404. The Print button 402 is used to send the current screen to a printer or a file on the user's local machine. Numerous print options are provided. The General Reminder button 404 allows a user to enter text (either typewritten or hand-drawn) and associate a timer with this note. After the specified number of minutes, the reminder will pop up on the user's screen. Any number of reminders can be created, independent of each other. Reminders are not shared with other users—they only apply to the user who is signed in to this copy of e.ICS. If for some reason the user leaves e.ICS and restarts the system, or uses another machine and signs into e.ICS using the same e.ICS account name, then any of his active reminders are still available and will display when each expires. Pending reminders can be reviewed at any time by selecting the General Reminder button 404. Reminders can be cancelled, altered, and re-issued. Reminders are not placed in the shared incident event log.

As shown in FIG. 28, the Whiteboard screen 400 is the main incident command screen for e.ICS. The top portion of this screen shows three tabbed panels, representing "Deployed" units, "Fire Symbology" and "Relieved" units.

The "Deployed" tab 406 shows a set of icons representing those units that have been deployed to the incident through the CAD system, if applicable. If supported through the CAD system, e.ICS depicts units that are en-route as grayed out, whereas units that have arrived on-scene are shown colored according to their unit type, as defined previously through the Configuration Manager (under the "Unit Types" tab). If the CAD system is not hooked into e.ICS (or is unreachable or malfunctioning), then the IC needs to manually enter the units as they become known by using the "Add Unit" button specific to the IC's Whiteboard display (described further in the "Special Abilities of the IC" section below). Units are typically labeled by a prefix designator that indicates their type along with a unit number, such as E22 for "Engine 22" or BC9 for "Battalion Chief 9." (See the "Unit Types" tab under the "Configuration Manager" section above.)

The "Fire Symbology" tab 408 displays a number of icons that can be used to annotate the whiteboard view, as described below.

The "Relieved" units tab 410 can be used to remove units from the whiteboard view once they are no longer in use at the incident. Any user in charge of a unit can move that unit to the "Relieved" units tab. However, only the Incident Commander can take a unit from "Relieved" and place it in a sector on the whiteboard view.

The large white space that dominates the whiteboard screen below the deployed units area is the drawing area, or actual whiteboard. This section is used to display a logical view (as opposed to the actual physical view) of the layout of the incident. Sectors are drawn on the whiteboard (either by hand or through use of the Incident Type widgets described below). The whiteboard shows which units are in which sectors, as well as which sectors are under direct management of the specific user who is signed in to this instance of e.ICS. In particular, each user's view of the whiteboard screen is customized for that individual user. Sectors that are not controlled directly by that user are depicted with a gray background, whereas sectors assigned to that user have a white background.

A set of large buttons runs along the left-hand side of the Whiteboard screen 400. These are modal buttons that define how a user's touch should be interpreted when the user selects an item on the drawing portion of the whiteboard (see Table 1). Only one modal button is active at a time. The shape of the cursor represents the selected modal button. As shown in the table below, the modal buttons from top to bottom are Pointer 412, Annotation 414, Incident Types 416 (only available on the incident commander's screen), Zoom In/Out 418, Information 420, Select Sector 422, and Assign Role 424.

TABLE 1

| Modal Button | Purpose |
| --- | --- |
| Pointer | Sector creation, unit movement, fire symbology movement |
| Annotation | Free-hand drawing on whiteboard (not sector creation) |
| Incident Types | Use of predefined or customized sector drawing tools |
| Zoom In/Out | Switch from whiteboard to floor plan view; change level of detail of viewed image |
| Information | Query or provide sector- or unit-specific details |
| Select Sector | Highlight sectors in preparation of assigning responsibility for them |
| Assign Role | Establish new role, or assign chosen sectors to existing role |

The "Pointer" button 412 allows the IC to create a sector on the whiteboard by outlining its shape. The connected boundary of the sector is drawn as the IC moves his finger. If the IC lifts his finger away from the screen after starting to draw a sector, then the system automatically completes the polygon by drawing a straight line from the final point where the finger touched the screen to the initial point for this sector shape. Once a sector is drawn, e.ICS presents a list of possible sector names (as defined through the Configuration Manager and the Org Chart Builder). The IC can also use the "Generic" button to provide a sector name different from those presented, or the IC can select the "Reject" button to cancel creation of this sector (in which case the nascent polygon disappears). If a sector name is chosen or provided, then the sector is labeled with the chosen sector name. If a role is associated with that sector name (as defined through the Org Chart Builder), then this newly defined sector is automatically assigned to the user fulfilling this role (if defined). If no user has this role, then e.ICS provides a list of users who are in the incident to the IC. The IC can assign the role to one of these users, or opt to keep the role for himself. Optionally, the IC can "Reject" assigning the role, in which case the creation of the sector is canceled and the sector polygon disappears as before. If the IC assigns a role to a user, then that user must accept or reject the role. The IC maintains control and responsibility of the role even after the chosen user accepts the role. After the IC is notified automatically that the chosen user has accepted the role, the IC needs to confirm the acceptance. Once this occurs, the chosen user has control and responsibility of any sectors assigned to this role. These sectors are drawn with a white background on the chosen user's whiteboard and with a gray background on the whiteboards of everyone else.

A sector that contains no units can be deleted by its owner. Due to the collaborative nature of the system, it is possible that someone else may have moved a unit into a sector that the sector's owner believes is empty. If the owner deletes the sector on his machine while it has units in on another machine, then e.ICS soon discovers this when it processes the ".wb" file of the person who moved the units into the sector whose owner is trying to delete. In this case, the sector is restored under the control of the owner. (If the sector truly needs to be deleted, then the units need to be sent back to the sender so that it is again empty, and the user can then again delete it.)

The "Annotation" group of buttons 414 allows a user to draw on the whiteboard using a chosen line thickness and color. When this button is active, then any time the user traces on the whiteboard, a corresponding line with the selected attributes is added. This annotation appears on all user Whiteboard screens. Annotations are fully shared, and are drawn behind any sector boundaries or units on the Whiteboard. An eraser setting can also be chosen from the "Annotation" button group. This combined with the chosen line thickness causes the removal of any annotations when the user traces over a given area of the Whiteboard. Erasures are also fully shared among users in the incident. Any user can erase any existing annotations.

The whiteboard view can be created either manually by drawing sectors by hand (already discussed), through the use of a template, or through the use of a background image. The incident commander can draw sectors using predefined templates by selecting the "Incident Types" button 416 (see also FIG. 29 and FIG. 30). A widget assigns an initial name to sectors that it creates, but these sectors are renamed once the sector is explicitly selected and assigned to a command role. By default, a template for drawing high rise sectors and another for laying out taxpayer fires can be accessed through the Incident Widgets button. An organization can add its own incident widgets to expand the capability of the system further.

Figure 29:
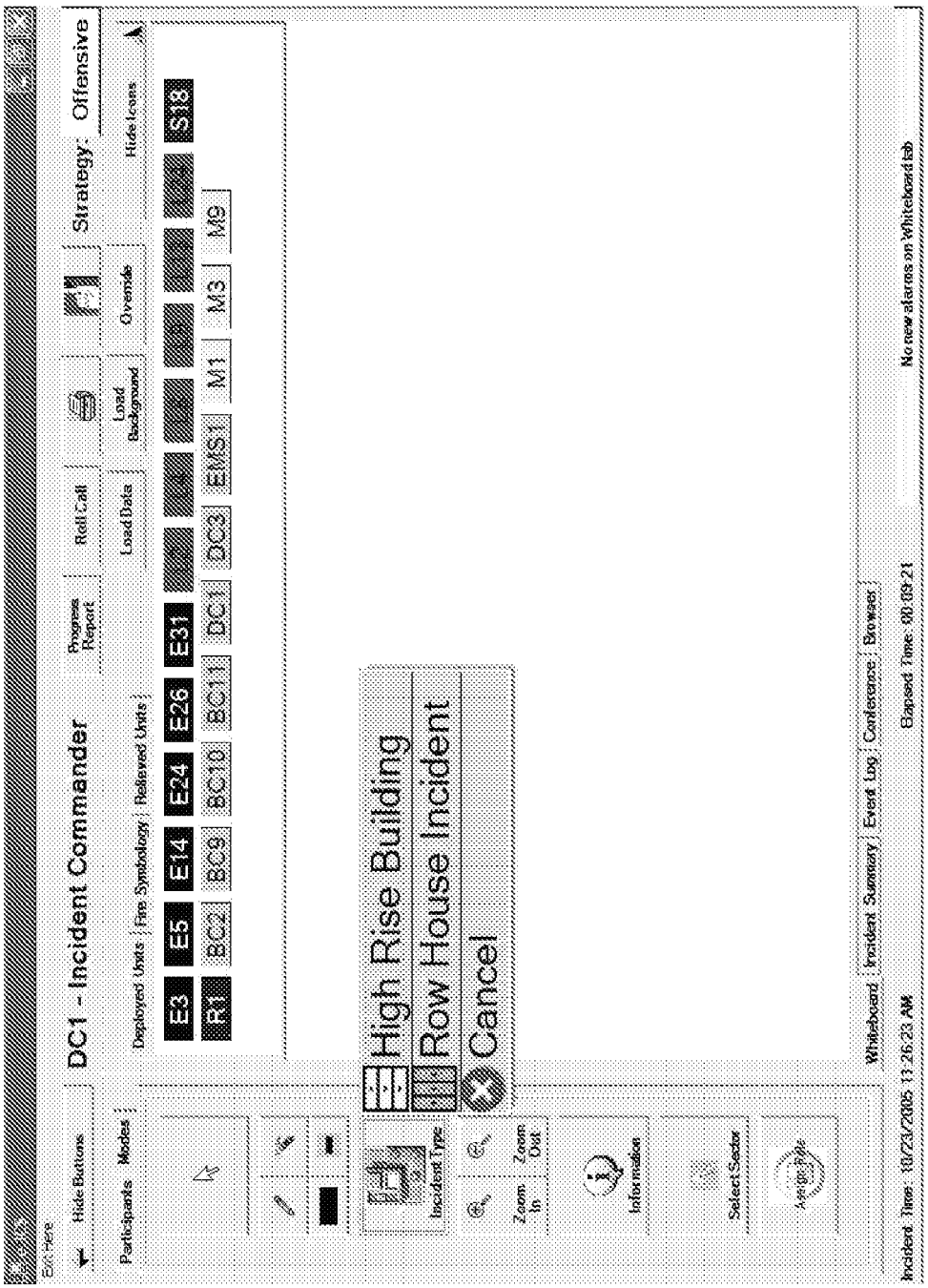
FIG. 29 is a screen shot showing a selection of templates from the incident types modal button selection.
Figure 30:
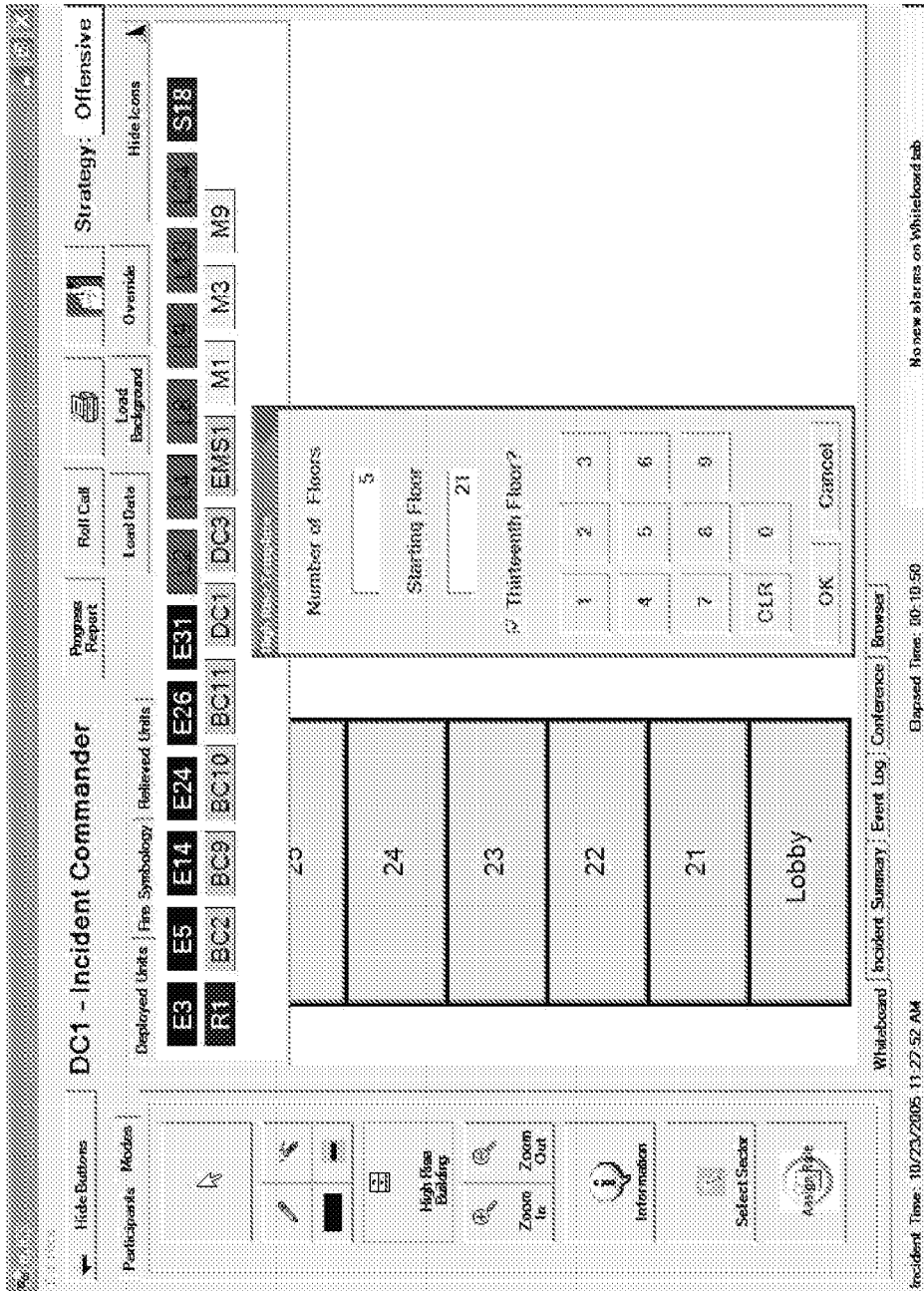
FIG. 30 is a screen shot showing the resulting screen from selecting the high rise button.

The Incident Types modal button 416 provides a selection of templates for drawing sectors on the whiteboard as shown in FIG. 29 and as shown in FIG. 30, a high rise widget produces a tower of sectors logically equivalent to the floors of a building. Only those sectors of interest for managing the incident are drawn. This widget can be used multiple times during an incident, with the interpretation left to the user. For example, Fire operations can be tracked on the left hand building, while on the right another copy of the building could be used to manage Emergency Medical Services (EMS) operations.

Figure 31:
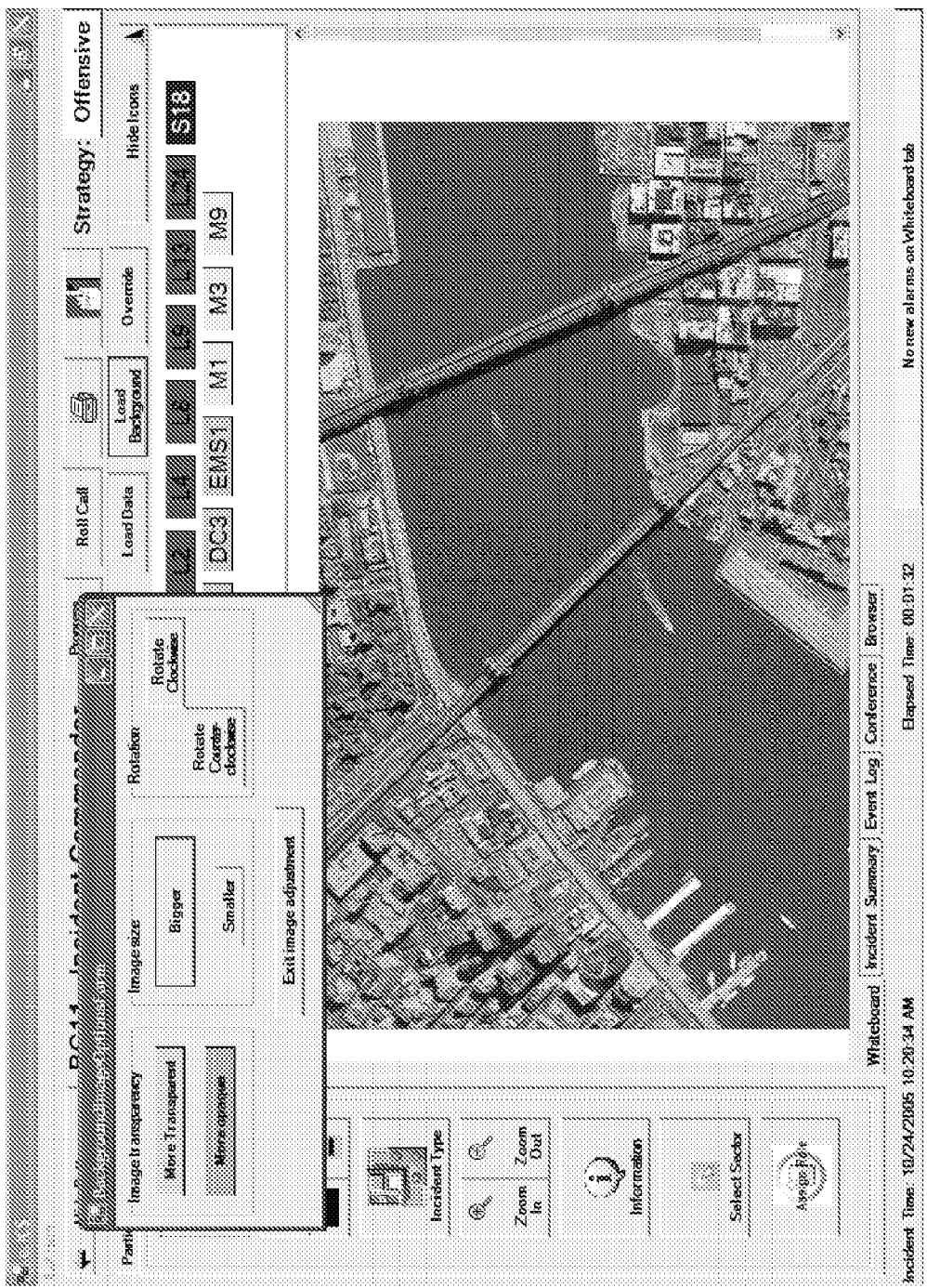
FIG. 31 is a screen shot of a background image loaded onto the whiteboard.
Figure 32:
FIG. 32 is a screen shot of sectors as drawn with respect to the background image.
Figure 33:
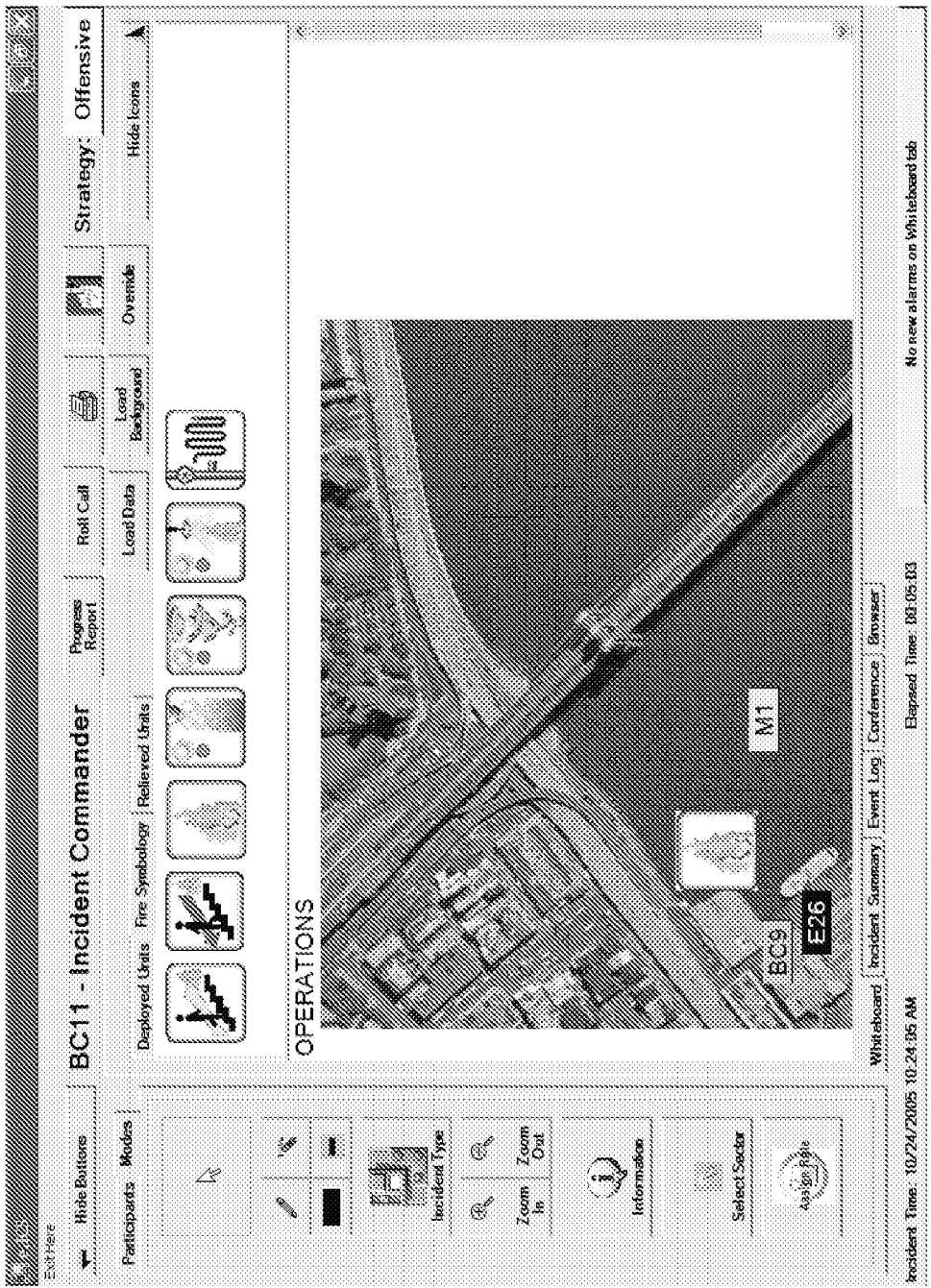
FIG. 33 is a screen shot of a sector view produced by zooming in to a sector on the whiteboard.

A background image can be placed on the whiteboard, over which sectors can be drawn. Only the Incident Commander can load a background image onto the whiteboard, and this must be done prior to placing any sectors or annotations on the whiteboard. The "Load Background" button is found above the Deployed Units tab 406. A file from the user's local machine can then be selected, sized for the display and oriented. Once this process is completed, the image appears in the whiteboard portion of this screen on all users' machines as shown in FIG. 31. Through the same button menu the incident commander can clear the background image across all machines. Any number of sectors can be drawn on top, using the background image as a reference as shown in FIG. 32. When the "Zoom In" button 418 is selected and a sector drawn on top of an image is chosen, then the sector view consists of the image within the bounding box defined by that sector's outline, along with any associated units within that sector as shown in FIG. 33. A sector view produced by zooming in to a sector on the whiteboard. Units and annotations can be positioned within the sector view, and other users can zoom into this sector to see the same view.

If no background image has been placed on the whiteboard, then the sector view is originally empty. The owner of a sector can associate an image with the sector (such as a floor plan or raster imagery) by using the "Load Background" menu item while in sector view mode. Options are provided for changing the size of the image, and for rotating it to a chosen orientation. Once a background image is defined, this image is shared throughout the incident by all users for this sector. Any user can place any of the fire symbology icons on the chosen image. This is particularly useful for communicating sensor panel readings from the lobby of a high rise building. Likewise, annotations can be drawn on the sector view in the same fashion as on the whiteboard view. Only the owner of the sector can position units within the sector view. Any user that chooses to view the sector receives a current rendering of the sector image, annotations and unit positions. This view updates dynamically as changes are made by anyone throughout the incident.

The "Zoom In" and "Zoom Out" buttons 418 are used to switch between the whiteboard view and a sector view. When the "Zoom In" button is selected and the user then touches any sector on the whiteboard, the whiteboard portion of the screen is replaced by a view solely of the sector. Any units in the sector are also shown in this view.

When the "Zoom-In" button is selected and the sector view image is touched, then a zoomed in view of the sector centered at the chosen location is shown. When "Zoom Out" is selected, this undoes a single "Zoom In" event. When "Zoom Out" is performed on the full sector view, the sector view is replaced by the whiteboard view.

Figures 34, 35:
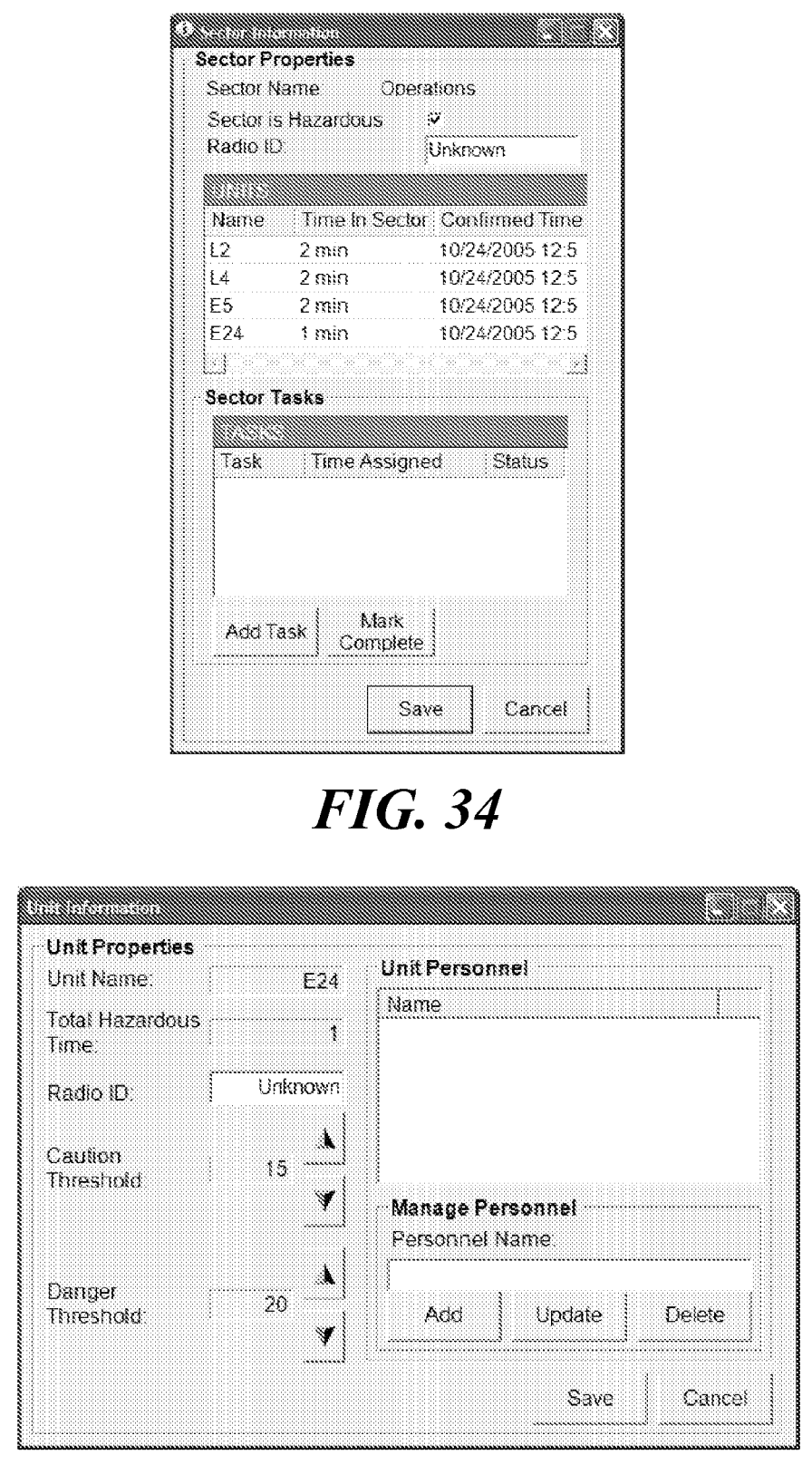

The "Information" modal button 420 causes the cursor to be displayed as a question mark. The user can then select any unit or sector from the whiteboard view or sector view to see detailed information about that item. If a sector is selected, then a listing of the units and their duration within that sector, whether the sector is hazardous, any on-going tasks associated with that sector, and the radio channel for that sector are shown, as shown in FIG. 34. This screen is used to create and assign tasks, to set the radio channel, and to tag the sector as hazardous. Tasks can be preloaded from the incident type definition through the Organization Chart Builder, or created during an incident. Tasks can optionally be logged in the event log when created and completed. As shown in FIG. 34, information about a sector includes its name, the units in the sector and their time in the sector, whether the sector is marked hazardous, the radio ID, and any tasks that are being tracked.

When the "Information" button 420 is selected and a unit is then chosen, detailed information about that unit is presented, as shown in FIG. 35. Names of personnel in this unit can be entered or modified (either through an API call or manually). A radio channel can be defined. A display in minutes of how long this unit has been in the sector is shown, as well as how long this unit has been in a hazardous region. (Note that time accrues from the point the unit is moved to the sector, not from when the unit is confirmed in the sector.) The configured caution and danger thresholds are shown, and can be modified for the chosen unit, if desired. If these times are modified, then they remain in effect for this unit throughout the incident. Information on a unit can include its name, radio ID, how long it has been in a hazardous sector, settings for its caution and danger thresholds, and names of personnel.

The last two modal buttons are "Select Sector" 422 and "Assign Role" 424. Recall that when the "Incident Type" button is used to draw an incident template, a structure is displayed on the whiteboard. Units can be moved into the resulting sectors, but the default names for these sectors are not associated with any specific role. By using the "Select Sector" button, one or more sectors can be chosen. When a sector is selected, its boundary is drawn with red lines. (To unselect a sector, simply touch it again while the "Select Sector" button is active.) When one or more sectors are selected, the "Assign Role" button is replaced by the "Assign Sector" button. When the "Assign Sector" button is chosen, a list of available roles is displayed. These roles are taken from the Organization Chart for the chosen incident type, as defined through the Configuration Manager.

At any given time, three kinds of roles can exist: assigned roles, available roles, and future roles. Assigned roles are roles that are already filled for this incident by one of the e.ICS users. Available roles are roles that have not been assigned to anyone yet, but directly report to one of the assigned roles. Future roles are roles that have not been assigned to anyone yet, and do not directly report to any of the currently assigned roles.

When one or more sectors are selected and the "Assign Sector" button is chosen, then the list of presented roles includes the assigned and available roles. A role in the future roles category is moved into the available roles category as soon as the role to which it directly reports becomes an assigned role. As the incident grows in complexity and more roles are assigned, roles deeper in the organization chart become available.

The user can select one of the roles or, if none of these are suitable, then the user can create a role by choosing the "Generic" role button. The "Generic" button provides the ability to create a role "on the fly" in case unexpected circumstances arise. The user names the role and then selects the role to which this newly created role reports.

If the selected sectors are assigned to a role that already exists within the incident, then these sectors are automatically placed under control of that role. The background of these sectors is white on the whiteboard of the user who is fulfilling this role, and it is gray on the screens of all other users. If the selected sectors are assigned to a role that is available but not yet assigned, then a list of users who are signed into the incident is shown. After selecting a user, the same method of assign/accept/confirm as described earlier is followed to establish the role and the passing of these sectors to the appropriate user.

After the selected sectors have been assigned (or the operation is canceled), the sectors are automatically restored to the normal non-selected state (i.e., they are no longer drawn with red borders). The "Assign Sector" button is replaced by the "Assign Role" button. The "Assign Role" button is used to create a role without associating any sectors with it (either at that time, or ever). This button can be used to establish a Safety Officer or Financial Officer, for instance. When a role is established, if a checklist specific to that role is available, then that worksheet can be accessed through a labeled tab (labeled by the role) that is added to the bottom of that user's screen.

The Incident Commander has two additional buttons available on his display. A Progress Report button 426 can be used to cause an event to be added to the event log when a progress report is made. Also, the progress report alarm, as configured in the e.ICS Configuration Manager, causes a small window to display on the incident commander's screen after the appropriate elapsed time to perform a progress report. The IC can alter the frequency for progress reports or turn off this alarm through this button, also.

Figure 36:
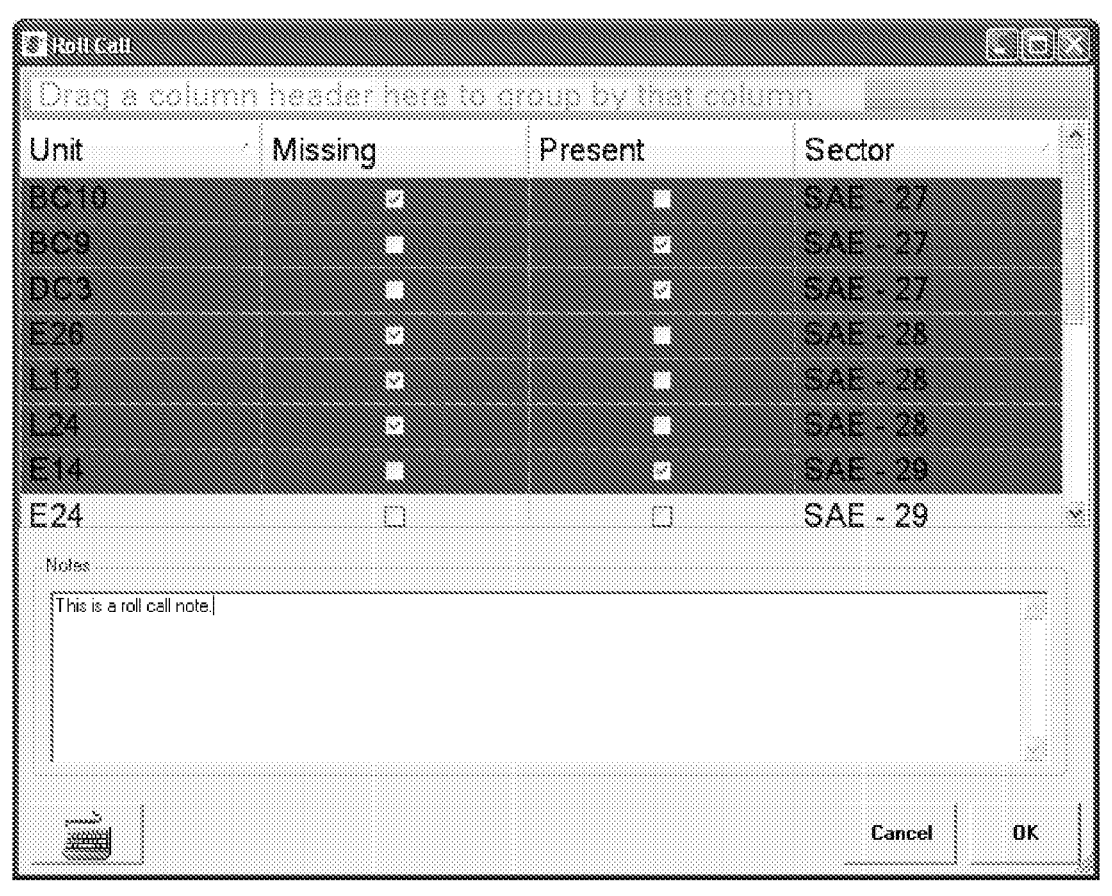

The other function only available to the incident commander is the roll call. The Roll Call button 428 provides an ability for a methodical accounting of units and personnel at any time, as shown in FIG. 36. The roll call can be performed on an individual sector, or comprehensively across all sectors in the incident. Notes can be added to the roll call. Any units marked as not present cause an entry to be made in the event log, along with any notes. The event log always records when the roll call function is activated. A roll call can be applied to a single sector or to all sectors of an incident. Yellow indicates that no categorization has been assessed for that specific unit. Green signifies all members are accounted for, and red represents a unit with one or more missing personnel. The incident commander can add notes in the space at the bottom.

All users can view the current strategy in the upper right hand side of their display. The incident commander can additionally set or modify the strategy at any time by clicking on the strategy field, which is a button on the incident commander's screen only. By pressing this button, a list of choices for possible strategy categories is displayed. This list is defined in the e.ICS Configuration Manager under the "Strategy" tab. Whenever the incident commander modifies the strategy, the change is sent to all users and their screens are updated accordingly. Additionally, an entry is made in the event log. From the strategy button, the incident commander can also disable the strategy alarm, or change the frequency in which the strategy alarm activates. If the strategy alarm is enabled, then an alert will fire in accordance with the chosen frequency to remind the incident commander to re-evaluate the current strategy.

We now turn our attention to the remaining screens accessible from the tabs at the bottom of the whiteboard.

Figure 37:
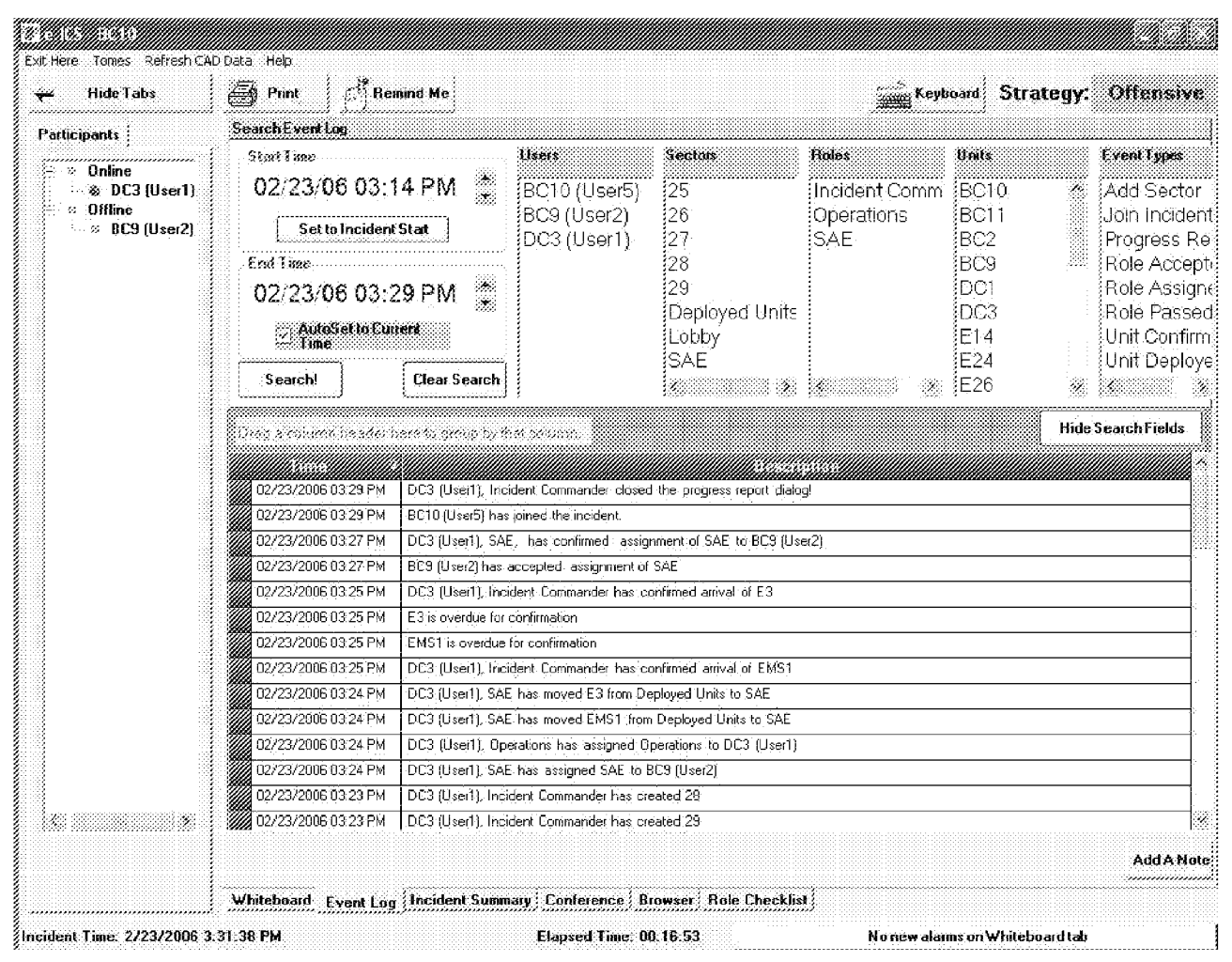

The Event Log screen shows a comprehensive listing of every action performed by any user within the incident workspace as shown in FIG. 37. Each event is time tagged with a timestamp that is synchronized across all users in the incident. A user can quickly ascertain a unit's movements or the scope of his assigned duties by narrowing the event log through the search mechanism. The event log can be filtered to show only those events satisfying a set of boolean conditions (a conjunction of disjunctions). The search criteria consists of start time, end time, users, sectors, roles, units and event types.

The event log can be printed (in full form or filtered), written as a text file with comma separated values, or converted to a database format since the underlying grid is a strongly typed data structure within the NET environment. An event consists of numerous fields, drawn from time of event, initiator, receiver, from sector, to sector, unit, from user, to user, from role, and to role. Each event populates appropriate fields, and a textual representation is produced for the event log description. Since incident time is unified across the incident, entries within the log reflect when actions truly, even though lag time may keep any one user from seeing those events unfold in a single copy of e.ICS at those exact times.

Figure 38:
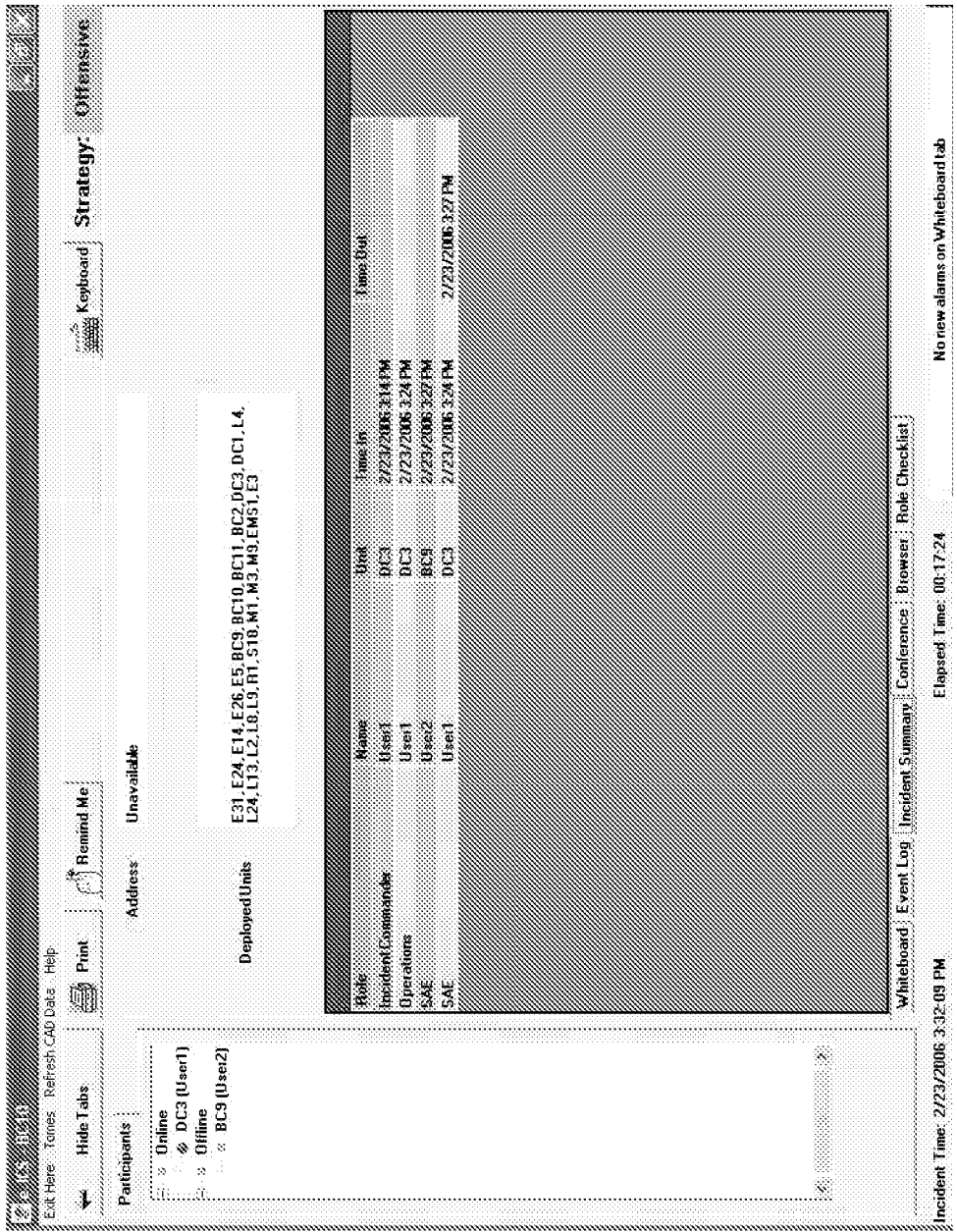
FIG. 38 is a screen shot of an incident summary screen.

The incident summary screen as shown in FIG. 38 provides a high-level view of the incident by showing the incident's address, the deployed units, and the personnel who are currently fulfilling the various roles within the incident. If command is passed from one user to another for a specific role, then multiple entries occur for that role, with the first entry for that role representing the current command, and subsequent entries showing deeper into the incident history.

Figure 39:
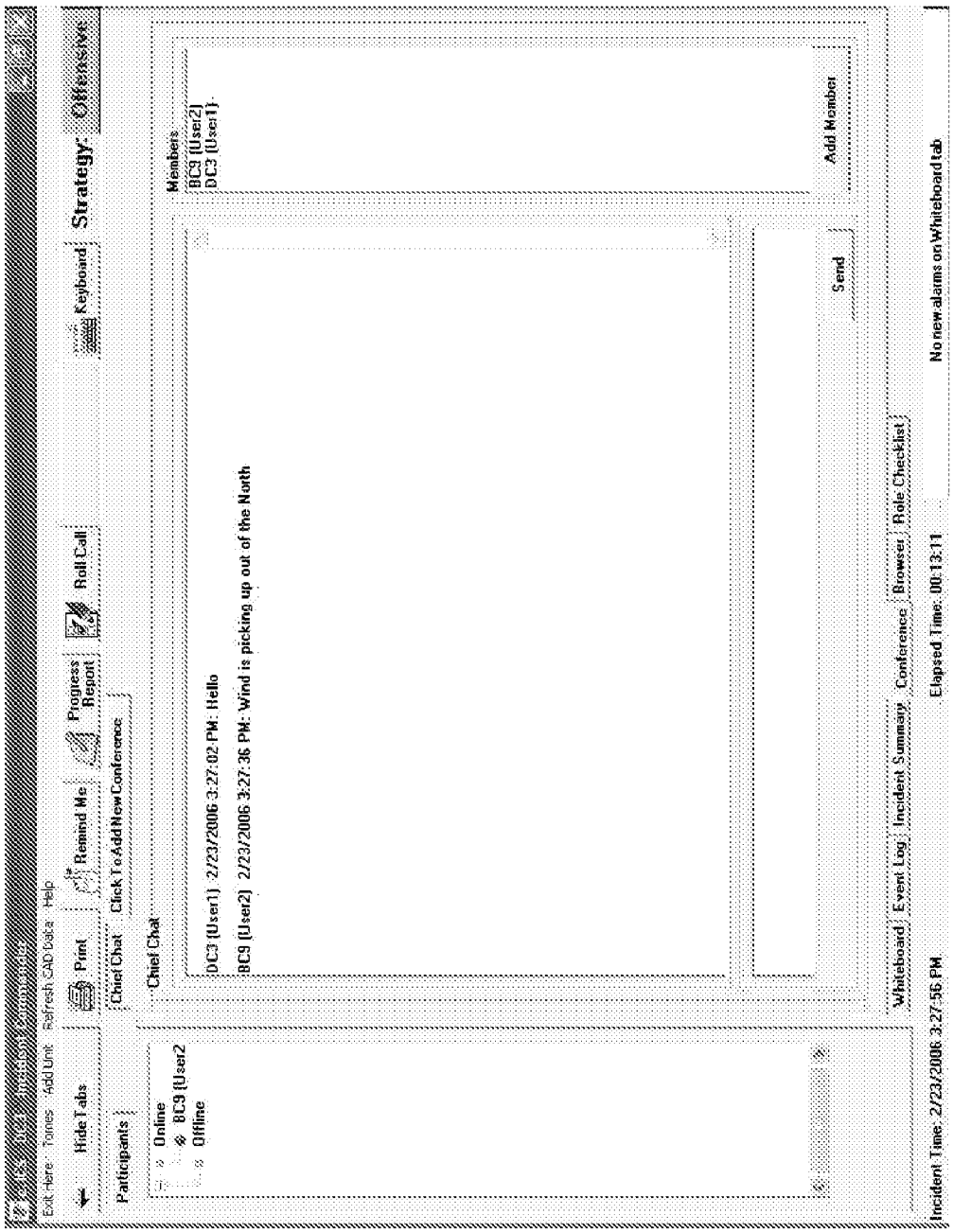
FIG. 39 is a screen shot of a conference screen.

The Conference screen provides the capability to create chat rooms for a specific subset of users within the incident as shown in FIG. 39. Any user can create a conference by giving it a name and selecting its membership from a list of current users in the incident. On activating the conference, the name of the conference appears in a button on the conference screen of each selected user. A user joins the conference by pressing this button. Each member of the conference can add text in the bottom window, which is then shared with the other members and made part of the conference's time stamped transcript. Members can be added at any time, in which case the transcript up to that point is made available to the new members. Any number of conferences can be created and in progress at any time. The conference screen provides users the ability to create chat rooms dedicated to specific subjects. All members can be invited to participate, or a subset of users can be chosen.

Figure 40:
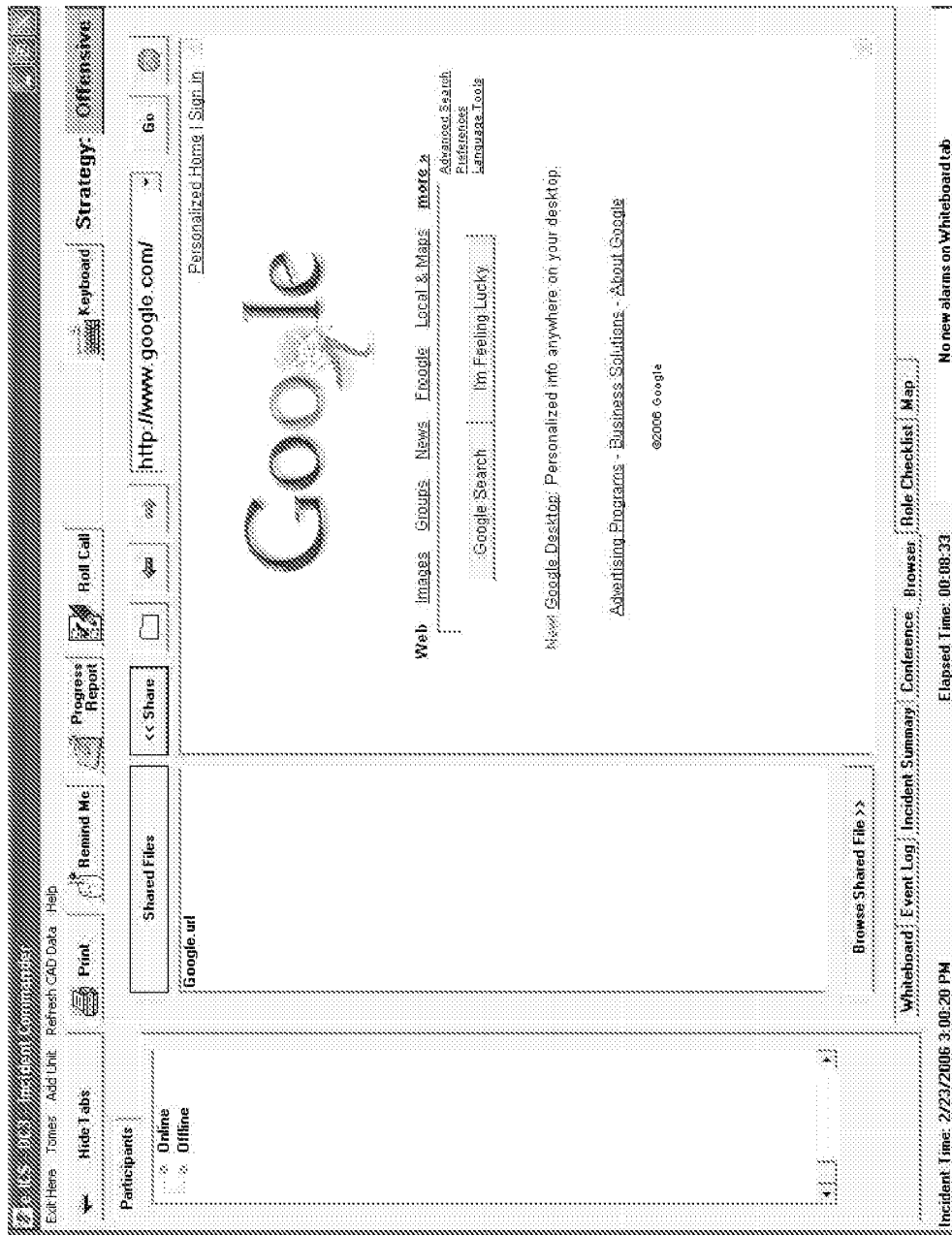
FIG. 40 is a screen shot of a browser screen.

The Browser screen as shown in FIG. 40 provides a simple browser for viewing materials from a user's local disk, from locations within the local area network, or, from the internet if connectivity is available. Through the browser, material can be shared with other users by adding browsed files to the incident workspace. This can be useful for sharing information on dealing with specific hazardous materials, for instance. Once added to the incident workspace, appropriate material can be used as a background image in the whiteboard.

Figure 41:
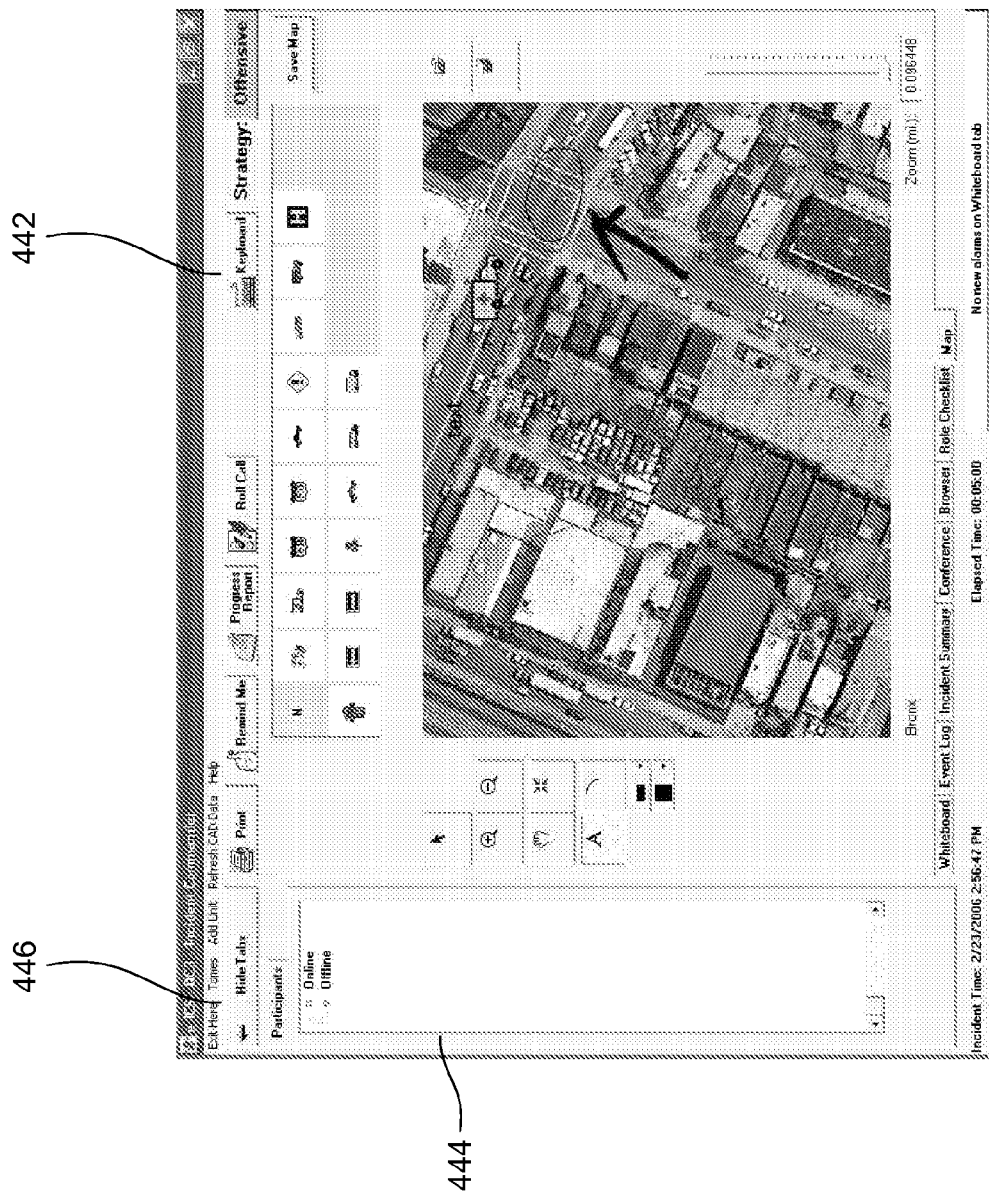
FIG. 41 is a screen shot of a map screen.

The Map screen provides the ability to load, view, pan, zoom in, zoom out, and center raster and vector data layers for a geographic region of interest as shown in FIG. 41. Layers can be reordered and turned on or off. Textual annotations can be made, as well as arbitrary line drawings of varying thicknesses and colors. Symbols can be loaded and positioned on the map. All annotations maintain their position and extent with respect to the underlying map data, so that as the map is zoomed out, annotations appear smaller. The map is collaborative, and each annotation is published and thus digested by all users and reflected in their maps. Map views can be saved as bitmap, GIF, or JPG files. Once saved, the image can be loaded into the whiteboard as a static background image. Sector views can be created in a similar fashion.

The Map Screen can be implemented as an alternate data source using the MapXtreme 2004 software development kit to help create the user control and provide the geographic information system functionality. Arbitrary line drawings are captured as a series of points, then converted to the underlying map coordinate system. Table data structures maintain these line, text and symbol annotations.

The "Keyboard" button 442 found at the top of the e.ICS screens can be pressed at any time to cause a virtual keyboard to appear on the display. This keyboard can be used to enter text if no physical keyboard is available, such as may be encountered with a touchscreen, SmartBoard, or Electronic Command Board, for instance.

The Participants pane 444 on the left hand side of the e.ICS screens shows a list of those users within the incident who are currently within range ("Online") or out of range ("Offline") with respect to the machine on which this copy of e.ICS is running as shown for example in FIG. 38. If a user goes out of range, then any updates from that user are deferred until that user comes back into range. When e.ICS applies these changes, possible conflicts are resolved in a logical manner; overrides take priority over all other actions, and actions with a more recent timestamp take precedence over actions with older timestamps. These update rules maintain consistency across all users of the incident.

Finally, a user exits the incident by selecting the "Exit Here" menu item 446 at the top left corner of the screen. If the user is currently fulfilling a role, then e.ICS warns the user to pass the role to another user before exiting. If a user does not have a role, then e.ICS exits immediately, and an entry is made to the event log. When the incident commander exits, e.ICS asks whether the incident should be marked inactive or not. If the incident is made inactive, then e.ICS changes its state within the bootstrap directory from active to inactive, and e.ICS exits. If the incident commander does not mark the incident as inactive, then the incident can be rejoined at a later time (which is useful for demos and training exercises).

Details on how Resources are Handled

Roles, sectors, and units are the core collaborative resources within e.ICS. To summarize, a unit is represented graphically as a filled rectangle with the name of the unit written in the middle, such as shown in FIG. 32. These units can be selected and placed on different parts of the whiteboard. A sector is graphically represented by a polygon drawn by the user and is a container for units (units can only be placed in parts of the whiteboard that are bounded by sectors). A role is made up of multiple sectors and does not have a graphical representation other than the zero or more sectors being shown. Each one has been discussed above specifically, but they can all be categorized in general as e.ICS resources.

All of these resources have a single, controlling owner. Ownership of resources is recursive, meaning that a user that owns a role owns all sectors that are part of that role and owns all units that are contained by these sectors. To make the system more flexible, each owner does have the ability to pass his ownership of a resource to another e.ICS user. A user can only pass resources that he owns and cannot take resources from someone else (unless an override is performed, as described below).

The graphical user interface (GUI) allows the user to create roles, sectors, and units and pass them among the different e.ICS users that are part of an incident. A sector that is owned by the local e.ICS client will be shown as white with a black border, whereas a sector that is owned by another participant will appear gray with a black border. It follows that any units in the sectors that are filled with white are owned by the local e.ICS user.

Owned Resources

As mentioned above, the whiteboard component publishes a few different types of data, namely: owned resources, passed resources, and confirmed resources. Owned resources are published as state based, and clients digest this data simply by drawing it to their whiteboard screen. This means that when the whiteboard is repainted, it goes through all of the locally owned resources and the remotely owned resources that have been published and paints them to the screen. As e.ICS receives newly published owned resources states, it swaps out any old owned resources it had stored in memory from that user, replaces it with the new list of owned resources, and forces a repaint. This makes processing easier since many changes to the whiteboard do not need to be processed at all; the whiteboard states are swapped and a repaint is forced which updates the view. The full whiteboard can be viewed as a puzzle, each client publishing its piece, and only after putting all the pieces together is the full picture realized.

Passed/Confirmed Resources

The other two types of data published from the whiteboard, namely passed and confirmed resources, both use message-based publishing. Each time a resource is passed, a message is added to the message list. The message has a "To" field which varies depending on the type of resource. Specifically, units are passed to sectors; sectors are passed to roles, and roles are passed to users (all receivers are unique to ensure that there will always only be one owner of each resource). When a resource is passed, it is taken out of the local user's state, which contains all the user's owned resources (since after passing it, it is no longer owned by the user). Once it is added to the receiver's owned resources list it will be drawn with that state, but there is obviously a lag due to network speed between the time a resource is passed and the time a new state is received from the new owner with the passed resource. Therefore, when passing a resource or receiving a message that a resource is being passed to someone else, the local e.ICS client caches this resource in a table until it receives a message in the confirmed resource message list of the new owner that it received and added the new resource to its owned resource state. Each time the whiteboard is painted, these cached pending resources are also drawn to make sure the whiteboard consistently shows all of the current data. Likewise, when a user gets a message that a resource is being passed to him, the resource is added to the local state and a message is added to the confirmed resources message list that the resource has been received.

The following actions only affect the state-based message of owned resources: creation of a sector, drawing of an annotation on the main whiteboard, and moving of a unit within its own sector.

The following actions affect the passed resource/confirmed resource message list: passing a unit to a sector, passing a sector to a role, and passing a role to a user. Note, passing a unit to another sector if both the "to" and the "from" sector are owned by the local e.ICS user actually does not need to create a passing resource message, since the change is reflected in the owned resources state. It is added to the passed resource messages though for override purposes.

Overriding Resources

As discussed above, the Whiteboard component enforces an ownership rule on all resources such that you can only pass resources that you own. This allows data integrity and consistency of shared information, but at times may prevent users from being able to accomplish needed tasks. Consider the scenario that unit BC10 is in the Operations sector and is being moved to a Rehab sector, but the Operations Chief's machine is offline or destroyed. In this case, the Rehab chief cannot take BC10 since he does not own the unit, but due to the circumstances, the Operations Chief cannot pass the unit to the Rehab sector. For cases such as this, e.ICS has an override feature to allow the user to "override" a resource by taking ownership of it. Continuing the example, the Operations Chief would override BC10 and move the unit to the correct sector. Every e.ICS client will receive the override message and update their views accordingly. Any resource including sectors and roles can be overridden using the Override button.

Each resource has a property which stores the last override timestamp and each e.ICS client has a table of overridden resources which maps resource id to the last override timestamp seen. This table is updated in the digestion of whiteboard data by processing the override resource messages. This table therefore contains the latest override time seen for each resource. When the whiteboard refreshes itself through the Paint Event, it calls Draw( ) on each resource. One of the arguments passed into Draw( ) is this override table. Before each resource is drawn, a check occurs to make sure that the resource's last override time is the same or later than the last override time listed in the table. If so, the resource is drawn to the screen; if not and the last override time of the resource is before the last override time listed in the table, this means the resource has been overridden. If the local client is the owner of the overridden resource, it is removed from the owned resource list since it has been overridden and is now owned by another user. If the local client is not the owner, the resource is simply not drawn to the screen since it is out of data and will eventually be removed by its owner.

It should now be appreciated that a incident command system according to the invention includes a command post having a computer to store incident data operated by an incident commander, the computer includes a database for storing the incident data locally within the computer and an interface, connected to the computer, to connect the computer with other computers to replicate the database with the other computers to share the incident data with other collaborative computers, wherein the database comprises incident data from multiple users, each multiple user incident data having an individual time stamp that is related in time with each other individual time stamp; and a portable electronic command board includes a computer for inputting incident data with a local database for storing incident data locally within the computer; and an interface, connected to the computer, to connect the computer with the command post computer to replicate the database on the computer with the database on the command post computer to share the database with other collaborative computers, wherein each change to incident data by a user is pushed to the other collaborative computers. The latter provides a command system that can grow in complexity with the incident type as various responders assist in the response to the incident.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A portable electronic command board comprising:
   a computer for inputting, from a first responder for a specific incident, incident data having a time stamp;
   a bootstrap workspace having data common to all collaboration enabled users including login information and a list of active incidents;
   a standard operating procedure (SOP) workspace having configuration data preconfigured with information on contacting and initiating incident services and incident data sources for a plurality of incident types;
   a specific incident workspace derived from one of the incident types from the SOP workspace having data provided by the SOP workspace and by the first responder for the specific incident and inputted into the computer;
   a database for storing the incident data locally within the computer, the incident data including user unique incident data from the first responder and resources owned by the first responder and user unique incident data from other active users and resources owned by the other active users who have joined the incident workspace;
   a wireless interface, connected to the computer, to connect the computer peer to peer with other computers to replicate the database including each user unique incident data with the other computers to share the incident data with other collaborative computers,
   wherein each user unique incident data is made inactive when the user unique incident data reaches a set size and a new user unique incident data is started.

2. The portable electronic command board as recited in claim 1 wherein the database comprises incident data from multiple users, each multiple user incident data having an individual time stamp that is related in time with each other individual time stamp.

3. The portable electronic command board as recited in claim 2 comprising a time daemon to track a difference in time from one collaborative computer to another collaborative computer and wherein the time daemon is used to provide the time stamp to the incident data.

4. The portable electronic command board as recited in claim 1 wherein a second collaborative computer copies the new user unique incident data in the database for storing incident data from a first collaborative computer.

5. The portable electronic command board as recited in claim 1 comprising a device to track the location of the portable electronic command board.

6. The portable electronic command board as recited in claim 1 comprising an interface to a passive accelerometer such that the portable electronic command board notified wirelessly by the passive accelerometer when ever a user remains motionless for a specified period of time.

7. The portable electronic command board as recited in claim 1 comprising an interface to a biometric monitor to monitor heart rate, respiratory rate, body temperature, and oxygen saturation.

8. The portable electronic command board as recited in claim 1 comprising an interface to a self contained breathing apparatus for air consumption monitoring and detection of the presence of carbon monoxide.

9. The portable electronic command board as recited in claim 1 comprising an interface to at least one from a group of biological, chemical and radiological detectors.

10. The portable electronic command board as recited in claim 1 comprising an interface to access web based information including weather, hazardous materials information, medical and incident mitigation protocols and other emergency management information.

11. The portable electronic command board as recited in claim 1 comprising an interface to access geographic information.

12. The portable electronic command board as recited in claim 1 comprising an interface to access local transportation information.

13. The portable electronic command board as recited in claim 1 comprising an interface to access a patient management system for tracking patients and hospital status.

14. The portable electronic command board as recited in claim 1 comprising an interface to a three dimensional tracking system to track emergency personnel within a structure or tunnel.

15. An incident command system comprising:
a command post having a computer to store, from a first responder for a specific incident, incident data; and
a portable electronic command board comprising:
a computer for inputting, from a first responder for a specific incident, incident data;
a bootstrap workspace having data common to all collaboration enabled users including login information comprising username and password and a list of active incidents;
a standard operating procedure (SOP) workspace having configuration data preconfigured with information on contacting and initiating incident services and incident data sources for a plurality of incident types;
a specific incident workspace derived from one of the incident types from the SOP workspace having data provided by the SOP workspace and by the first responder for the specific incident and inputted into the computer;
a database for storing the incident data locally within the computer, the incident data including user unique incident data from the first responder and resources owned by the first responder and user unique incident data from other active users and resources owned by the other active users who have joined the incident workspace;
an interface, connected to the computer, to connect the computer peer to peer with the command post computer to replicate the database including each user unique incident data on the computer with the database on the command post computer to share peer to peer the database with other collaborative computers,
wherein each user unique incident data is made inactive when the user unique incident data reaches a set size and a new user unique incident data is started.

16. The incident command system as recited in claim 15 comprising a device to track the location of the portable electronic command board and wherein incident data includes data indicative of the location of the portable electronic command board.

17. The incident command system as recited in claim 15 comprising a historical database replicated from the database for storing incident data.

18. The incident command system as recited in claim 15 wherein the incident data in the database comprises a role data field indicative of a role a user is responsible which may be transferred to another user.

19. The incident command system as recited in claim 18 wherein the role data field comprises a hierarchical command structure.

20. The incident command system as recited in claim 15 wherein one user operating a computer is able to authenticate another user operating a second computer into the system.

21. The incident command system as recited in claim 15 wherein the database comprises data from alternative data sources.

22. The incident command system as recited in claim 15 wherein the database comprises data from external data sources.

23. The incident command system as recited in claim 15 wherein the computer comprises a touch screen for inputting data from users.

24. The incident command system as recited in claim 15 wherein the database comprises data from a collaborative map application to provide layering of raster and vector data with textual, symbolic and line annotations.

25. The incident command system as recited in claim 15 wherein a second collaborative computer copies the new user unique incident data in the database for storing incident data from a first collaborative computer.

26. An incident command system comprising:
a command post having a computer to store incident data operated by an incident commander, said computer comprising a database for storing the incident data locally within the computer and an interface, connected to the computer, to connect the computer with other computers to replicate the database with the other computers to share the incident data with other collaborative computers, wherein the database comprises incident data from multiple users, each multiple user incident data having an individual time stamp that is related in time with each other individual time stamp; and
a portable electronic command board comprising:
a computer for inputting, from a first responder for a specific incident, incident data;
a bootstrap workspace having data common to all collaboration enabled users including login information comprising username and password and a list of active incidents;
a standard operating procedure (SOP) workspace having configuration data preconfigured with information on contacting and initiating incident services and incident data sources for a plurality of incident types;
a specific incident workspace derived from one of the incident types from the SOP workspace having data provided by the SOP workspace and by the first responder for the specific incident and inputted into the computer;

a local database for storing the incident data locally within the computer, the incident data including user unique incident data from the first responder and resources owned by the first responder and user unique incident data from other active users and resources owned by the other active users who have joined the incident workspace;

an interface, connected to the computer, to connect the computer with the command post computer to replicate the database including each user unique incident data on the computer with the database on the command post computer to share the database with other collaborative computers, wherein each change to incident data by a user is pushed peer to peer to the other collaborative computers, wherein each user unique incident data is made inactive when the user unique incident data reaches a set size and a new user unique incident data is started.

27. The incident command system as recited in claim 26 wherein a second collaborative computer copies the new user unique incident data in the database for storing incident data from a first collaborative computer.

* * * * *